(12) United States Patent
Takahashi et al.

(10) Patent No.: US 7,723,905 B2
(45) Date of Patent: *May 25, 2010

(54) VIBRATING GYROSENSOR DRIVEN WITH OFFSET POTENTIAL

(75) Inventors: Kazuo Takahashi, Miyagi (JP); Teruo Inaguma, Miyagi (JP); Junichi Honda, Miyagi (JP); Koji Suzuki, Miyagi (JP); Shigeto Watanabe, Miyagi (JP); Shin Sasaki, Miyagi (JP); Eiji Nakashio, Miyagi (JP); Manabu Aizawa, Miyagi (JP)

(73) Assignee: Sony Corporation, Tokyo (JP)

( * ) Notice: Subject to any disclaimer, the term of this patent is extended or adjusted under 35 U.S.C. 154(b) by 43 days.

This patent is subject to a terminal disclaimer.

(21) Appl. No.: 12/116,646

(22) Filed: May 7, 2008

(65) Prior Publication Data

US 2009/0174292 A1   Jul. 9, 2009

Related U.S. Application Data

(63) Continuation of application No. 11/368,144, filed on Mar. 3, 2006, now Pat. No. 7,400,078.

(30) Foreign Application Priority Data

| Mar. 4, 2005 | (JP) | ............................. 2005-106718 |
| Mar. 7, 2005 | (JP) | ............................. 2005-063075 |
| Jun. 29, 2005 | (JP) | ............................. 2005-190234 |
| Dec. 27, 2005 | (JP) | ............................. 2005-374326 |

(51) Int. Cl.
*H01L 41/08* (2006.01)
(52) U.S. Cl. ..................................... 310/370; 310/348
(58) Field of Classification Search .................. 310/370, 310/348
See application file for complete search history.

(56) References Cited

U.S. PATENT DOCUMENTS

| 5,396,144 A | * | 3/1995 | Gupta et al. ................. 310/370 |
| 5,569,969 A | * | 10/1996 | Kasanami et al. ........... 310/345 |
| 5,719,460 A | * | 2/1998 | Watarai et al. ......... 310/316.01 |
| 5,987,987 A | * | 11/1999 | Watarai ................... 73/504.16 |

(Continued)

FOREIGN PATENT DOCUMENTS

JP           04-188684           7/1992

(Continued)

OTHER PUBLICATIONS

Japanese Patent Office Action corresponding to Japanese Serial No. 2005-374326 dated Dec. 1, 2009.

*Primary Examiner*—J. SanMartin
(74) *Attorney, Agent, or Firm*—Sonnenschein Nath & Rosenthal LLP

(57) ABSTRACT

A vibrating gyrosensor includes a support substrate on which a wiring pattern having lands is formed. A vibrating element is mounted on a surface of the support substrate. The vibrating element includes a base part having a mounting surface on which a number of terminals connectable to the lands is formed. A vibrator part integrally projects from a side of the base part and has a substrate-facing surface coplanar with the mounting surface of the base part. The vibrator part has a first electrode layer, a piezoelectric layer, and a second electrode layer which are laminated on the substrate-facing surface. The vibrator part vibrates when an AC signal is applied between the first and second electrode layers. The central electric field strength of the AC signal is set at a position shifting to the positive direction from the center of a hysteresis loop of the piezoelectric layer.

7 Claims, 36 Drawing Sheets

U.S. PATENT DOCUMENTS

| | | | |
|---|---|---|---|
| 7,002,284 B2 * | 2/2006 | Ouchi et al. | 310/370 |
| 7,051,592 B2 * | 5/2006 | Fujimoto et al. | 73/504.16 |
| 7,215,066 B2 * | 5/2007 | Kawakubo et al. | 310/348 |
| 7,400,078 B2 * | 7/2008 | Takahashi et al. | 310/348 |
| 7,583,012 B2 * | 9/2009 | Nakashio et al. | 310/358 |
| 2008/0013939 A1 | 1/2008 | Ogawa | |
| 2008/0222865 A1 * | 9/2008 | Nakashio et al. | 29/25.35 |

FOREIGN PATENT DOCUMENTS

| | | |
|---|---|---|
| JP | 07-294263 | 11/1995 |
| JP | 08-304081 | 11/1996 |
| JP | 09127148 | 5/1997 |
| JP | 10-002741 | 1/1998 |
| JP | 10-239064 | 9/1998 |
| JP | 11-004027 | 1/1999 |
| JP | 2001183162 | 10/2001 |
| JP | 2002-257553 | 9/2002 |
| JP | 2006145429 | 6/2006 |
| JP | 2006284336 | 10/2006 |

* cited by examiner

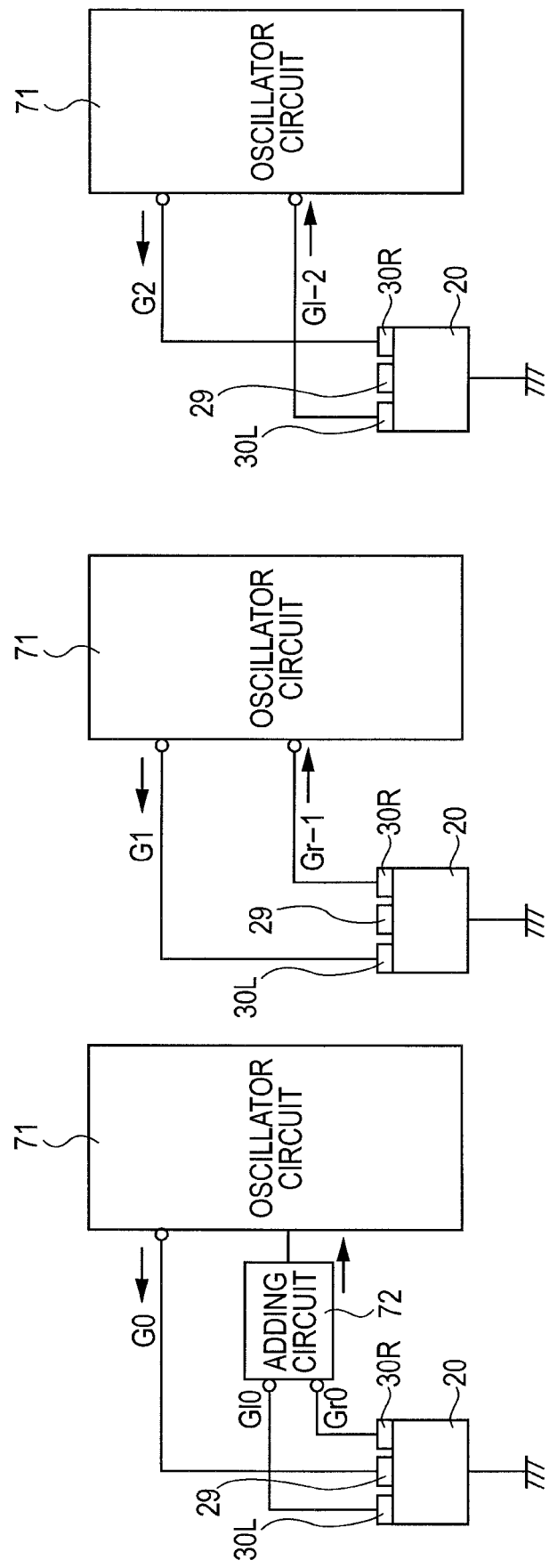

FIG. 40

|  | 3-cm SQUARE SUBSTRATE | 4-in Φ SUBSTRATE | 5-in Φ SUBSTRATE |
|---|---|---|---|
| ONE-AXIS VIBRATING ELEMENT | 60(30) | 1200(600) | 4000(2000) |
| TWO-AXIS INTEGRATED VIBRATING ELEMENT | 20 | 300 | 800 |

HYSTERESIS LOOP OF PIEZOELECTRIC MATERIAL
(P-E CURVE)

VIBRATING GYROSENSOR DRIVEN WITH OFFSET POTENTIAL

CROSS REFERENCES TO RELATED APPLICATIONS

The present application is a continuation application of U.S. Ser. No. 11/368,144 filed on Mar. 3, 2006, and also claims priority to Japanese Patent Application JP 2005-106718 filed on Mar. 4, 2005, Japanese Patent Application JP 2005-063075 filed on Mar. 7, 2005, Japanese Patent Application JP 2005-190234 filed on Jun. 29, 2005, and Japanese Patent Application JP 2005-374326 filed on Dec. 27, 2005. The entire contents of each of these United States and Japanese patent applications being incorporated herein by reference to the extent permitted by law.

BACKGROUND OF THE INVENTION

1. Field of the Invention

The present invention relates to an angular velocity sensor used, for example, for detecting motion blurring of a video camera, detecting a motion in a virtual reality device, detecting a direction in a car navigation system, and the like. Specifically, the invention relates to a vibrating gyrosensor including a vibrating element having a cantilever vibrator.

2. Description of the Related Art

As consumer angular velocity sensors, so-called vibrating gyrosensors are widely used, in each which a cantilever vibrator is vibrated at a predetermined resonance frequency, and Coriolis' force produced by the influence of an angular velocity is detected by a piezoelectric element to detect the angular velocity.

Vibrating gyrosensors have the advantages of a simple mechanism, a short starting time, and a low manufacturing cost. For example, vibrating gyrosensors are mounted on electronic devices, such as a video camera, a virtual reality device, and a car navigation system and used as sensors for detecting motion burring, a motion, and a direction, respectively.

A usual vibrating gyrosensor includes a vibrating element which is manufactured by machine-cutting an appropriate piezoelectric material to form a predetermined shape. A vibrating gyrosensor preferably has a smaller size and higher performance with reduction in size and weight and increases in functionality and performance of a main body device on which the vibrating gyrosensor is mounted. However, it has been difficult to manufacture a small vibrating element with high precision due to the limit of machining precision.

Therefore, there has recently been proposed a vibrating gyrosensor including a cantilever vibrating element formed by laminating a pair of electrode layers with a piezoelectric thin film layer provided therebetween on a silicon substrate using a thin film technique for semiconductor processes (refer to, for example, Japanese Unexamined Patent Application Publication No. 7-113643). Such a vibrating gyrosensor may be reduced in size and thickness and thus complexed or increased in functionality by combination with a sensor for other purposes.

SUMMARY OF THE INVENTION

A mechanism for correcting motion blurring of a video camera or the like is preferably adapted to detect rotation angles around at least the X-axis and Y-axis directions and thus generally includes two gyrosensors for detecting the rotation angles around the X-axis and Y-axis directions. Therefore, even if a gyrosensor is reduced in size, reduction in the whole size of a usual mechanism for correcting motion blurring is limited.

A vibrating gyrosensor may be packaged by a method in which a vibrating element having vibrators in two axes is formed on a silicon wafer using the above-described semiconductor technique (refer to Japanese Unexamined Patent Application Publication No. 7-190783). However, a large space is used for forming a two-axis integrated vibrating element on a silicon wafer, thereby causing the problem of a low material yield. In addition, a two-axis integrated vibrating element has the problem of crosstalk between vibrators in the two axes accompanying with reduction in size.

The structure of a usual vibrating gyrosensor is complicated by a measure against the above-described problems, and the realization of reduction in size and thickness becomes more difficult. Namely, when two vibrators are provided for two-axis vibrations in a mechanism for correcting motion blurring, the realization of reduction in size becomes more difficult, and the realization of a desired small package including the above-described two-axis integrated vibrating element also becomes difficult.

It is desirable to provide a vibrating gyrosensor capable of detecting vibrations in two axes while decreasing the size, improving the characteristics, or decreasing the cost.

In accordance with an embodiment of the invention, there is provided a vibrating gyrosensor including a support substrate on which a wiring pattern having a plurality of lands is formed, and vibrating elements mounted on a surface of the support substrate, wherein at least two vibrating elements are mounted on the support substrate, for detecting vibrations in different axis directions.

In the above-described vibrating gyrosensor, the two vibrating elements including respective vibrator parts having different axial directions are mounted on the support substrate, and thus the vibrating elements independently detect detection signals in two axis directions. Therefore, each of the vibrating elements is efficiently produced at low cost, and the operation of each vibrating element is stabilized to improve reliability.

In the vibrating gyrosensor, each of the vibrating elements includes a base part having a mounting surface on which a plurality of terminal parts to be connected to lands on the support substrate is formed, and a vibrator part integrally projected in a cantilever manner from one of the sides of the base part and having a substrate-facing surface coplanar with the mounting surface. The vibrator part has a first electrode layer, a piezoelectric layer, and a second electrode layer, which are formed on the substrate-facing surface in that order. The two vibrating elements are mounted so that the vibrator parts are disposed on axial lines at 90°.

In the vibrating gyrosensor, an AC electric field at a predetermined frequency is applied to each of the vibrating elements from a driving detector circuit part to produce a natural vibration in the vibrator part. Also, when displacement occurs in each vibrator part by the Coriolis force produced by motion blurring, the displacement is detected by the piezoelectric layer to output detection signals with opposite polarities from a pair of detection electrodes. The detection signals are processed by the driving detector circuit part to output as an angular velocity signal.

In this case, the difference between the operating frequencies of the vibrating elements is 1 kHz or more, thereby decreasing a crosstalk between the axes.

In the vibrating gyrosensor, at least two vibrating elements for detecting vibrations in different axial directions are mounted on a support substrate, thereby simplifying the structure, reducing the size, and permitting high-precision detection operations in two axis directions. Also, each vibrating element is improved in productivity and manufactured with high precision, thereby decreasing the cost and increasing precision.

BRIEF DESCRIPTION OF THE DRAWINGS

FIG. 39A, 39B, and 39C are drawings illustrating a step for adjusting a vibrator part;

FIG. 40 is a table showing comparison of the numbers of the elements obtained from a silicon substrate;

FIGS. 42A and 42B are histograms of an angular shift of a vibrating element in a mounting step, in which FIG. 42A shows mounting by recognition of alignment marks, and FIG. 42B shows mounting by recognition of an outer shape;

DESCRIPTION OF THE PREFERRED EMBODIMENTS

Vibrating gyrosensors according to embodiments of the present invention will be described in detail below with reference to the drawings.

The present invention is not limited to these embodiments, and various modifications may be made on the basis of the technical idea of the invention. Although each of parts of component members will be described below using specified dimension values, each dimension value is a central reference value. Also, the dimension values of each part are not limited to these central reference values, and each part may be formed with dimension values within a general tolerance range. Furthermore, the dimension values of the vibrating gyrosensors are not limited to these dimension values, and each part may be appropriately formed according to characteristic specifications.

First Embodiment (Schematic Configuration of Vibrating Gyrosensor)

Figure 1:
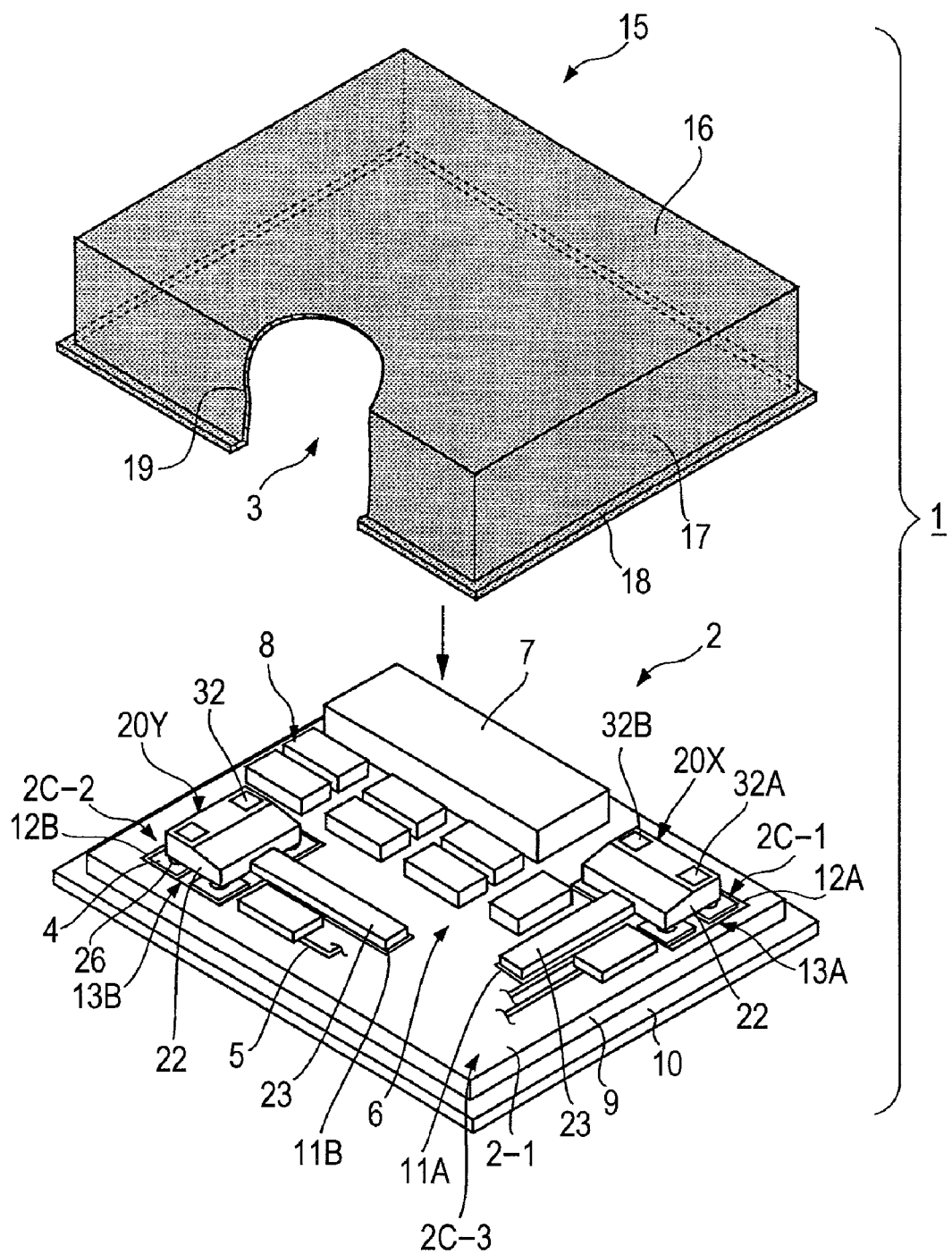
FIG. 1 is a perspective view of the whole of a vibrating gyrosensor according to a first embodiment of the present invention, with a cover member removed.

Referring to FIG. 1, a vibrating gyrosensor 1 has an exterior member including a support substrate 2 and a cover member 15 combined with a first main surface 2-1 of the support substrate 2 to form a component mounting space 3. For example, the vibrating gyrosensor 1 is mounted on a video camera to serve as a mechanism for correcting motion blurring. Also, for example, the vibrating gyrosensor 1 is used for a virtual reality device to serve as a motion detector or used for a car navigation system to serve as a direction detector.

The vibrating gyrosensor 1 includes, for example, a ceramic substrate or a glass substrate as the support substrate 2. Also, a predetermined wiring pattern 5 having a plurality of lands 4 is formed on the first main surface 2-1 of the support substrate 2 to form a component mounting region 6. In the component mounting region 6 are mixed-loaded a pair of first and second vibrating elements 20X and 20Y (hereinafter generically referred to as "vibrating elements 20" unless otherwise specified), which are mounted to detect vibrations in different axial directions and which will be described in detail below, an IC circuit element 7, and many external ceramic capacitors and electronic components 8.

Figure 2:
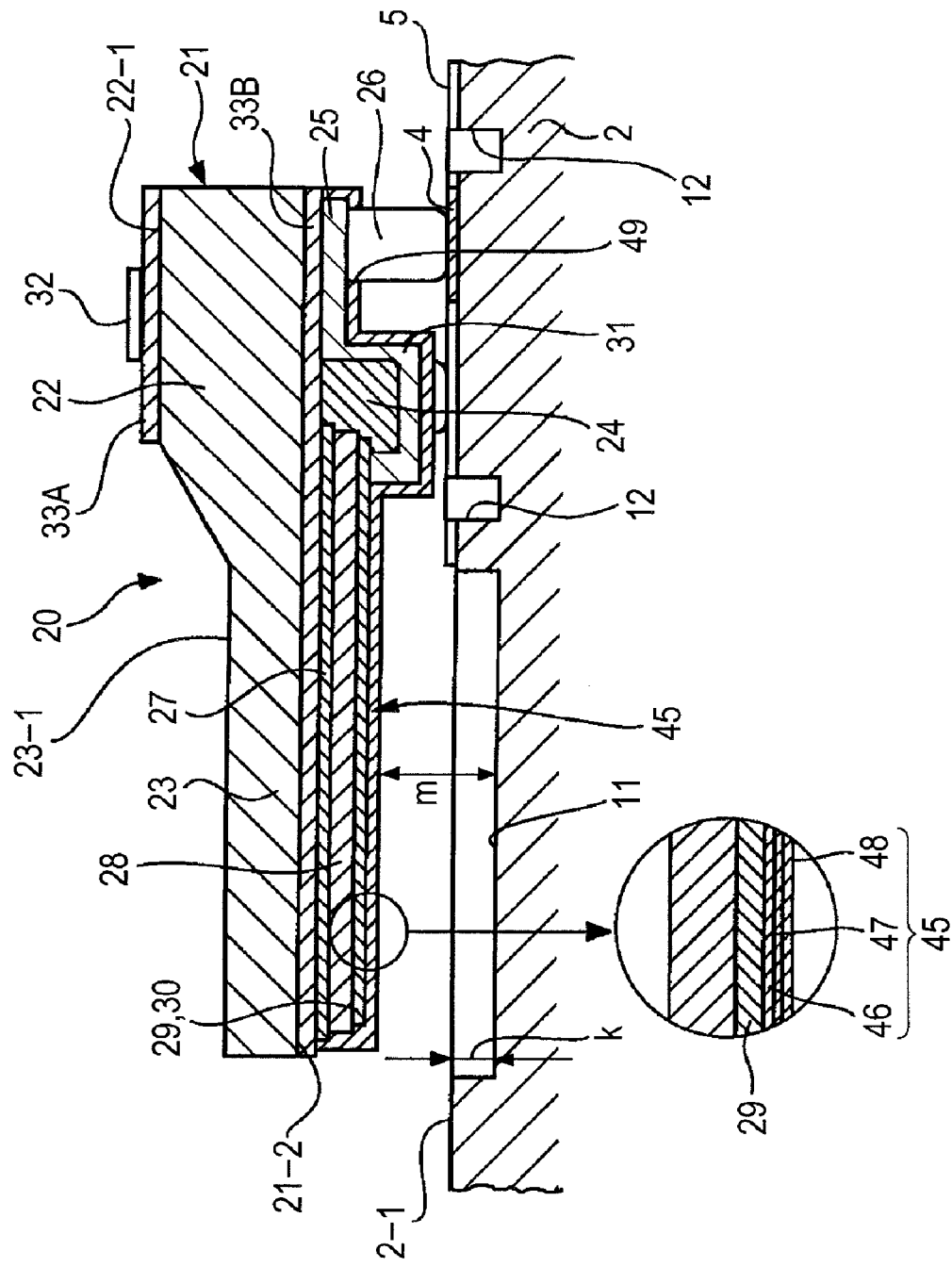
FIG. 2 is a sectional view of a principal portion of a vibrating element of the vibrating gyrosensor shown in FIG. 1.

In the component mounting region 6 of the support substrate 2, the vibrating elements 20 as well as the IC circuit element 7 and the electronic components 8 are surface-mounted by a flip-chip process using a proper mounting machine. The pair of the vibrating elements 20X and 20Y having the same shape is mounted at the opposite corners 2C-1 and 2C-2 of the first main surface 2-1 of the support substrate 2 so as to have different axial lines. As shown in FIG. 2, each of the vibrating elements 20 has a base part 22 having a mount surface on which a plurality of terminals 25 to be connected to the respective lands 4 through gold bumps 26 is formed, and a vibrator part 23 integrally projected from one of the sides of the base part 22 in a cantilever manner. The structure of each vibrating element 20 will be described in detail below.

As shown in FIG. 1, the base part 22 of the first vibrating element 20X is fixed to a floating island-like first vibrating element mounting region 13A formed at the corner 2C-1 of the component mounting region 6 of the support substrate 2, and the vibrator part 23 integrally projected from the base part 22 is directed toward the corner 2C-3 adjacent to the corner 2C-1 along the side edge of the support substrate 2. The base part 22 of the other second vibrating element 20Y is fixed to a floating island-like second vibrating element mounting region 13B formed at the corner 2C-2 of the component mounting region 6 of the support substrate 2, and the vibrator part 23 integrally projected from the base part 22 is directed toward the corner 2C-3 adjacent to the corner 2C-2 along the side edge of the support substrate 2.

In other words, the first and second vibrating elements 20X and 20Y are mounted at an angle of 90° on the support substrate 2 so that the vibrator parts 23 are directed toward the corner 2C-3. The vibrating gyrosensor 1 is adapted to detect vibrations in two axial directions perpendicular to each other using the pair of the vibrating elements 20X and 20Y. However, the vibrating elements 20X and 20Y may be mounted at an appropriate angle on the support substrate 2 according to the specifications of a main body device.

The vibrating gyrosensor 1 detects angular velocities around the longitudinal directions of the vibrator parts 23 of the vibrating elements 20 in a state in which the vibrators 23 are resonated. In the vibrating gyrosensor 1, the first and second vibrating elements 20X and 20Y are mounted at an angle on the support substrate 2, for simultaneously detecting the angular velocities around the X-axis and Y-axis directions. For example, in a video camera, the vibrating gyrosensor 1 serves as a motion blur correcting mechanism which outputs a control signal based on a vibration state due to motion blurring.

Next, the configuration of the support substrate 2 will be described in detail.

(Load Buffering Structure)

The vibrating gyrosensor 1 may be decreased in size and thickness by thinning the support substrate 2. Therefore, strain or stress may occur in the support substrate 2 due to an external load such as vibration, an impact, or the like which is applied from the outside. In this embodiment, a buffer structure for an external load is provided on the support substrate 2, for decreasing the influence on the vibrating elements 20 mounted on the support substrate 2 even when strain or stress occurs.

Figure 3:
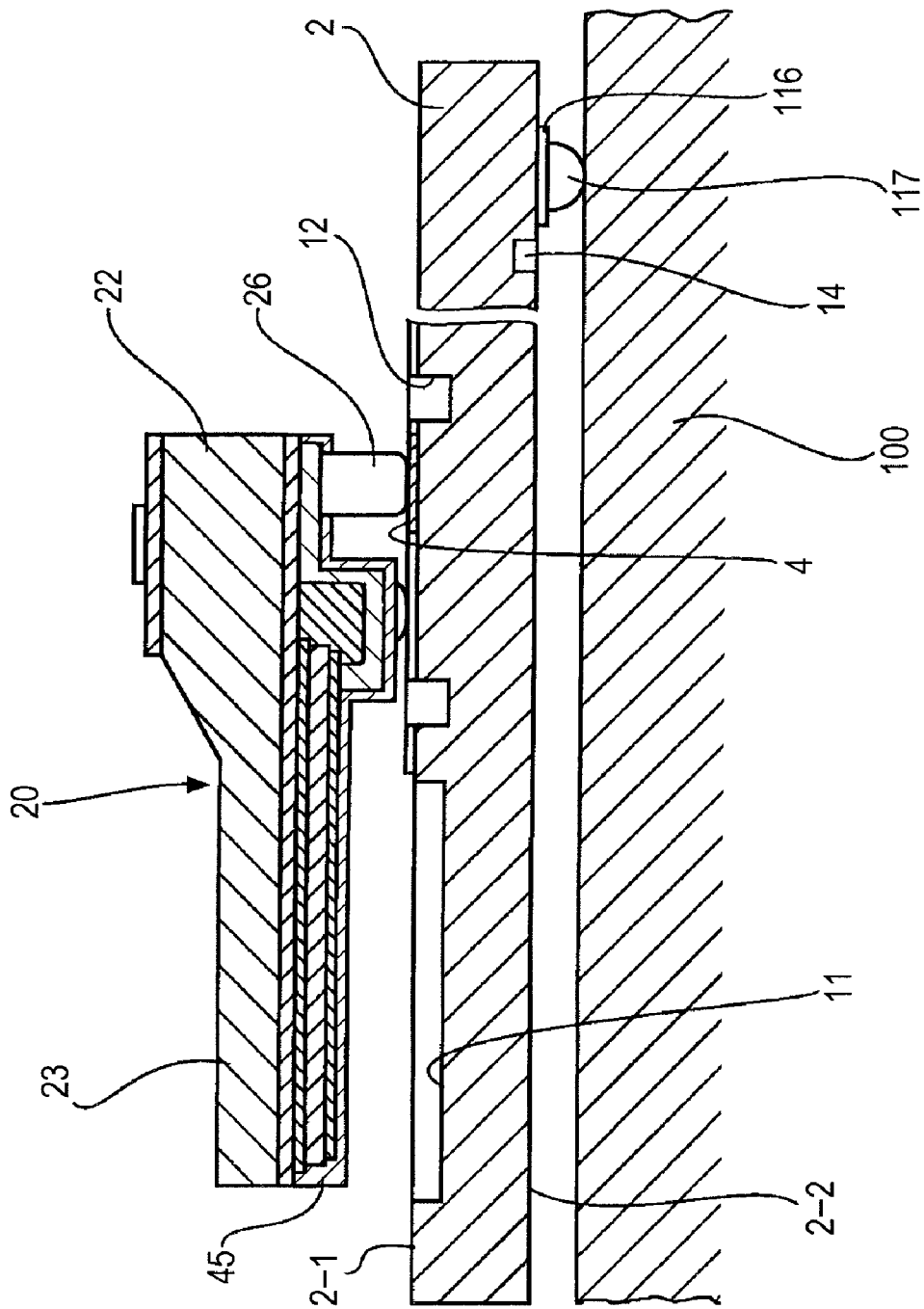
FIG. 3 is a sectional view of a principal portion of the vibrating element of the vibrating gyrosensor shown in FIG. 2 in a state in which the vibrating gyrosensor is mounted on a control substrate.

As shown in FIGS. 1 to 3, first load buffering grooves 12A and 12B (hereinafter generically referred to as "first load buffering grooves 12" unless otherwise specified) are formed at the corners 2C-1 and 2C-2, respectively, of the first main surface 2-1. The vibrating element mounting regions 13A and 13B (hereinafter generically referred to as the "vibrating element mounting regions 13" unless otherwise specified) are formed in regions surrounded by the respective first load buffering grooves 12, and the vibrating elements 20 are mounted on the respective vibrating element mounting regions 13.

Figure 5:
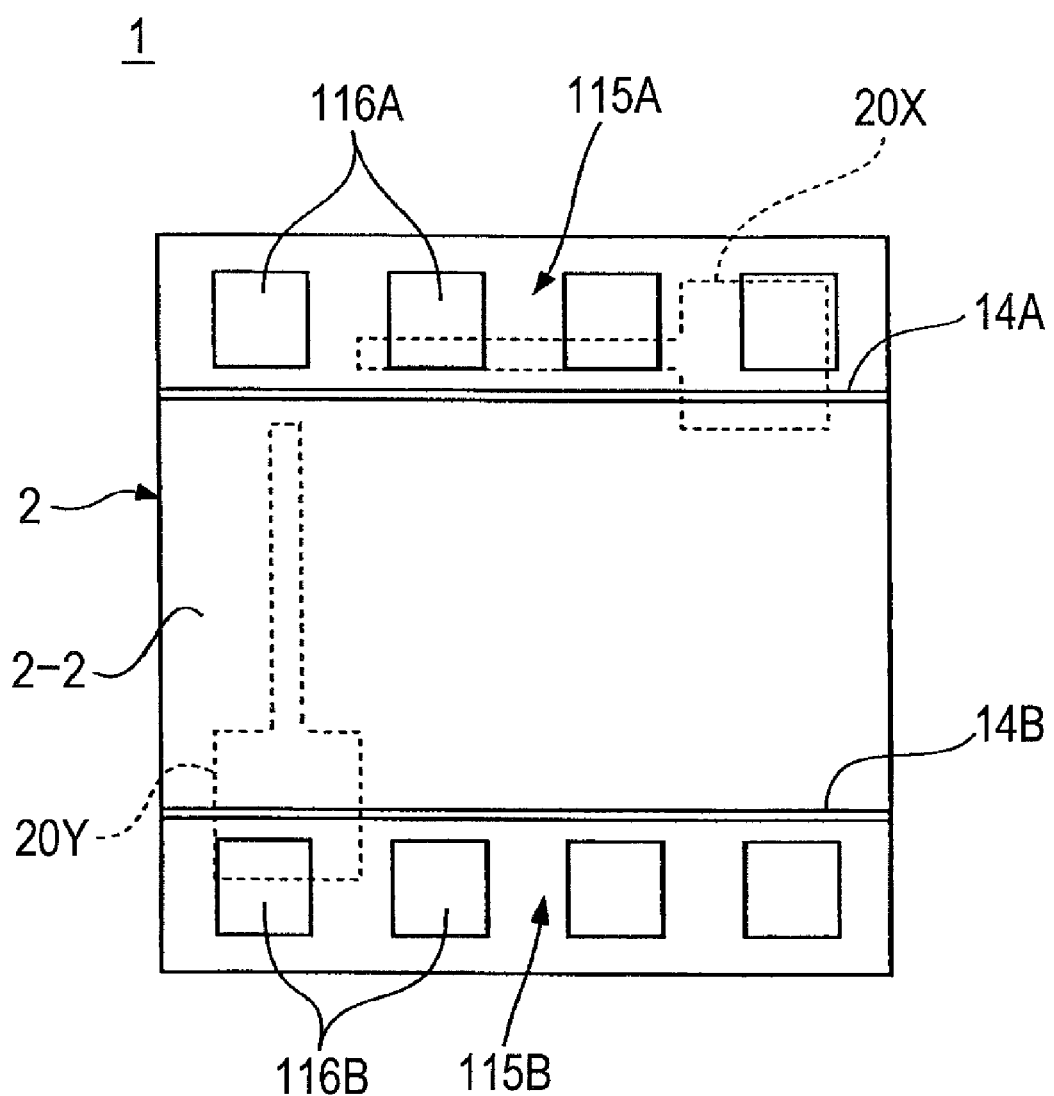
FIG. 5 is a bottom view of the vibrating gyrosensor.

As shown in FIG. 3, in the support substrate 2, second load buffering grooves 14 are formed in a second main surface 2-2 to be mounted on an external control substrate 100 of the main body device or the like. As shown in FIG. 5, the second load buffering grooves 14 include second load buffering grooves 14A and 14B (generically referred to as "second load buffering grooves 14" hereinafter unless otherwise specified). As shown in FIG. 5, regions surrounded by the second load buffering grooves 14 serve as terminal formation regions 115A and 115B (hereinafter generically referred to as the "terminal formation regions 115" unless otherwise specified).

Figure 4:
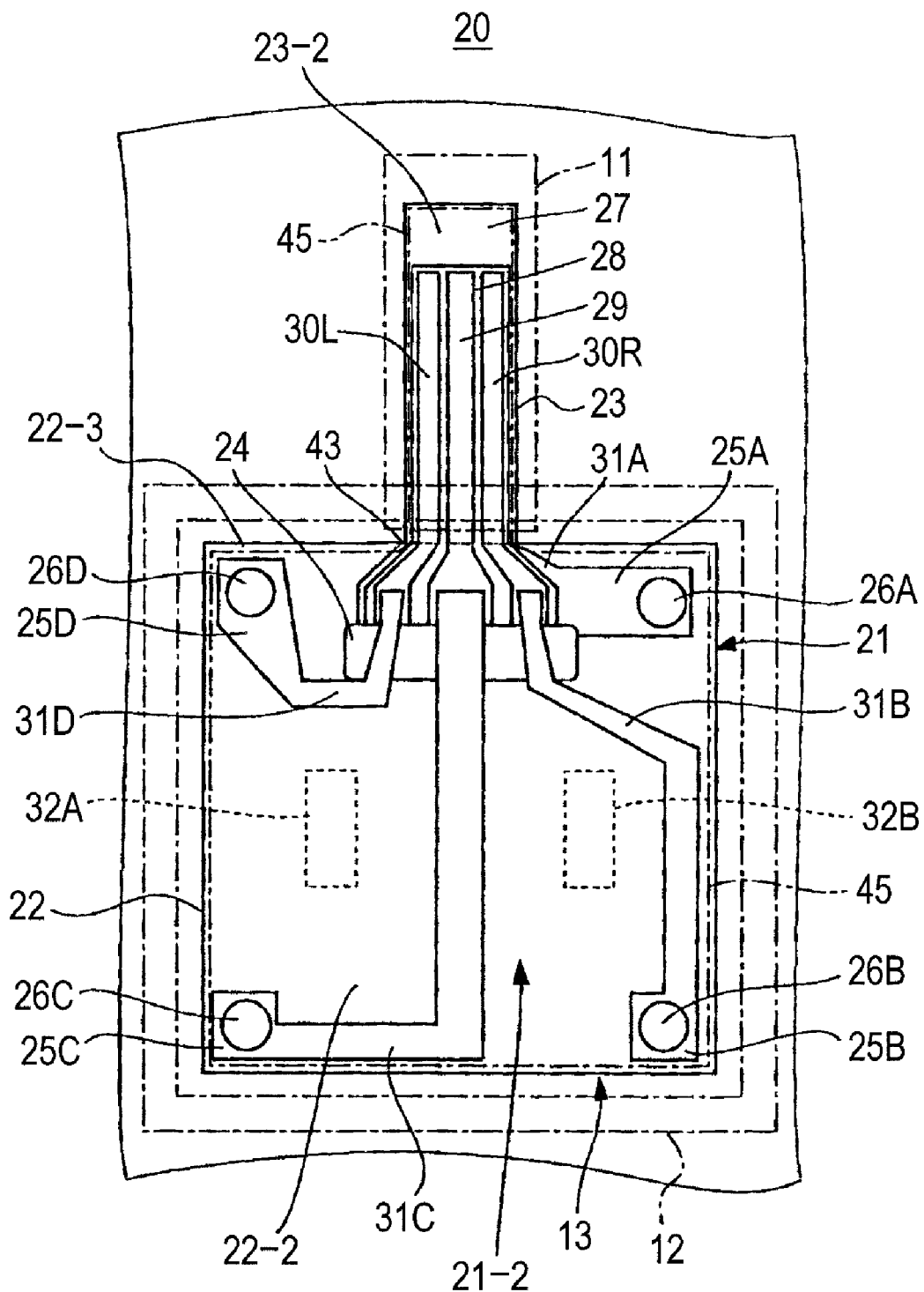
FIG. 4 is a bottom view of the vibrating element.

As shown in FIG. 4, each of the first load buffering grooves 12 is formed in a frame-like groove having a bottom, for forming the vibrating element mounting region 13 larger than the outer shape of the base part 22 of each vibrating element 20. The first load buffering grooves 12 are formed by, for example, mechanical grooving with a dicer, chemical grooving by wet etching, or dry etching with a laser. Each of the first load buffering grooves 12 is formed to a depth of 100 μm or more within a range in which the mechanical strength of the support substrate 2 is not impaired.

As shown in FIG. 5, the second load buffering grooves 14A and 14B are formed in parallel along the peripheral side lines of the support substrate 2. The regions between the peripheral side lines and the respective second load buffering grooves 14A and 14B serve as the terminal formation regions 115A and 115B, respectively, in each of which a plurality of mounting terminal parts 116A or 116B (hereinafter generically referred to as the "mounting terminal parts 116" unless otherwise specified) is appropriately arranged. The support substrate 2 is mounted on the control substrate 100 by connecting the mounting terminal parts (external connection terminals) 116 to the respective lands on the control substrate 100 through bumps 117 provided on the respective mounting terminal parts 116.

Like the first load buffering grooves 12, each of the second load buffering grooves 14 is formed to a predetermined depth in the second main surface 2-2 of the support substrate 2 by mechanical grooving with a dicer, chemical grooving by wet etching, or dry etching with a laser or the like. The second load buffering grooves 14 form the floating island-like terminal formation regions 115 on the second main surface 2-2 of the support substrate 2, and a plurality of the mounting terminal parts 116 is arranged in each of the terminal formation regions 115 along the outer edge of the support substrate 2. The second load buffering grooves 14 are not limited to linear grooves along the outer edge, and the second load buffering grooves 14 may be formed in, for example, a frame shape surrounding each mounting terminal part 116 or a substantially U-shaped form with both ends open to the outer edge.

In the support substrate 2, many via holes are formed to pass through the first and second main surfaces 2-1 and 2-2 so that the wiring pattern 5 on the first main surface 2-1 is appropriately connected to the mounting terminal parts 116 on the second main surface 2-2 through the via holes.

When an impact is applied to the main body device, strain or stress occurs in the support substrate 2 of the vibrating gyrosensor 1 through the control substrate 100. In this embodiment, as described above, each of the vibrating elements 20 is mounted on the floating island-like vibrating element mounting region 13 surrounded by the first load buffering groove 12. Consequently, the strain or stress occurring by an external load is absorbed by the first load buffering groove 12. Therefore, each of the first load buffering grooves 12 functions as a damper for decreasing the influence of an external load on the vibrating element 20 mounted on the vibrating element mounting region 13, thereby permitting a stable detection operation of the vibrating element 20.

On the other hand, in the vibrating gyrosensor 1, as described above, the second load buffering grooves 14 are provided so that the mounting terminal parts 116 provided on each of the floating island-like terminal formation regions 115 serve as portions fixed to the control substrate 100. In this embodiment, an external load transmitted through the control substrate 100 is absorbed by the second load buffering grooves 14. Therefore, each of the second load buffering grooves 14 functions as a damper for decreasing the influence of an external load on the vibrating element 20 mounted on the vibrating element mounting region 13, thereby permitting a stable detection operation of the vibrating element 20.

Each of the first load buffering grooves 12 is formed into a continuous groove having a U-shaped sectional form, but each load burring groove 12 is not limited to this. Each of the first load buffering grooves 12 may be formed by, for example, arranging many grooves to form a frame shape as a whole on condition that a predetermined characteristic is satisfied. Also, each of the second load buffering grooves 14 is not limited to a continuous groove, and each of the second load buffering grooves 14 may be formed by, for example, arranging many grooves. Furthermore, although the first load buffering grooves 12 and the second load buffering grooves 14 are formed in the first main surface 2-1 and the second main surface 2-2, respectively, of the support substrate 2, to form a load buffering structure including the front and back surfaces, only the first load buffering grooves 12 or the second load buffering grooves 14 may be provided to form a load buffering structure on condition that a predetermined characteristic is satisfied.

Figure 6:
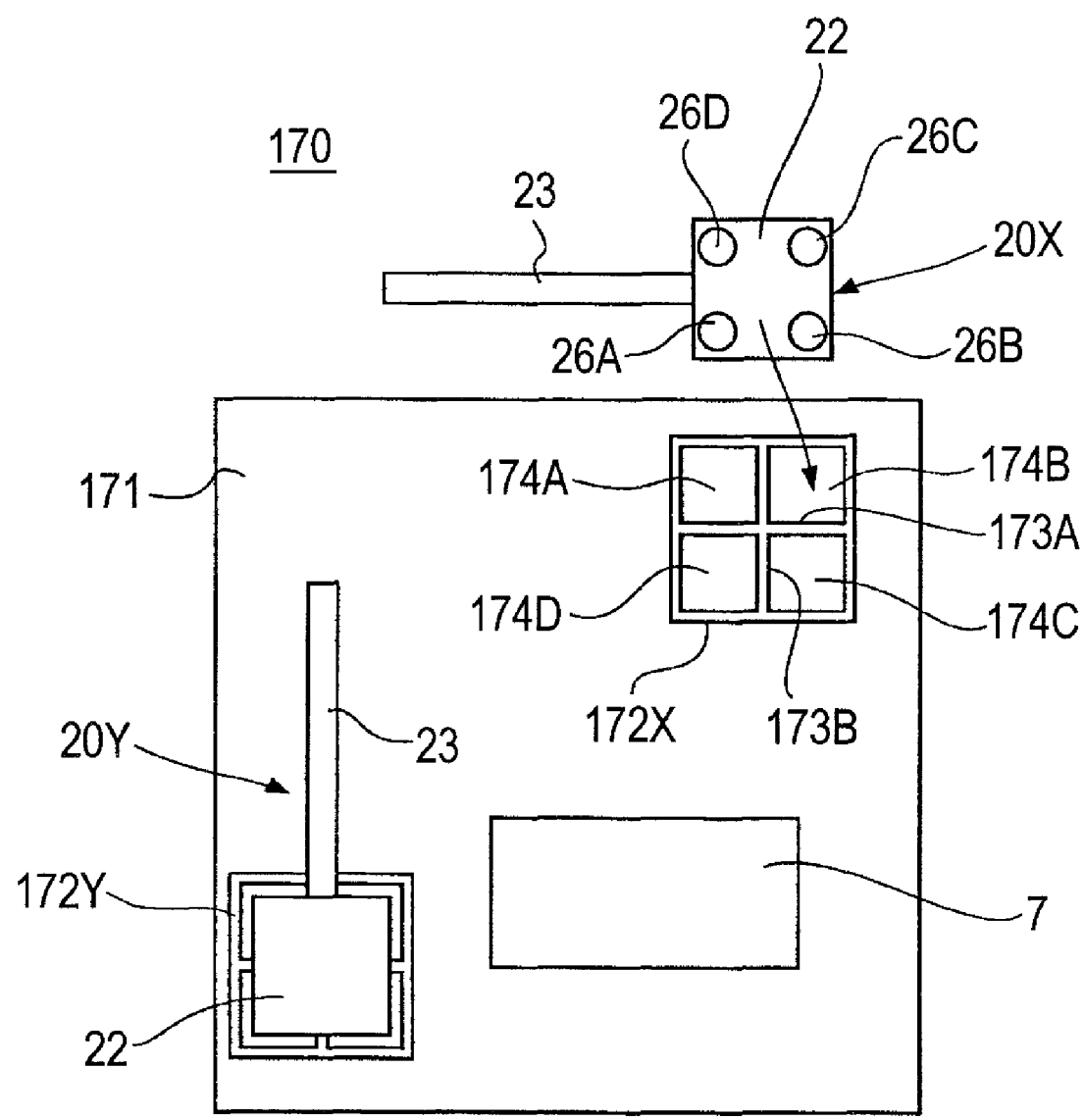
FIG. 6 is a plan view of a support substrate showing a modified example of the structure of a load buffering part.

Although, as descried above, each of the frame-like first load burring grooves 12 is formed in the first main surface 2-1 of the support substrate 2 to surround the vibrating element mounting region 13, the structure of each first load burring groove is not limited to this. In a vibrating gyrosensor 170 shown in FIG. 6, frame-like first load buffering grooves 172X and 172Y are formed in a support substrate 171, and cross-shaped partition grooves 173A and 173B are further formed in each first load buffering groove 172 to form four mounting regions 174A to 174D.

Namely, in the vibrating gyrosensor 170, the individual mounting regions 174 are partitioned corresponding to the respective terminal parts 25 formed on the base part 22 of each vibrating element 20. Although not shown in FIG. 6, a mounting terminal part is provided in each mounting region 174. In the vibrating gyrosensor 170 having the above-described structure, each of vibrating elements 20 is mounted on the support substrate 171 by fixing the terminal parts 25 to the corresponding mounting terminal parts through gold bumps so that the terminal parts 25 are fixed to respective second floating islands which are divided by the partition grooves 173 in a first floating island entirely surrounded by each first load buffering groove 172.

(Space Forming Recess)

In the support substrate 2, recesses 11A and 11B (hereinafter generically referred to as "space forming recesses 11" unless otherwise specified) are formed in the component mounting region 6 corresponding to the vibrating elements 20X and 20Y, for forming spaces in which the respective vibrator parts 23 are freely vibrated in the thickness direction. Each of the space forming recesses 11 is formed into a rectangular groove with a bottom which has a predetermined depth and an aperture dimension by, for example, etching or grooving the first main surface 2-1 of the support substrate 2.

In the vibrating gyrosensor 1, the vibrating elements 20 each including the base part 22 and the cantilever vibrator part 23, which are integrally formed, are mounted on the first main surface 2-1 of the support substrate 2 through the gold bumps 26. The space between the vibrator part 23 of each of the vibrating elements 20 and the first main surface 2-1 of the support substrate 2 is determined by the thickness of the gold bumps 26, for decreasing the thickness of the whole structure.

However, a sufficient space may not be maintained due to the processing limitation of the gold bumps 26.

Each vibrating element 20 produces an air flow between the first main surface 2-1 of the support substrate 2 and the vibrating element 20 with a vibration operation of the vibrator part 23. The air flow collides with the first main surface 2-1 of the support substrate 2 to cause the damping effect of pushing upward each vibrator part 23. In this embodiment, the space forming recesses 11 are formed in the first main surface 2-1 of the support substrate 2, and thus a sufficient space m is maintained between the first main surface 2-1 and each vibrator part 23, as shown in FIG. 2, thereby decreasing the damping effect on the vibrating elements 20.

In the vibrating gyrosensor 1, the vibrating elements 20 are mounted on the first main surface 2-1 of the support substrate 2 so that the vibrator parts 23 extend opposite to the respective space forming recesses 11, and thus a sufficient space is maintained between each of the vibrator parts 23 and the support substrate 2 while maintaining the small thickness of the vibrating gyrosensor 1, as shown in FIG. 2. As a result, when the vibrator parts 23 vibrate in the thickness direction, the damping effect is decreased, thereby securing a stable detection operation of each vibrating element 20.

The space forming recesses 11 are optimized according to the dimensions of the vibrator parts 23 of the vibrating elements 20 and formed in the support substrate 2. In this embodiment, when each of the vibrating elements 20 is formed with dimension values, which will be described below, the aperture dimension of each of the space forming recesses 11 is 2.1 mm×0.32 mm and the depth dimension k (refer to FIG. 2) is k≧p/2+0.05 mm wherein p is the maximum amplitude of the vibrator parts 23. When the space forming recesses 11 having this structure are formed in the support substrate 2, the height dimension is suppressed to permit thinning, and the influence of the damping effect on the vibrating elements 20 is decreased to maintain a high Q factor and permit stable detection of a motion such as motion blurring or the like with high sensitivity.

Next, the structure of the vibrating elements 20 will be described in detail.

(Gold Bump)

Each of the vibrating elements 20 is mounted on the vibrating element mount region 13 so that the second main surface (22-2) of the base part 22, which includes a second main surface 21-2 of a silicon substrate 21 as described below, forms a fixed surface (mounting surface) to the support substrate 2. As shown in FIG. 4, first to fourth terminal parts 25A to 25D (hereinafter generically referred to as "terminal parts 25" unless otherwise specified) are formed on the mounting surface 22-2 of the base part 22, and first to fourth gold bumps 26A to 26D (hereinafter generically referred to as "gold bumps 26" unless otherwise specified) are formed as metal protrusions on the terminal parts 25, respectively.

The terminal parts 25 of each vibrating element 20 are formed corresponding to the respective lands 4 formed in the wiring pattern 5 on the support substrate 2. Therefore, each of the terminal parts 25 is aligned with the corresponding land 4 and combined with the support substrate 2. In this state, the vibrating elements 20 are pressed against the support substrate 2 under application of ultrasonic waves to weld the terminal parts 25 to the respective lands 4 through the gold bumps 26. As a result, the vibrating elements 20 are mounted on the support substrate 2. In this way, when the vibrating elements 20 are mounted with the gold bumps 26 having a predetermined height, each of the vibrator parts 23 performs a predetermined vibration motion while the second main surface (substrate-facing surface) 23-2 being maintained at a predetermined height from the first main surface 2-1 of the support substrate 2.

In this embodiment, the efficiency of the mounting step is improved by surface-mounting the vibrating elements 20 on the support substrate 2. The connectors used in the surface-mounting process are not limited to the above-descried gold bumps 26, and various other metal protrusions generally used in semiconductor processes, such as solder balls, copper bumps, or the like, may be used. In this embodiment, a process for manufacturing the main body device includes reflow soldering for connecting and fixing the mounting terminal parts 116 of the support substrate 2 to respective lands of the control substrate 100 through bumps 117, and thus the gold bumps 26 having high heat resistance and high workability are used as the connectors.

In a vibrating gyrosensor, mechanical quality factor (Q factor) is determined by a structure for fixing a vibrating element to a support substrate. In this embodiment, the vibrating elements 20 are mounted on the support substrate 2 through the gold bumps 26 so that the base part 22 floats on the first main surface 2-1 of the support substrate 2. Therefore, the damping rate at the end of each vibrator part 23 is increased to achieve a satisfactory Q factor, as compared with a case in which a base part is entirely bonded to a support substrate, for example, through an adhesive layer. In addition, when the base part 22 is fixed at a plurality of positions of the first main surface 2-1 of the support substrate 2, a satisfactory Q factor is obtained as compared with a structure in which the base part 22 is fixed at one position. Therefore, the base part 22 is fixed at the four corners on the support substrate 2, thereby achieving a satisfactory Q factor.

The gold bumps 26 may be provided in such a manner that the center of gravity of the whole is positioned in the range of the width dimension t6 (refer to FIG. 9) with respect to the longitudinal center axis of each vibrator part 23. By disposing the gold bumps 26 in this manner, each vibrator part 23 may stably vibrate in the thickness direction without breaking a transverse balance.

Furthermore, each of the gold bumps 26 is formed outside a region having a radius of 2 times the width dimension t6 of the vibrator parts 23 from the base end of each vibrator part 23 projected from the base part 22. Therefore, the operation of absorbing the vibration of the vibrator part 23 by the gold bumps 26 is decreased to maintain the high Q factor.

In addition, at least one gold bump 26 is formed within a region of 2 times the thickness dimension t1 (refer to FIG. 8) of the base part 22 from the base end of each vibrator part 23. Therefore, the vibration of each vibrator part 23 is not transmitted to the base part 22, thereby preventing the occurrence of a shift of the resonance frequency.

Furthermore, each of the gold bumps 26 may be a two-stage bump, and fifth gold bumps may be formed as dummies not involved in electric connection on the second main surface of each of the base parts 22. In this case, of course, dummy terminal parts to which the respective fifth gold bumps are welded are formed on the support substrate 2.

(Element Shape)

Figure 8:
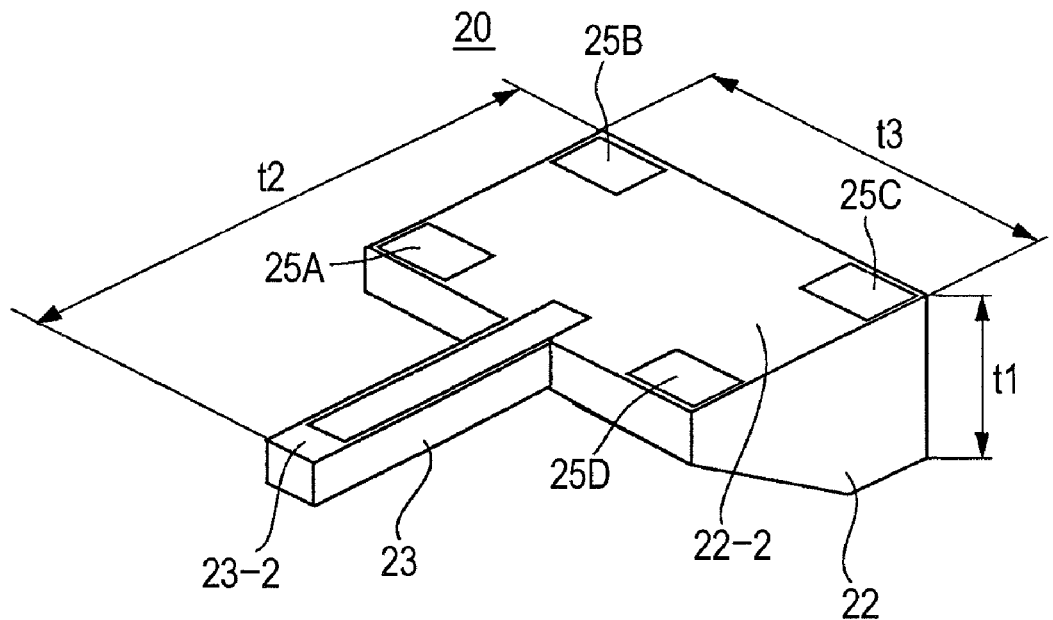
FIG. 8 is a perspective view of the whole of the vibrating element, as viewed from the bottom.

As shown in FIG. 8, in each of the vibrating elements 20 according to this embodiment, the vibrator part 23 has the second main surface (substrate-facing surface) 23-2 coplanar with the second main surface (mounting surface) 22-2 of the base part 22 and is projected in a cantilever manner in which one end is integrated with the base part 22. As shown in FIG. 2, the vibrator part 23 has an upper surface 23-1 stepped down from the first main surface (upper surface) 22-1 of the base part 22 so as to have a predetermined thickness. The vibrator part 23 has predetermined length and sectional area and includes a cantilever beam formed integrally with one side 22-3 of the base part 22 and having a rectangular cross-section.

Figure 9:
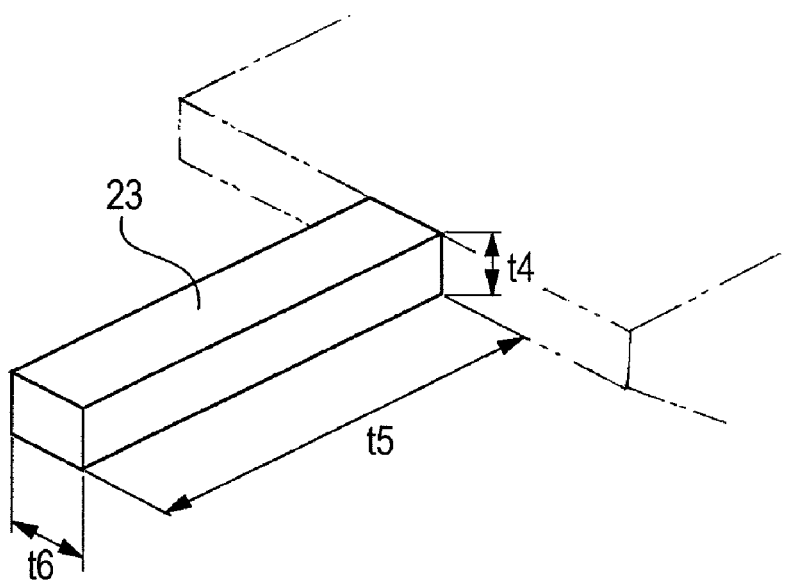
FIG. 9 is a perspective view of a vibrator part of the vibrating element.

Also, as shown in FIG. 8, the base part 22 of each vibrating element 20 has a thickness t1 of 300 μm, a length dimension t2 of 3 mm to the tip of the vibrator part 23, and a width dimension t3 of 1 mm. As shown in FIG. 9, the vibrator part 23 of each vibrating element 20 has a thickness dimension t4 of 100 μm, a length dimension t5 of 2.5 mm, and a width dimension t6 of 100 μm. As described in detail below, each of the vibrating elements 20 vibrates with a driving voltage at a predetermined frequency applied from a driving detector circuit part 50, but vibrates at a resonance frequency of 40 kHz due to the above-descried shape. The structure of each vibrating element 20 is not limited to the above-described structure, and the structure may be variously determined according to the frequency used and the intended whole shape.

Furthermore, each of the vibrating elements 20 may be formed so as to satisfy the conditions below for each of the base part 22 and the vibrator part 23. Namely, each base part 22 is formed with a width dimension t3 which is 2 times or more the width dimension t6 of the vibrator part 23, and the center of gravity is positioned within a region of 2 times the width dimension t6 of the vibrator part 23 with respect to the longitudinal center axis of the vibrator part 23. In this structure, each vibrator part 23 satisfactorily vibrates without breaking a transverse balance. In addition, when the thickness dimension t1 of each base part 22 is 1.5 times the thickness dimension of the vibrator part 23, the mechanical strength of the base part 22 is maintained to prevent the base part 22 from vibrating due to the vibration of the vibrator part 23, thereby preventing the occurrence of a shift of the resonance frequency.

(Piezoelectric Film and Various Electrode Layers)

In each of the vibrating elements 20, as shown in FIG. 4, a reference electrode layer (first electrode layer) 27, a piezoelectric thin film layer 28, and a driving electrode layer (second electrode layer 28) are laminated on the second main surface (substrate-facing substrate) 23-2 of the vibrator part 23 over the entire length in the length direction in the process for producing the vibrating elements, which will be described below. Also, a pair of detection electrodes 30R and 30L (hereinafter generically referred to as "detection electrodes 30" unless otherwise specified) is formed with the driving electrode layer 29 therebetween on the second main surface (substrate-facing surface) 23-2 of each vibrator part 23. The driving electrode layer 29 and the detection electrodes 30 constitute the second electrode layer.

The reference electrode layer 27 serving as the first layer is formed on the second main surface (substrate-facing surface) 23-2 of each vibrator part 23, and the piezoelectric thin film layer 28 having substantially the same length as that of the reference electrode layer 27 is formed thereon. The driving electrode layer 29 having substantially the same length as that of the piezoelectric thin film layer 28 and a smaller width than that thereof is formed at the central portion of the piezoelectric thin film layer 28 in the width direction. Furthermore, the pair of the detection electrodes 30R and 30L is laminated on the piezoelectric thin film layer 28 to hold the driving electrode layer 29 therebetween.

(Lead and Terminal Part)

As shown in FIG. 4, in each of the vibrating elements 20, a first lead 31A is formed on the second main surface (mounting surface) 22-2 of the base part 22, for connecting the reference electrode layer 27 to the first terminal part 25A, and a third lead 31C is formed for connecting the driving electrode layer 29 to the third terminal part 25C. Similarly, on the mounting surface 22-2 of the base part 22, a second lead 31B is formed for connecting the first detection electrode 30R to the second terminal part 25B, and a fourth lead 31D is formed for connecting the second detection electrode 30L to the fourth terminal part 25D. Hereinafter, the leads 31A to 31D are generically referred to as "leads 31" unless otherwise specified.

The first lead 31A is integrally extended from the base end of the reference electrode layer 27 formed on each vibrator part 23 to the base part 22 and connected to the first terminal part 25A formed at a corner of the second main surface (mounting surface) 22-2 of the base part 22 on the side to which the vibrator part 23 is integrally formed. The driving electrode layer 29 and the detection electrodes 30 each have a slightly wide base end extending from the vibrator part 23 to the base part 22, the slightly wide base ends being covered with a planarizing layer 24.

The second lead 31B is formed so that an end thereof crosses over the planarizing layer 24, extended to the rear corner opposite to the first terminal part 25A along one side of the base part 22, and connected to the second terminal part 25B formed at this corner. The third lead 31C is formed so that an end crosses over the planarizing layer 24, extended rearward through a substantially central portion of the base part 22 and also extended to a corner opposite to the second terminal part 25B along the rear side end, and connected to the third terminal part 25C formed at this corner. The fourth lead 31D is also formed so that an end crosses over the planarizing layer 24, extended to the other corner opposite to the third terminal part 25C on the front side along the other side of the base part 22, and connected to the fourth terminal part 25D formed at this corner.

In each of the vibrating elements, the terminal parts 25 are formed at proper optimum positions with a proper number on the second main surface (mounting surface) 22-2 of the base part 22 regardless of the above-descried structure. Also, in each of the vibrating elements 20, of course, the connection pattern between the leads of the electrode layers and the respective terminal parts 25 is not limited to the above, and the connection pattern is appropriately formed on the second surface of each base part 22 according to the positions and number of the terminal parts 25.

(Insulating Protective Layer)

In each of the vibrating elements 20, as shown in FIGS. 2 and 4, an insulating protective layer 45 is formed on the second main surface 21-2 to cover the base part 22 and the vibrator part 23. The insulating protective layer 45 has a three-layer structure including a first alumina (aluminum oxide: $Al_2O_3$) layer 46 as a first layer, a silicon oxide ($SiO_2$) layer 47 as a second layer, and a second alumina layer 48 as a third layer.

As shown in FIG. 2, the insulating protective layer 45 has a terminal aperture 49 corresponding to the formation region of each of the terminal parts 25 so that each terminal part 25 is exposed to the outside through the terminal aperture 49. In each of the vibrating elements 20, as shown in FIG. 2, the gold bump 26 is formed on each terminal part 25 so as to project from the terminal aperture 49.

The insulating protective layer 45 is formed so that the second main surface 21-2 of the silicon substrate 21 is exposed in a frame form between the outer peripheries of each base part 22 and each vibrator part 23 and the outer peripheries of the reference electrode layer 27 and the terminal parts 25. The insulating protective layer 45 is formed so as not to cover the exposed peripheral portion of the second main surface 21-2, thereby preventing peeling of the insulating protective layer 45 from the peripheral region during the step of cutting out each vibrating element 20, which will be described below. The insulating protective layer 45 is formed with a width dimension of, for example, 98 μm, in each vibrator part 23 having a width dimension t6 of 100 μm.

The insulating protective layer 45 includes the first alumina layer 46 having a thickness dimension of, for example, 50 nm. The first alumina layer 46 functions as an under adhesive layer for improving the adhesion to the main surfaces of the base part 22 and the vibrator part 23. Therefore, the insulating protective layer 45 is strongly deposited on each vibrator part 23 performing vibration to prevent the occurrence of peeling or the like.

The silicon oxide layer 47 functions to cut off moisture and the like in air and prevent the adhesion thereof to each electrode layer, and also functions to suppress oxidation of each electrode layer, electrically insulate each electrode, or mechanically protect each electrode thin film layer and the piezoelectric thin film layer 28. The uppermost second alumina layer 48 functions to improve the adhesion to a resist layer formed for forming each vibrator part 23 on the silicon substrate 21 by a outer shape grooving step, which will be described below, and prevent damage to the silicon oxide layer 47 with an etching agent.

The silicon oxide layer 47 is formed to a thickness of at least two times the thickness of a second electrode layer 42 and 1 μm or less. Also, the silicon oxide layer 47 is deposited on the first alumina layer 46 by sputtering in an argon gas atmosphere at 0.4 Pa or less. Since the silicon oxide layer 47 has the above-described thickness, the insulating protective layer 45 exhibits a sufficient insulating protective function and prevents the occurrence of burr during deposition. The silicon oxide layer 47 is formed with a high film density by deposition under the above-described sputtering conditions.

(Alignment Mark)

In the vibrating gyrosensor 1, in order to precisely position and mount the first and second vibrating elements 20X and 20Y having the same shape on the support substrate 2, the position of each land 4 on the support substrate 2 is recognized with a mounting machine. Therefore, alignment marks 32A and 32B (hereinafter generically referred to as "alignment marks 32") are provided on the first main surface (upper surface) 22-1 of the base part 22 of each vibrating element 20, in order to position and mount each vibrating element 20 on the corresponding land 4 recognized by the mounting machine.

As shown in FIGS. 1 and 4, the alignment marks 32 include a pair of rectangular portions of a metal foil or the like formed with a space therebetween in the width direction on the first main surface (upper surface) 22-1 of each base part 22. After the alignment marks 32 are read by the mounting machine to produce mounting data about the position and attitude relative to the support substrate 2, each vibrating element 20 may be precisely positioned and mounted on the support substrate 2 on the basis of the mounting data and the data of the lands 4.

Although the alignment marks 32 are formed on the first main surface of the base part 22 of each vibrating element 20, the alignment marks are not limited to this. The alignment marks 32 composed of, for example, a conductor, may be formed at proper positions avoiding the terminal parts 25 and the leads 31 on the second main surface (mounting surface) 22-2 of each base part 22, for example, at the same time as a wiring step. As described in detail below, the alignment marks 32 are preferably positioned and formed in conformity with reference markers used for reactive etching using an inductively coupled plasma apparatus which is used for forming the electrode layers of each vibrating element 20 and used in the outer shape grooving step for forming the vibrator part 23. The alignment marks 32 may be formed with a precision of 0.1 μm or less on each vibrator part 23 using a stepper exposure device.

The alignment marks 32 are formed by an appropriate method. For example, when the alignment marks 32 are formed on the second main surface (mounting surface) 22-2 of each base part 22 by patterning a first electrode layer 40 including a titanium layer and a platinum layer as described below, the marks are read in the mounting step to obtain a high contrast in image processing, thereby improving the mounting precision.

(Cover)

Next, the cover 15 for shielding the first main surface 2-1 of the support substrate 2 will be described in detail.

In the vibrating gyrosensor 1, displacement of each vibrating element 20 due to the Coriolis force produced by motion blurring is detected by the piezoelectric thin film layer 28 and the detection electrodes 30 formed on the vibrating element 20 to output a detection signal, as described in detail below. When light is applied to the piezoelectric thin film layer 28, a voltage occurs due to a pyroelectric effect, and the pyroelectric voltage affects a detection operation to decrease the detection properties.

In the vibrating gyrosensor 1, the component mounting space 3 formed by the support substrate 2 and the cover member 15 is shielded from light, and thereby a decrease in the characteristics due to the influence of external light is prevented. As shown in FIG. 1, the outer periphery of the support substrate 2 is stepped down from the first main surface 2-1 along the whole periphery to flange the component mounting region 6 and form a light-shielding step 9 including a vertical wall, and consequently a cover fixing part 10 is formed. The cover member 15 including a metal thin plate is bonded, by resin bonding, to the cover fixing part 10 of the support substrate 2 over the whole periphery, and thus the component mounting region 6 is closed and made dustproof and moisture proof and to form a light-shielding space.

As shown in FIG. 1, the cover member 15 is formed in a box-like shape as a whole, which includes a main surface part 16 having outer dimensions sufficient to cover the component mounting region 6 of the support substrate 2 and a peripheral wall part 17 integrally formed by bending the main surface part 16 along the entire periphery thereof. The cover member 15 is formed with a height dimension sufficient to form the component mounting space 3 in which the vibrator part 23 of each vibrating element 20 vibrates when the peripheral wall part 17 is combined with the support substrate 2. The cover member 15 has a peripheral flange 18 integrally formed by bending the peripheral wall part 17 along the entire opening edge thereof, the peripheral flange 18 being slightly narrower than the cover fixing part 10 formed in the support substrate 2. Although not shown in the drawings, the peripheral flange 18 has a ground projection to be connected to a ground terminal on the control substrate 100 when the vibrating gyrosensor 1 is mounted on the control substrate 100.

The cover member 15 includes a metal thin plate and thus maintains the light weight of the vibrating gyrosensor 1. However, the cover member 15 may not exhibit the sufficient light shielding function due to a decrease in the light shielding property for external light at the infrared wavelengths. Therefore, according to this embodiment, all surfaces of the main surface part 16 and the peripheral wall part 17 are coated with, for example, an infrared absorbing paint, which absorbs light at the infrared wavelengths, to form a light shielding layer 19, so that radiation of external light at the infrared wavelengths into the component mounting space 3 is cut off to permit a stable operation of each vibrating element 20. The light shielding layer 19 may be formed on both the front and back main surfaces by dipping in an infrared absorbing paint solution, or may be formed by black chromium plating, black dyeing, or black anodization.

As described above, in the vibrating gyrosensor 1, the cover member 15 is combined with the support substrate 2 by placing the peripheral flange 18 on the cover fixing part 10 and bonding them together with an adhesive, thereby forming the closed, light-shielding component mounting space 3. However, external light may pass through the adhesive disposed in the space between the cover fixing part 10 and the peripheral flange 18 which are bonded together, and enter the component mounting space 3. In this embodiment, therefore, the cover fixing part 10 is stepped drawn from the main surface 1-2 of the support substrate 2 through the light shielding step 9, as described above. As a result, external light transmitted through the adhesive layer is cut off by the light shielding step 9.

In this embodiment, like other component members, the cover member 15 is combined with the support substrate 2 by the surface mounting method, and thus the assembly step is rationalized. In the vibrating gyrosensor 1, since the cover member 15 is fixed to the stepped cover fixing part 10 of the support substrate 2, the thickness is decreased, and adhesive flowing into the component mounting region 6 is prevented. Also, the component mounting space 3 functions as a dust-proof and moisture-proof space as well as a light-shielding space, thereby preventing the occurrence of a pyroelectric effect in each vibrating element 20 and permitting the stable detection of a motion such as motion blurring or the like.

(Circuit Configuration)

Next, a circuit configuration for driving the vibrating gyrosensor 1 will be described with reference to FIG. 7.

The vibrating gyrosensor 1 includes a first driving detector circuit part 50X and a second driving detector circuit part 50Y which are connected to the first vibrating element 20X and the second vibrating element 20Y, respectively, and which each include the IC circuit element 7, the electronic components 8, and the like. The first and second driving detector circuit parts 50X and 50Y have the same circuit configuration and are thus generically referred to as "driving detector circuit parts 50" hereinafter. Each of the driving detector circuit parts 50 include an impedance coveter circuit 51, an adding circuit 52, an oscillator circuit 53, a differential amplifier circuit 54, a synchronous detector circuit 55, and a DC amplifier circuit 56.

Figure 7:
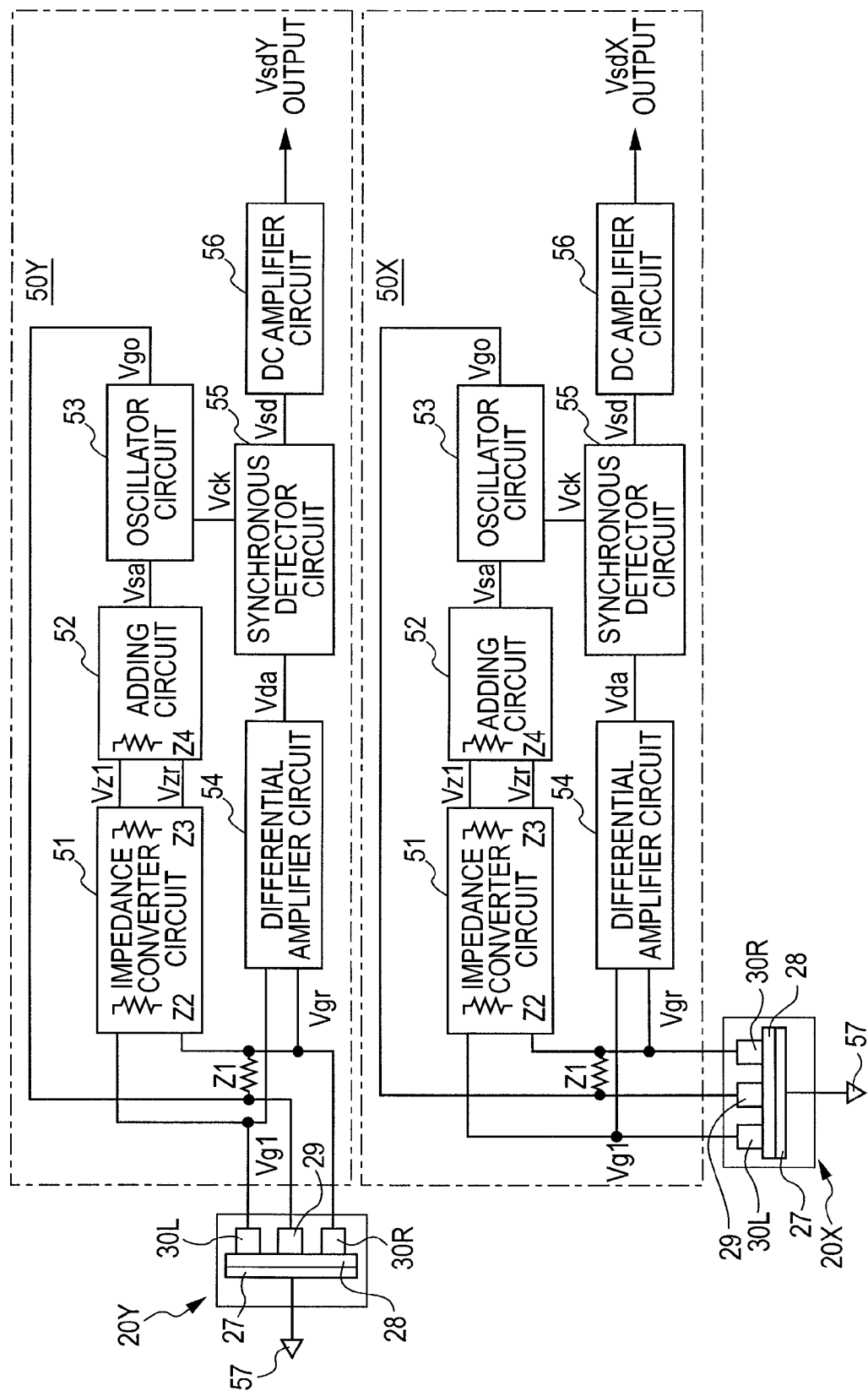
FIG. 7 is a block diagram of a circuit of the vibrating gyrosensor.

As shown in FIG. 7, in each of the driving detector circuit parts 50, the impedance converter circuit 51 and the differential amplifier circuit 54 are connected to each of the first and second detection electrodes 30L and 30R of each vibrating element 20. The adding circuit 52 is connected to the impedance converter circuit 51, and the oscillator circuit 53 connected to the adding circuit 52 is connected to the driving electrode layer 29. The synchronous detector circuit 55 is connected to the differential amplifier circuit 54 and the oscillator circuit 53, and the DC amplifier circuit 56 is connected to the synchronous detector circuit 55. Furthermore, the reference electrode layer 27 of each vibrating element 20 is connected to the reference potential 57 on the support substrate 2.

In each of the driving detector circuit parts 50, the vibrating element 20, the impedance converter circuit 51, the adding circuit 52, and the oscillator circuit 53 constitute a self-exited oscillator circuit. When oscillation voltage Vgo at a predetermined frequency is applied to the driving electrode layer 29 from the oscillator circuit 53, natural oscillation occurs in the vibrator part 23 of each vibrating element 20. The output Vgr from the first detection electrode 30R and the output Vgl from the second detection electrode 30L of each vibrating element 20 are supplied to the impedance converter circuit 51, and outputs Vzr and Vzl are output to the adding circuit 52 from the impedance converter circuit 51 on the basis of the inputs Vgr and Vgl, respectively. The adding circuit 52 outputs adding output Vsa to the oscillator circuit 53 on the basis of these inputs.

The outputs Vgr and Vgl from the first and second detection electrodes 30R and 30L, respectively, of each vibrating element 20 are supplied to the differential amplifier circuit 54. When each vibrating element 20 detects motion blurring, a difference occurs between the outputs Vgr and Vgl in the driving detector circuit part 50, and thus a predetermined output Vda is produced from the differential amplifier circuit 54. The output Vda from the differential amplifier circuit 54 is supplied to the synchronous detector circuit 55. The synchronous detector circuit 55 synchronously detects the output Vda, converts it to a DC signal Vsd, and supplies the DC signal Vsd to the DC amplifier circuit 56 to output the DC signal Vsd after predetermined DC amplification.

The synchronous detector circuit 55 integrates the output Vda of the differential amplifier circuit 54 after full-wave rectification with the timing based on a clock signal Vck which is output from the oscillator circuit 53 synchronously with the driving signal, thereby producing the DC signal Vsd. As described above, each of the driving detector circuit parts 50 amplifies the DC signal Vsd by the DC amplifier circuit 56 and then outputs it, and, as a result, an angular velocity signal produced by motion blurring is detected.

In each of the driving detector circuit parts 50, the impedance converter circuit 51 produces low impedance output Z3 in a high-impedance input Z2 state to exhibit the function to separate between the impedance Z1 between the first and second detection electrodes 30R and 30L and the impedance Z4 between the inputs of the adding circuit 52. By providing the impedance converter circuit 51, a large output difference is obtained from the first and second detection electrodes 30R and 30L.

In each of the driving detector circuit parts 50, the above-described impedance converter circuit 51 exhibits only the impedance converting function for the input and output without significantly affecting the magnitude of a signal. Therefore, the magnitude of the output Vgr from the first detection electrode 30R is same as that of the output Vzr of the impedance converter circuit 51, and the magnitude of the output Vgl from the second detection electrode 30L is the same as that of the output Vzl of the impedance converter circuit 51. In each of the driving detector circuit parts 50, even when the vibrating element 20 detects motion blurring to produce a difference between the output Vgr from the first detection electrode 30R and the output Vgl from the second detection electrode 30L, the difference is held in the output Vsa from the adding circuit 52.

In each of the driving detector circuit parts 50, for example, even when noise is superposed by a switching operation or the like, components other than a resonance frequency component are removed by a function similar to a band filter in the vibrating element 20 to remove the noise component superposed on the output Vgo from the oscillator circuit 53, thereby obtaining the high-precision output Vda not including the noise component from the differential amplifier circuit 54. In the vibrating gyrosensor 1, the driving detector circuit parts 50 are not limited to the above. The driving detector circuit parts may be formed so that displacement due to motion blurring of each vibrator part 23 performing natural vibration is detected by the piezoelectric thin film layer 28 and a pair of the detection electrodes 30, and detection output is obtained by appropriate processing.

As described above, the vibrating gyrosensor 1 includes the first vibrating element 20X for detecting an angular velocity around the X-axis direction and the second vibrating element 20Y for detecting an angular velocity around the Y-axis direction. The first driving detector circuit part 50X connected to the first vibrating element 20X produces the detection output VsdX in the X-axis direction, and the second driving detector circuit part 50Y connected to the second vibrating element 20Y produces the detection output VsdY in the Y-axis direction. In the vibrating gyrosensor 1, the operating frequency of each of the first and second vibrating elements 20X and 20Y may be set in a range of several kHz to several hundreds kHz. When a difference (fx−fy) between the operating frequency fx of the first vibrating element 20X and the operating frequency fy of the second vibrating element 20Y is 1 kHz or more, cross talk is decreased to permit the precision detection of vibration.

According to demand, the driving detector circuit parts 50 include respective filter amplifier circuits for selectively amplifying detection signals at the operation frequencies fx and fy of the vibrating elements 20X and 20Y, which are contained in the outputs of the adding circuits 52, and supplying the amplified detection signals to the oscillator circuits 53.

(Method for Manufacturing Vibrating Gyrosensor)

Figure 10:
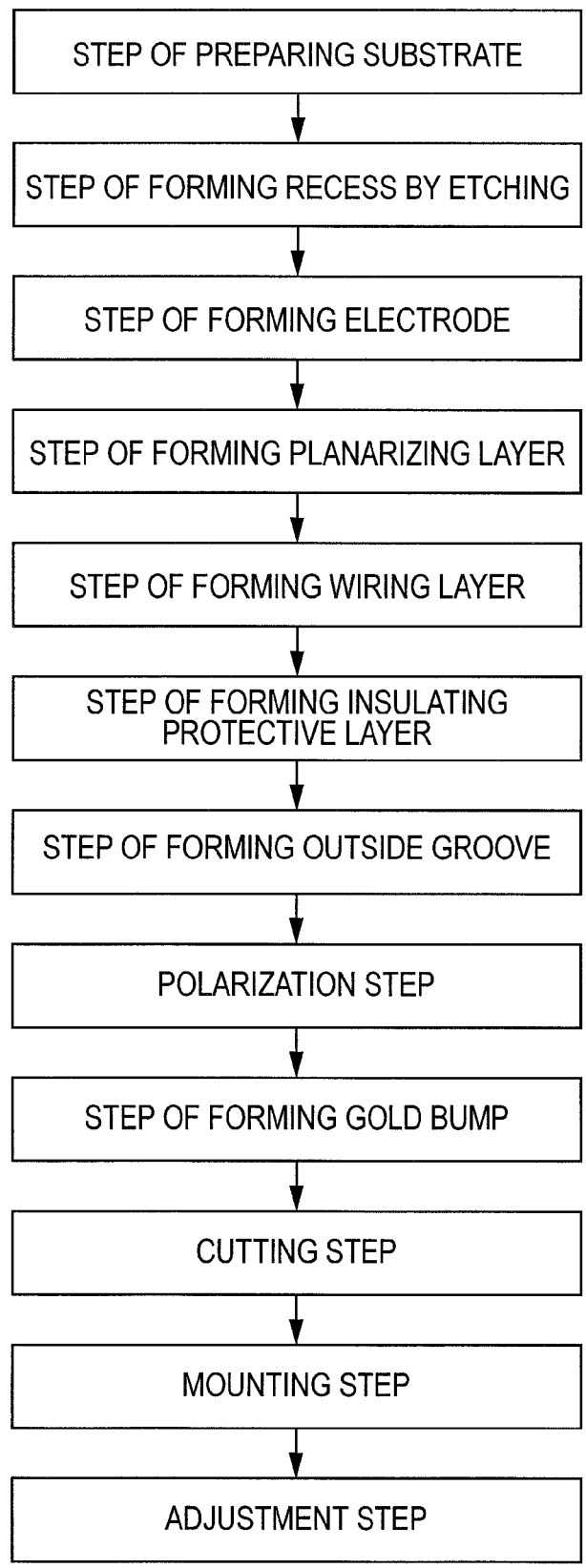
FIG. 10 is a flow chart of main steps of a method for manufacturing the vibrating gyrosensor.

The method for manufacturing the vibrating gyrosensor 1 according to this embodiment will be described below. FIG. 10 is a flow chart showing principal steps of the method for manufacturing the vibrating gyrosensor 1.

Figure 11:
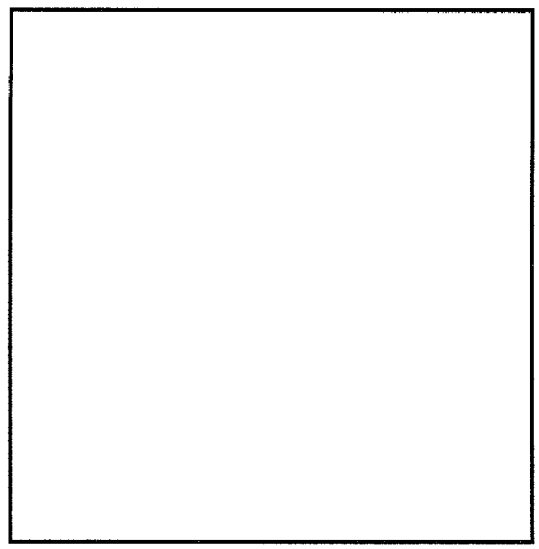
FIG. 11 is a plan view of a silicon substrate used in a process for manufacturing a vibrating element.
Figure 12:
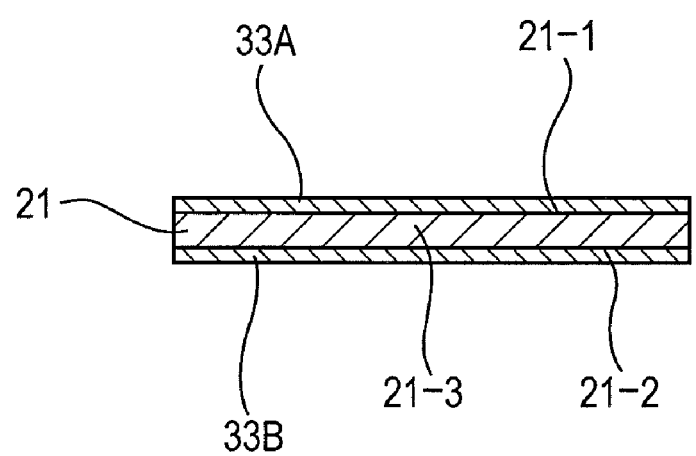
FIG. 12 is a sectional view of the silicon substrate shown in FIG. 11.

The vibrating gyrosensor 1 is produced by simultaneously forming many vibrating elements 20 using, as a base material, the silicon substrate 21 which is cut out so that the main surface 21-1 is a (100) orientation plane, and the side 21-3 is a (110) orientation plane, as shown in FIGS. 11 and 12, and then cutting the substrate into the respective vibrating elements 20 by a cutting step.

(Step of Preparing Substrate)

The outer dimensions of the silicon substrate 21 are determined according to the specifications of the equipment used in the process, for example, 300×300 mm. The silicon substrate 21 is not limited to a substrate having a rectangular planar shape as shown in FIG. 11, and a wafer-shaped substrate having a circular planar shape may be used. The thickness of the silicon substrate 21 is determined depending on the workability, cost, and the like, but the thickness may be larger than the thickness dimension of at least the base part 22 of each vibrating element 20. As described above, since the base part 22 has a thickness of 300 μm, and the vibrator part 23 has a thickness of 100 μm, the substrate 21 having a thickness of 300 μm or more is used.

As shown in FIG. 12, silicon oxide films ($SiO_2$ films) 33A and 33B (generically referred to as "silicon oxide films 33" hereinafter unless otherwise specified) are formed, by thermal oxidation, over the entire surfaces of the first main surface 21-1 and the second main surface 21-2, respectively, of the silicon substrate 21. The silicon oxide films 33 function as protective films in anisotropic etching of the crystal of the silicon substrate 21, as described below. The silicon oxide films 33 are formed to a proper thickness as long as a protective film function is exhibited, but the silicon oxide films 33 are formed to a thickness of, for example, about 0.3 μm.

(Step of Forming Etched Recess)

The process for producing the vibrating elements includes a step similar to a thin film step of a semiconductor process. Namely, the process includes a step of etching the first main surface 21-1 of the silicon substrate 21 to form the etched recesses 37 with a predetermined depth dimension, for forming the vibrator parts 23 of the respective vibrating elements 20.

As shown in FIGS. 13 to 19, the etched recess forming step includes a step of forming a photoresist layer 34 on the first main surface 21-1 of the silicon substrate 21, a step of patterning the photoresist layer 34 to form photoresist layer apertures 35 in the photoresist layer 34 corresponding to the formation portions of the respective etched recesses 37, a first etching step of removing the silicon oxide film 33A exposed in the photoresist layer apertures 35 to form silicon oxide film apertures 36, and a second etching step of forming the etching recesses 37 in the respective silicon oxide film apertures 36.

In the step of forming the photoresist layer, a photoresist material is applied over the entire surface of the silicon oxide film 33A formed on the first main surface 21-1 of the silicon substrate 21 to form the photoresist layer 34. The step of forming the photoresist layer uses, for example, a photosensitive photoresist material, OFPR-8600 manufactured by Tokyo Ohka Kogyo Co., Ltd., as the photoresist material. The photoresist material is applied and then heated by pre-baking with microwaves to remove moisture, thereby forming the photoresist layer 34 on the silicon oxide film 33A.

Figure 13:
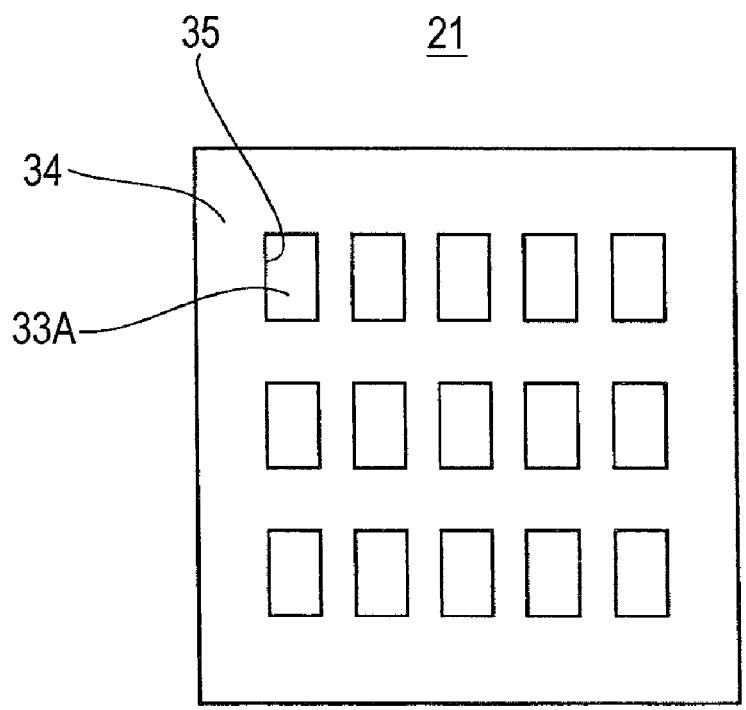
FIG. 13 is a plan view of the silicon substrate on which vibrating element formation portions are formed in a photoresist layer by patterning.
Figure 14:
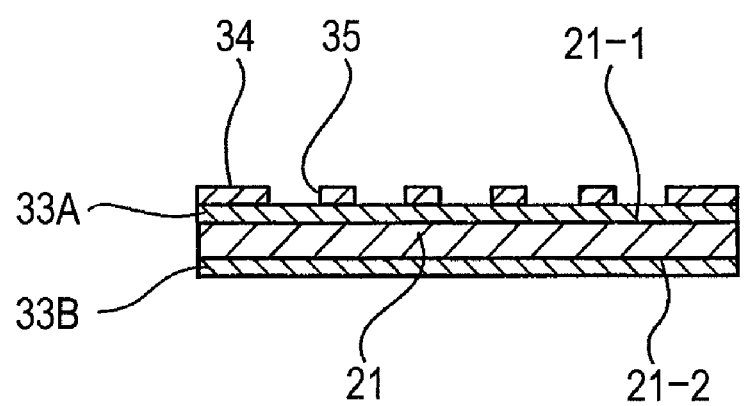
FIG. 14 is a sectional view of the silicon substrate shown in FIG. 13.

In the step of patterning the photoresist, the photoresist layer 34 is masked so that a portion for forming each silicon oxide film aperture 36 is opened, and then subjected to exposure and development. Then, the photoresist layer 34 is removed from a portion corresponding to each silicon oxide film aperture 36 to simultaneously form the many photoresist layer apertures 35 in each of which the silicon oxide film 33A is exposed, as shown in FIGS. 13 and 14. As shown in FIG. 13, 3×5 photoresist layer apertures 35 are formed on the silicon substrate 21 so that 15 vibrating elements 20 are simultaneously formed through the steps described below.

In the first etching step, the silicon oxide film 33A exposed from each photoresist layer aperture 35 is removed. In the first etching step, in order to maintain the smoothness of the interface of the silicon substrate 21, a wet etching method is used for removing only the silicon oxide film 33A. However, the etching method is not limited to this, and appropriate etching, such as ion etching or the like, may be used.

Figure 15:
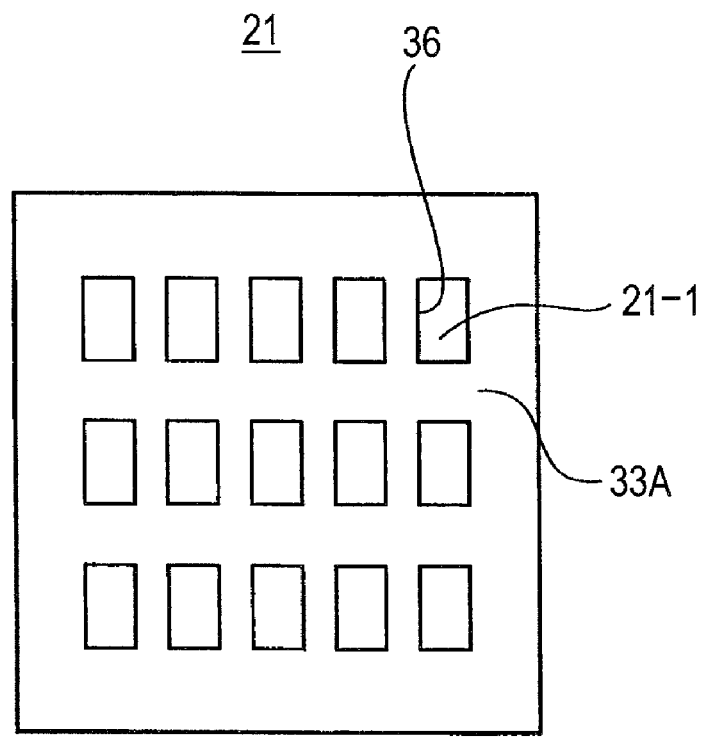
FIG. 15 is a plan view of the silicon substrate on which vibrating element formation portions are formed in a silicon oxide film by patterning.
Figure 16:
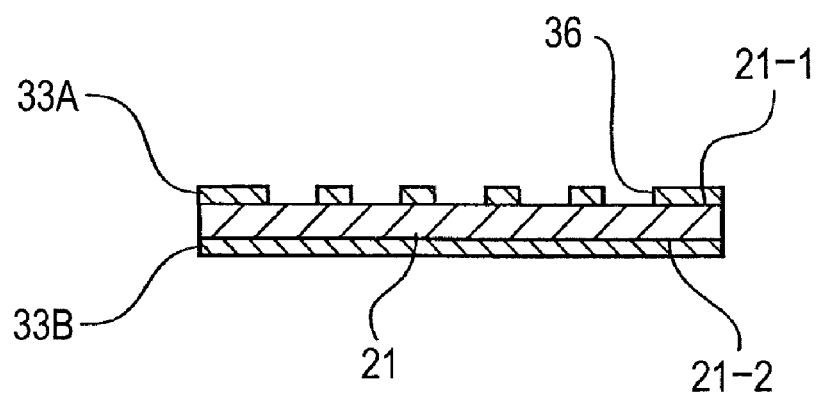
FIG. 16 is a sectional view of the silicon substrate shown in FIG. 15.

In the first etching step, for example, an ammonium fluoride solution is used as an etchant for removing the silicon oxide film 33A to form the silicon oxide film apertures 36. As shown in FIGS. 15 and 16, as a result, the first main surface 21-1 of the silicon substrate 21 is partially exposed to the outside. In the first etching step, when etching is performed over a long time, a side etching phenomena occurs, in which etching proceeds from the sides of the silicon oxide film apertures 36. Therefore, the etching time is preferably precisely controlled so that etching is stopped at the end of etching of the silicon oxide film 33A.

In the second etching step, the etched recesses 37 are formed in the exposed portions of the first main surface 21-1 of the silicon substrate 21, the exposed portions being exposed to the outside through the respective silicon oxide film apertures 36. In the second etching step, the silicon substrate 21 is etched to leave a depth corresponding to the thickness of the vibrator parts 23 by crystal anisotropic wet etching using the property that the etching rate depends on the crystal orientation of the silicon substrate 21.

The second etching step uses, for example, a TMAH (tetramethylammonium hydroxide), KOH (potassium hydroxide), or EDP (ethylenediamine-pyrocatechol-water) solution, as the etchant. Specifically, the second etching step uses a 20% TMAH solution as the etchant, for increasing the etching ratio of the silicon oxide films 33A and 33B on the front and back surfaces. The etching is performed for 6 hours with the etchant kept at a temperature of 80° C. under stirring to form the etched recesses 37 shown in FIGS. 17 and 18.

In the second etching step, the etching is performed so that a (110) orientation plane at an angle of about 55° with respect to a (100) plane appears using the property of the silicon substrate 21 used as a base material that the etching rate of the side 21-3 is lower than that of the first and second main surfaces 21-1 and 21-2. As a result, the etched recesses 37 are formed so that the opening size of each recess 37 gradually decreases at an inclination angle of about 55° from the opening to the bottom, and an etched inclined surface 133 at an inclination angle of about 55° is formed at the inner wall of each etched recess 37.

Figure 17:
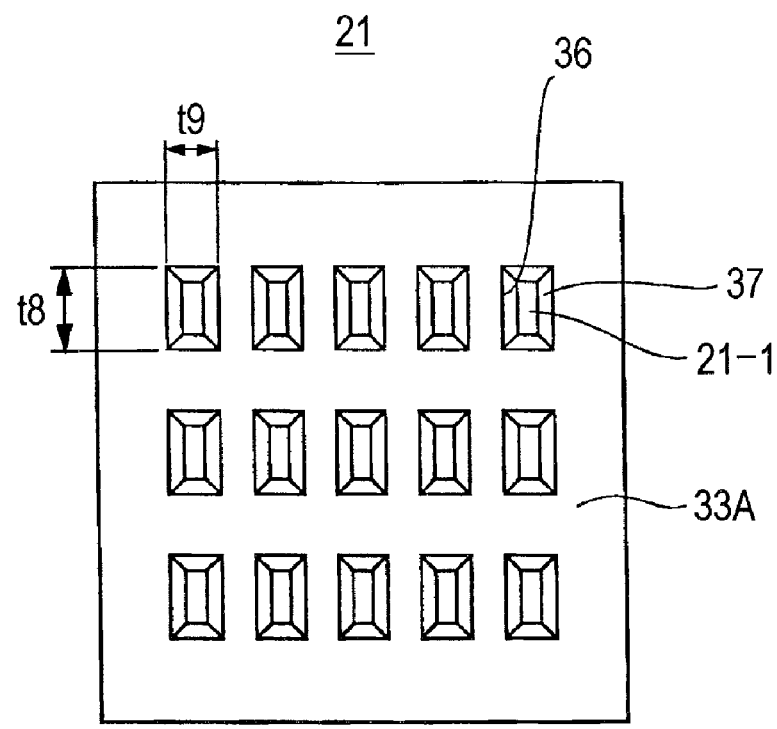
FIG. 17 is a plan view of the silicon substrate in which etched recesses are formed, the etched recesses constituting respective diaphragm parts which define the thicknesses of the respective vibrator parts.
Figure 18:
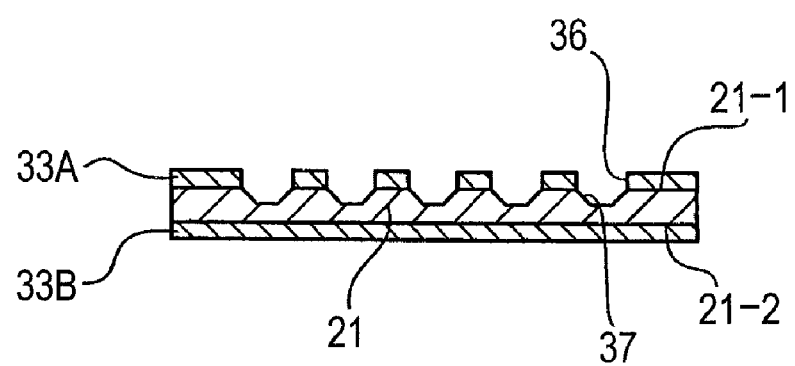
FIG. 18 is a sectional view of the silicon substrate shown in FIG. 17.
Figure 19:
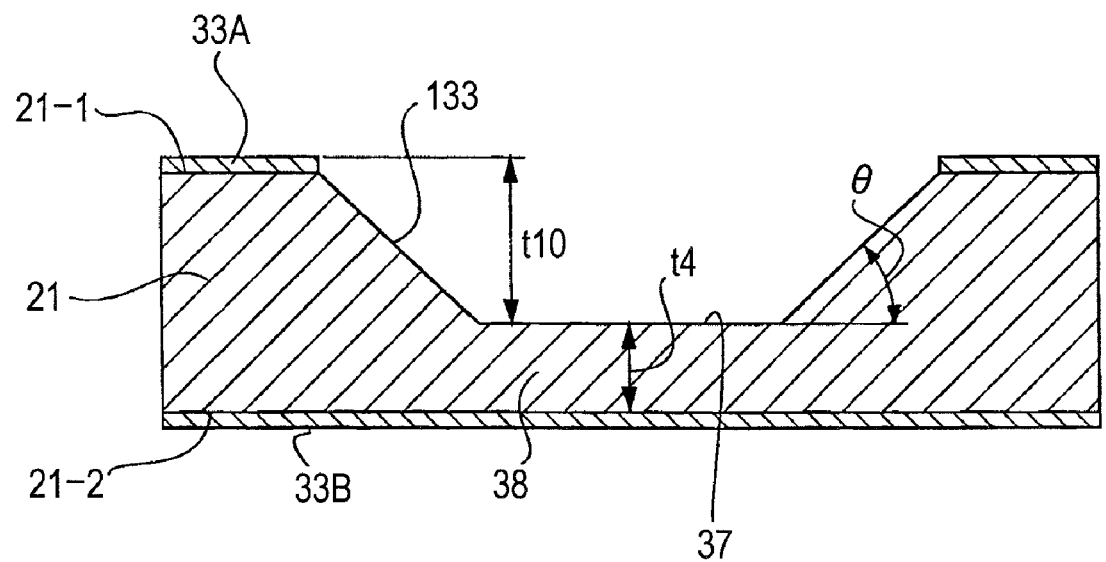
FIG. 19 is an enlarged sectional view of one etched recess.

Each of the etched recesses 37 constitutes a diaphragm part 38 for forming each vibrator part 23 by the outer shape cutting step which will be described below. As shown in FIG. 17, each of the etched recesses 37 has an aperture having a length dimension t8 and a width dimension t9. As shown in FIG. 19, each of the etched recesses 37 has a depth dimension t10 and forms a space having a trapezoidal sectional shape in which the opening size gradually decreases from the first main surface 21-1 to the second main surface 21-2.

Each of the etched recesses 37 is formed to have the inner peripheral wall inclined at an inclination angle θ of 55° toward the bottom thereof, as described above. Each of the diaphragm parts 38 is defined by the width dimension t6 and the length dimension t5 of the vibrator part 23 and the width dimension t7 (refer to FIGS. 36 and 37) of the outside groove 39 formed by cutting the silicon substrate 21 along the periphery of the vibrator part 23. The width dimension t7 of the outside groove 39 is determined by the equation, depth dimension t10×1/tan 55°.

Therefore, in each of the etched recesses 37, the opening width dimension t9 which defines the width of the diaphragm part 38 is determined by the equation, (depth dimension t10× 1/tan 55°)×2+t6 (width dimension of the vibrator part 23)+ 2×t7 (width dimension of the outside groove 39). In each of the etched recesses 37, when t10 is 200 μm, t6 is 100 μm, and t7 is 200 μm, the width dimension t9 of the opening is 780 μm.

Like in the width direction, in the length direction, each of the etched recesses 37 is formed by the above-described second etching step to have an inclined surface at an inclination angle of 55° on the inner peripheral wall. Therefore, in each of the etched recesses 37, the length dimension t8 which defines the length of the diaphragm part 38 is determined by the equation, (depth dimension t10×1/tan 55°)×2+t5 (length dimension of the vibrator part 23)+t7 (width dimension of the outside groove 39). In each of the etched recesses 37, when t10 is 200 μm, t5 is 2.5 mm, and t7 is 200 μm, the length dimension t8 of the opening is 2980 μm.

(Electrode Forming Step (Deposition))

In the above-described step of forming the etched recesses, the rectangular diaphragm parts 38 each having a predetermined thickness are formed between the bottoms of the respective etched recesses 37 and the second main surface 21-2 of the silicon substrate 21. The diaphragm parts 38 constitute the vibrator parts 23 of the respective vibrating elements 20. After the etched recesses 37 are formed, the second main surface sides of the diaphragm parts 38 are used as processed surfaces in the electrode forming step.

Figure 20:
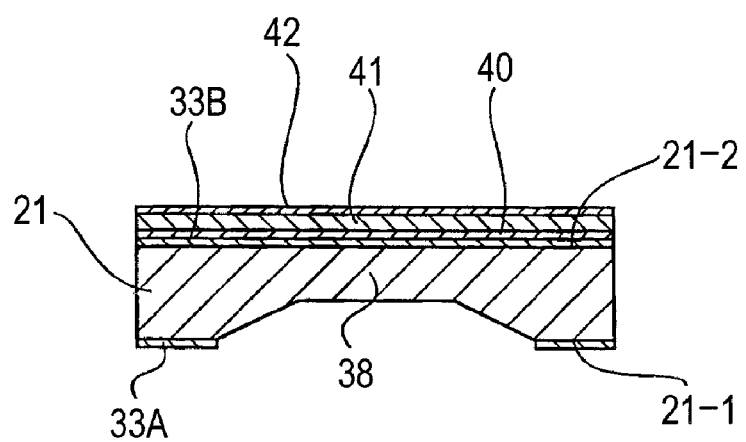
FIG. 20 is a sectional view of a principal portion in which a first electrode layer, a piezoelectric film layer, and a second electrode layer are laminated on each diaphragm part.

In the electrode forming step, the electrode layers are formed by, for example, a magnetron sputtering apparatus, on a portion of the second main surface 21-2, which corresponds to each etched recess 37, through the silicon oxide film 33B. The electrode forming step, as shown in FIG. 20, includes the steps of forming the first electrode layer 40 for forming the reference electrode layer 27 on the silicon oxide film 33B, forming a piezoelectric layer 41 for forming the piezoelectric thin film layer 28, and forming the second electrode layer 42 for forming the driving electrode layer 29 and the detection electrodes 30.

In the process for producing the vibrating elements, a step of forming a conductor layer for forming the leads 31 and the terminal parts 25 in the respective formation regions on each base part 22 is performed in conformity with the step of forming the first electrode layer 40 and the step of forming the second electrode layer 42 on each vibrator part 23.

The step forming the first electrode layer includes a step of forming a titanium thin film layer by sputtering titanium over the entire surface of the silicon oxide film 33B within a region corresponding to each vibrator part 23, and a step of forming a platinum layer on the titanium thin film layer by sputtering platinum to form the first electrode layer 40 including the two layers. In the step of forming the titanium thin film layer, the titanium thin film layer is deposited to a thickness of 50 nm or less (for example, 5 nm to 20 nm) on the silicon oxide film 33B under the sputtering conditions including, for example, a gas pressure of 0.5 Pa and a RF (radio frequency) power of 1 kW. In the step of forming the platinum layer, the platinum thin film layer is deposited to a thickness of about 200 nm on the titanium thin film layer under the sputtering conditions including, for example, a gas pressure of 0.5 Pa and a RF power of 0.5 kW.

In the first electrode layer 40, the titanium thin film layer has the function to improve the adhesion to the silicon oxide film 33B, and the platinum layer functions as a satisfactory electrode. In the step of forming the first electrode layer, as described above, the conductor layer for forming the first lead 31A and the first terminal part 25A, which extend from each diaphragm part 38 to the formation regions of the corresponding base part 22, is formed at the same time as the formation of the first electrode layer 40.

In the step of forming the piezoelectric film layer, the piezoelectric film layer 41 is deposited to a predetermined thickness by sputtering, for example, lead zirconate titanate (PZT) over the entire surface of the first electrode layer 40. In the step of forming the piezoelectric film layer, the piezoelectric film layer 41 including a PZT layer is deposited to a thickness of about 1 μm on the first electrode layer 40 using $Pb_{(1-x)}(Zr_{0.53}Ti_{0.47})_{3-y}$ oxide as a target under the sputtering conditions including, for example, a gas pressure of 0.7 Pa and a RF power of 0.5 kW. Also, the piezoelectric film layer 41 is crystallized by baking heat treatment in an electric oven. The baking treatment is performed at 700° C. in an oxygen atmosphere for 10 minutes. The piezoelectric film layer 41 is formed to cover a portion of the electrode layer extended from the first electrode layer 41 to the formation region on each base part 22.

In the step of forming the second electrode layer, a platinum layer is formed by sputtering platinum over the entire surface of the piezoelectric film layer 4 to form the second electrode layer 42. The platinum thin film layer is deposited to a thickness of about 200 nm on the piezoelectric film layer 41 under the sputtering conditions including, for example, a gas pressure of 0.5 Pa and a RF power of 0.5 kW.

(Electrode Forming Step (Patterning))

Next, the step of patterning the second electrode layer 42 formed as an uppermost layer is performed. In the step of pattering the second electrode layer, the driving electrode layer 29 and the pair of the detection electrodes 30R and 30L each having a predetermined shape are formed as shown in FIGS. 21 and 22.

As described above, the driving electrode layer 29 serves as an electrode for applying a predetermined drive voltage for driving each vibrator part 23 and is formed with a predetermined width in a central region of each vibrator part 23 in the width direction to extent over substantially the entire region in the length direction thereof. The detection electrodes 30 are electrodes for detecting the Coriolis' force produced in each vibrator part 23 and are formed in parallel on both sides of the driving electrode layer 29 to be insulated from each other over substantially the entire region in the length direction.

Figure 21:
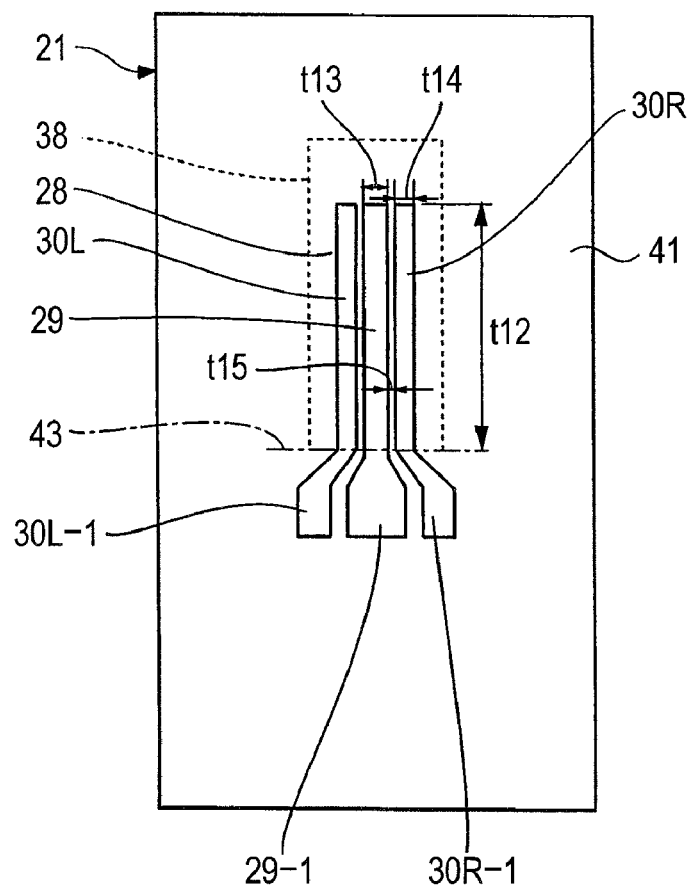
FIG. 21 is a plan view of a principal portion in which a driving electrode layer and detection electrodes are patterned in the second electrode layer shown in FIG. 20.
Figure 22:
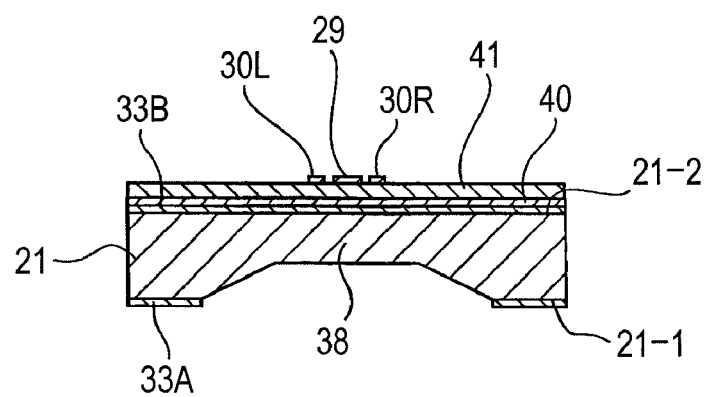
FIG. 22 is a sectional view of the principal portion shown in FIG. 21.

In the step of patterning the second electrode layer, the second electrode layer 42 is subjected to photolithographic treatment to form the driving electrode layer 29 and the detection electrodes 30 on the piezoelectric film layer 41, as shown in FIG. 21. In the step of pattering the second electrode layer, a resist layer is formed on portions corresponding to the driving electrode layer 29 and the detection electrodes 30, and unnecessary portions of the second electrode layer 42 are removed by, for example, ion etching or the like. Then, the resist layer is removed to pattern the driving electrode layer 29 and the detection electrodes 30. The step of patterning the second electrode layer is not limited to this, and the driving electrode layer 29 and the detection electrodes 30 may be formed using an appropriate conductor layer forming step used in a semiconductor process.

As shown in FIG. 21, the driving electrode layer 29 and the detection electrodes 30 are formed so that the tips thereof are disposed at the same position in the length direction, and also the root parts to be disposed at the root of each vibrator part 23 are disposed at the same position 43 in the length direction. In the step of pattering the second electrode layer, wider lead connection parts 29-1, 30R-1, and 30L-1 are formed by pattering integrally with the base ends of the driving electrode layer 29 and the detection electrodes 30R and 30L, respectively, which have the root parts disposed at the same position 43 in the length direction.

In the step of patterning the second electrode layer, the second electrode layer 42 is patterned to form the driving electrode layer 29, for example, having a length dimension t12 of 2 mm and a width dimension t13 of 50 µm. Furthermore, as shown in FIG. 21, the first and second detection electrodes 30R and 30L each having a width dimension t14 of 10 µm are formed by patterning so that the driving electrode layer 29 is held therebetween with a space t15 of 5 µm between the driving electrode layer 29 and each detection electrode 30. Also, the lead connection parts 29-1, 30R-1, and 30L-1 each having a length dimension of 50 µm and a width dimension of 50 µm are formed by pattering. The dimension values of the driving electrode layer 29 and the detection electrodes 30 are not limited to the above-described values, and these are appropriately formed within a range which permits the formation on the second main surface of each vibrator part 23.

Figure 23:
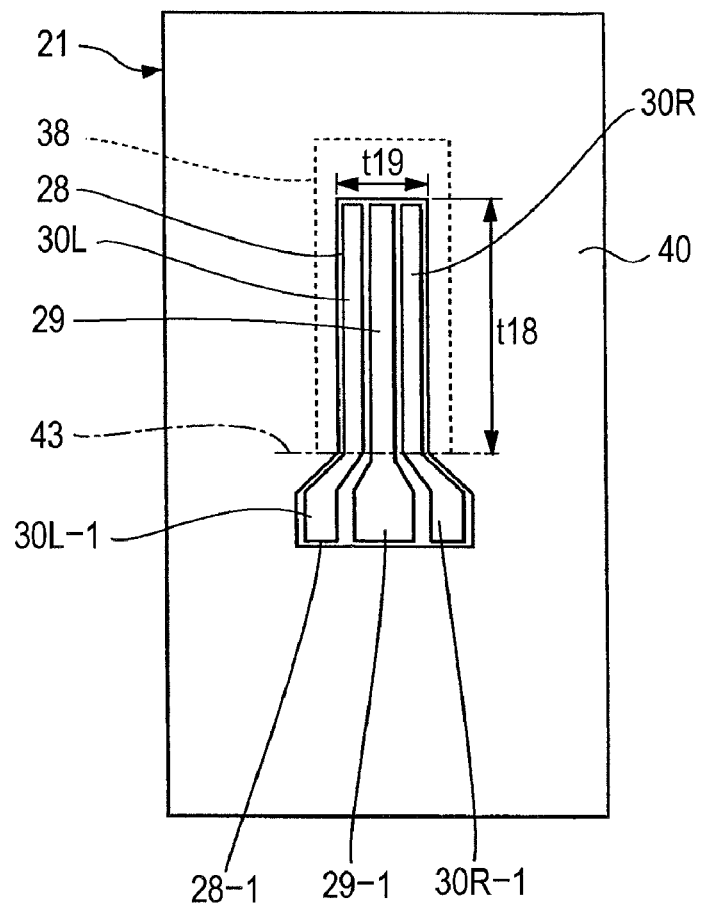
FIG. 23 is a plan view of a principal portion in which a piezoelectric thin film layer is patterned in the piezoelectric film layer shown in FIG. 20.
Figure 24:
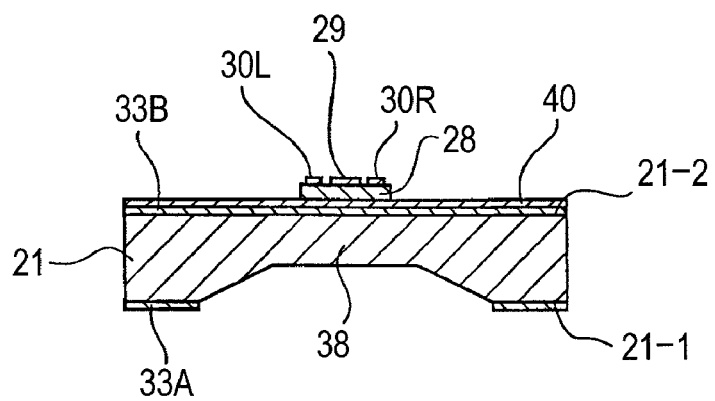
FIG. 24 is a sectional view of the principal portion shown in FIG. 23.

Then, in the step of patterning the piezoelectric film layer 41, the piezoelectric thin film layer 28 having a predetermined shape is formed as shown in FIGS. 23 and 24. The piezoelectric thin film layer 28 is formed by patterning the piezoelectric film layer 41, leaving an area larger than the driving electrode layer 29 and the detection electrodes 30. The piezoelectric thin film layer 28 is formed to have a width slightly smaller than that of each vibrator part 23 and extend from the base end to a vicinity of the tip thereof.

In the step of pattering the piezoelectric film layer, a resist layer is formed on a region of the piezoelectric film layer 41, which corresponds to the piezoelectric thin film layer 28, by photolithographic treatment. Then, unnecessary portions of the piezoelectric film layer 41 are removed by wet etching or the like, for example, using a fluoronitric acid solution, and the resist layer is removed to form the piezoelectric thin film layer 28, as shown in FIGS. 23 and 24. Although, in this embodiment, the piezoelectric film layer 41 is etched by wet etching, the etching method is not limited to this. For example, the piezoelectric thin film layer 28 may be formed by an appropriate method, for example, ion etching, reactive ion etching (RIE), or the like.

As shown in FIG. 23, in the step of pattering the piezoelectric film layer, the piezoelectric thin film layer 28 is formed to have substantially the same root part as those of the driving electrode layer 29 and the detection electrodes 39 at the root position 43 corresponding to the root of each vibrator part 23. Furthermore, a terminal receiving part 28-1 is integrally formed by patterning at the base end of the piezoelectric thin film layer 28 so as to have an area slightly lager than that of the lead connection parts 29-1, 30R-1, and 30L-1 of the driving electrode layer 29 and the detection electrodes 30.

In the step of patterning the piezoelectric film layer, the piezoelectric thin film layer 28 is formed by patterning to have a length dimension t18 of 2.2 mm which is slightly larger than that of the driving electrode layer 29 and the detection electrodes 30, and have a width dimension t19 of 90 µm. The terminal receiving part 28-1 formed by patterning at the base end of the piezoelectric thin film layer 28 has a peripheral portion having a width dimension of 5 µm around the lead connection parts 29-1, 30R-1, and 30L-1 of the driving electrode layer 29 and the detection electrodes 30. The dimension values of the piezoelectric thin film layer 28 are not limited to the above-described values, and the piezoelectric thin film layer 28 is appropriately formed to have an area larger than that of the driving electrode layer 29 and the detection electrodes 30 within a range permitting the formation on the second main surface 23-2 of each vibrator part 23.

Figure 25:
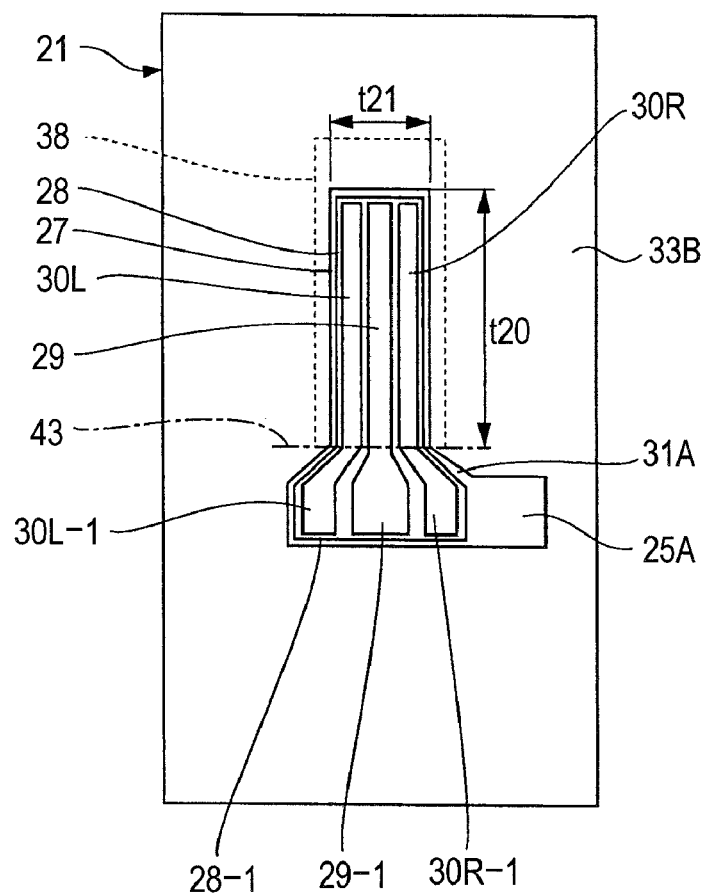
FIG. 25 is a plan view of a principal portion in which a reference electrode layer is patterned in the first electrode layer shown in FIG. 20.
Figure 26:
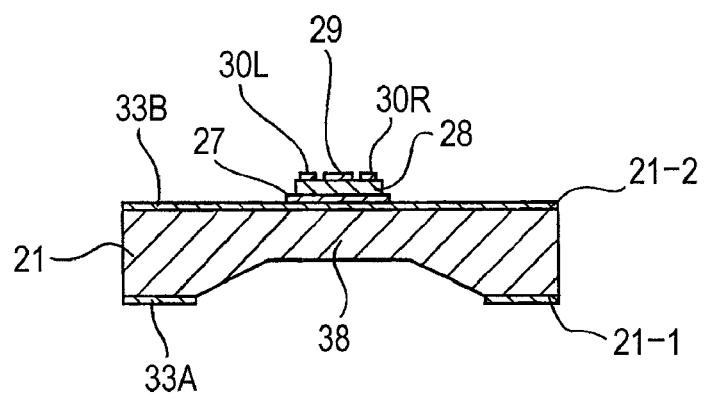
FIG. 26 is a sectional view of the principal portion shown in FIG. 25.

Furthermore, in the step of pattering the first electrode layer, the first electrode layer 40 is patterned by the same step as that for patterning the second electrode layer to form the reference electrode layer 27, as shown in FIGS. 25 and 26. In this step, a resist layer is formed on a region corresponding to the reference electrode layer 27, and unnecessary portions of the first electrode layer 40 are removed by, for example, ion etching or the like. Then, the resist layer is removed to form the reference electrode layer 27. The step of patterning the first electrode layer is not limited to this step, and the reference electrode layer 27 may be formed using an appropriate conductor layer forming step used in a semiconductor process.

In the step of patterning the first electrode layer, the reference electrode layer 27 is formed on the second main surface of each vibrator part 23 to have a width slightly smaller than that of the second main surface of each vibrator part 23 and larger than that of the piezoelectric thin film layer 28. As shown in FIG. 25, the base end of the reference electrode layer 27 is formed to have substantially the same shape as the driving electrode layer 29, the detection electrodes 30, and the piezoelectric thin film layer 28 at the root position 43 corresponding to the root of each vibrator part 23. In this step, the first lead 31A and the first terminal part 25A at the end of the first lead 31A are integrally formed by patterning in a formation region on the base part 22 so as to be extended sideward from the base end.

In the step of pattering the first electrode layer, the reference electrode layer 27 is formed to have a length dimension t20 of 2.3 mm and a width dimension t21 of 94 μm, and also has a peripheral portion having a width dimension of 5 μm around the piezoelectric thin film layer 28. In the step of patterning the first electrode layer, the dimension values of the reference electrode layer 27 are not limited to the above-described values, and the reference electrode layer 27 may be formed within a range which permits the formation on the second main surface of each vibrator part 23.

(Step of Forming Planarizing Layer)

Figure 27:
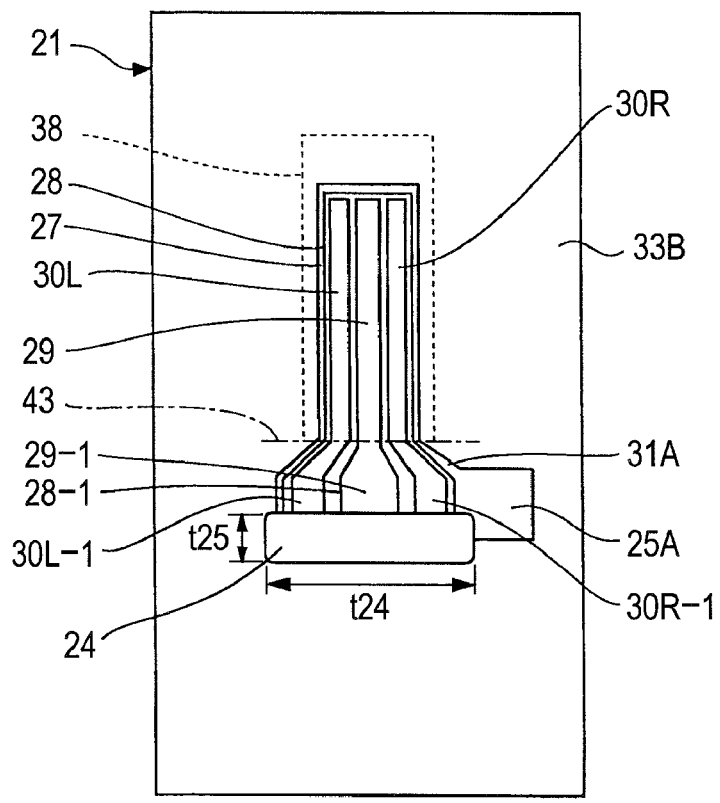
FIG. 27 is a plan view of a principal portion in which a planarizing layer is formed.
Figure 28:
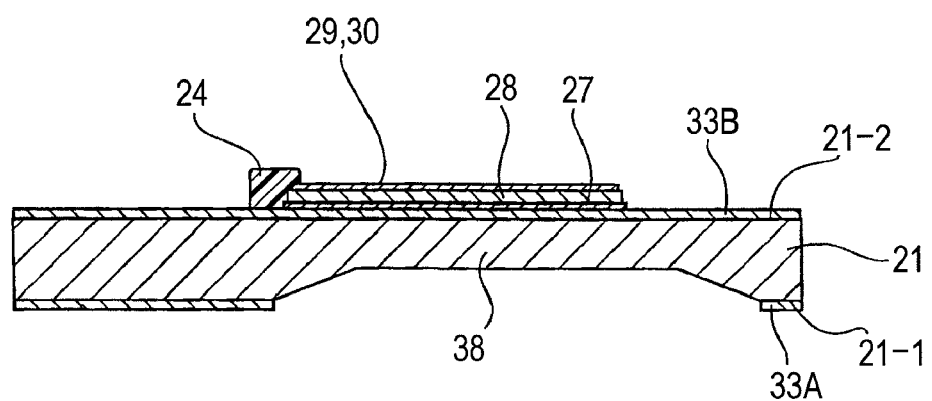
FIG. 28 is a sectional view of the principal portion shown in FIG. 27.

In the process for manufacturing the vibrating elements, the lead connection parts 29-1, 30R-1, and 30L-1 of the driving electrode layer 29 and the detection electrodes 30, and the terminals parts 25B to 25D are formed in the respective formation regions on each base part 22 through the above-described steps, and also leads 31B to 31D to be connected to the respective terminal parts 25 are formed. In order to smoothly connect the leads 31B to 31D to the lead connection parts 29-1, 30R-1, and 30L-1, the planarizing layer 24 is formed as shown in FIGS. 27 and 28.

The leads 31B to 31D for connecting the lead connection parts 29-1, 30R-1, and 30L-1 to the terminal parts 25B to 25D, respectively, are formed to cross over the ends of the terminal receiving part 28-1 of the piezoelectric thin film layer 28 and the reference electrode layer 27 and extend in the respective formation regions on each base part 22. As described above, the piezoelectric thin film layer 28 is formed by patterning the piezoelectric thin film layer 41 using wet etching, and thus the edge of an etched portion is inverse-tapered toward the second main surface 21-2 of the silicon substrate 21 or vertically stepped. Therefore, when the leads 31B to 31D are formed directly in the respective formation regions on each base part 22, disconnection may occur at the stepped portion. Also, it may be necessary to maintain insulation between the first lead 231A and the leads 31B to 31D extended in the respective formation regions on each base part 22.

In the step of forming the planarizing layer, a resist layer formed in a formation region on each base part 22 is patterned by photolithographic treatment to cover the lead connection parts 29-1, 30R-1, and 30L-1 and the first lead 31A. The resist layer pattern is cured by heat treatment at, for example, about 160° C. to 300° C., to form the planarizing layer 24. In this step, the planarizing layer 24 is formed to have a width dimension of t24 of 200 μm, a length dimension t25 of 50 μm, and a thickness dimension of 2 μm (exaggerated in FIG. 28). The step of forming the planarizing layer is not limited to this step, and the planarizing layer 24 may be formed using an appropriate insulating material in an appropriate resist layer forming step performed in a semiconductor process or the like.

(Step of Forming Wiring Layer)

Figure 29:
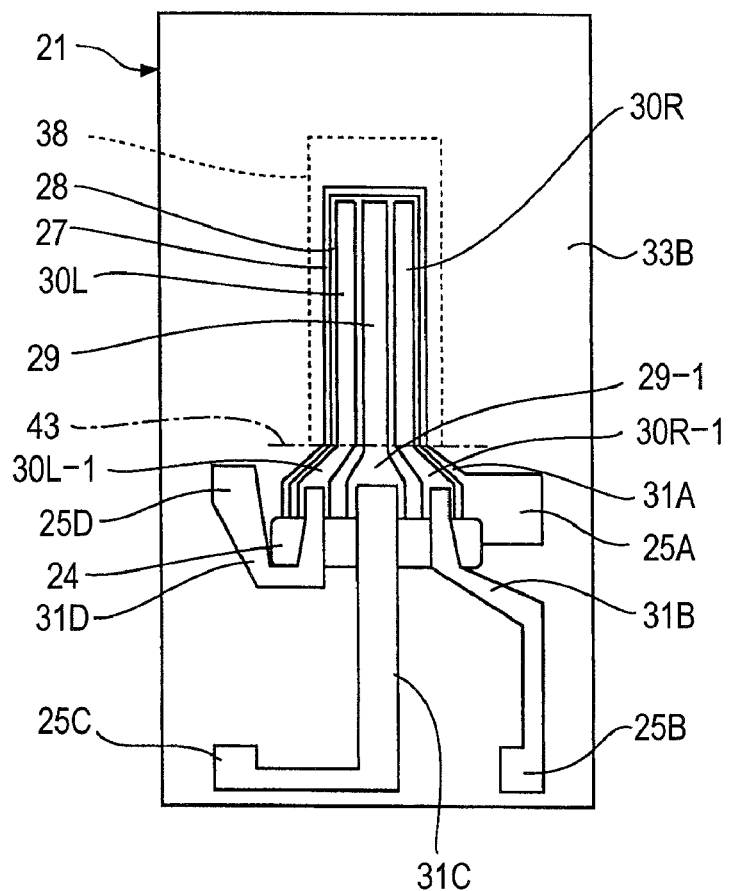
FIG. 29 is a plan view of a principal portion in which leads are formed in respective formation regions on a base part.
Figure 30:
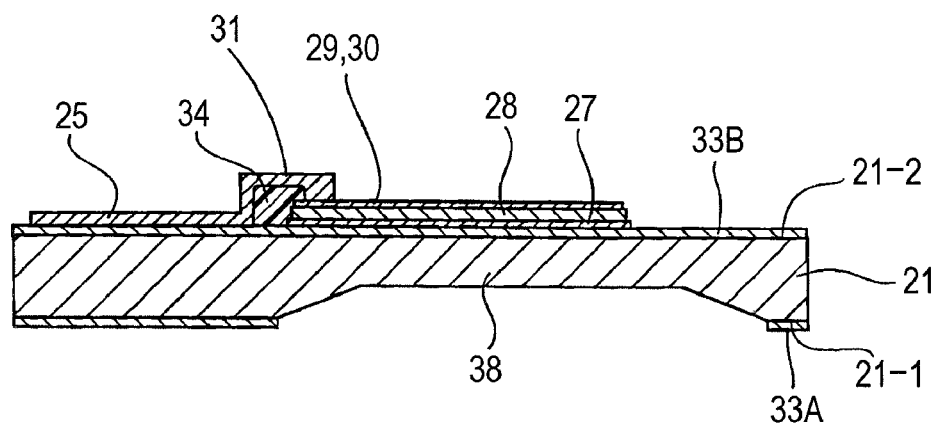
FIG. 30 is a sectional view of the principal portion shown in FIG. 29.

Next, the step of forming the wiring layer is performed for forming the second to fourth terminal parts 25B to 25D and the second to fourth leads 31B to 31D in the respective formation regions on each base part 22. In the step of forming the wiring layer, a photosensitive photoresist layer is formed over the entire region of a formation region on each base part 22, and then subjected to photolithographic treatment to form a pattern of apertures corresponding to the second to fourth terminal parts 25B to 25D and the second to fourth leads 31B to 31D. Furthermore, a conductor layer is formed in each of the apertures by sputtering to form the wiring layer. In this step, after predetermined conductor portions are formed, the photoresist layer is removed to form the second to fourth terminal parts 25B to 25D and the second to fourth leads 31B to 31D, as shown in FIGS. 29 and 30.

In the step of forming the wiring layer, a titanium layer or an alumina layer is formed as an underlying layer for improving the adhesion to the silicon oxide film 33B, and then a low-cost copper layer having low electric resistance is formed on the titanium layer. In this embodiment, for example, the titanium layer is formed to a thickness of 20 nm, and the copper layer is formed to a thickness of 300 nm. The step of forming the wiring layer is not limited to this step, and the wiring layer may be formed by, for example, any wiring pattern forming technique generally used in a semiconductor process.

(Step of Forming Insulating Protective Layer)

Then, the step of forming the insulating protective layer is performed for forming the insulating protective layer 45 including three layers over the main surfaces of each base part 22 on which the terminals 25 and the leads 31 have been formed by the above-described steps and each vibrator part 23 on which the electrode layers and the piezoelectric thin film layer 28 have been formed. The step of forming the insulating protective layer includes the steps of forming a resist layer, patterning the resist layer, forming a first alumina layer, forming a silicon oxide layer, forming a second alumina layer, and removing the resist layer.

Figure 31:
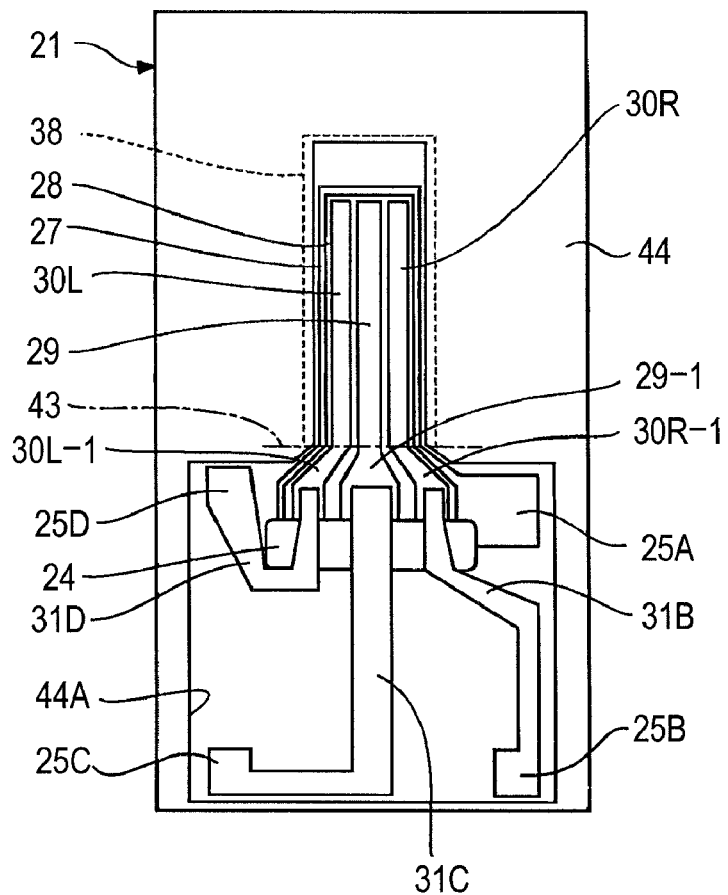
FIG. 31 is a plan view of a principal portion in which a photoresist layer is formed for forming an insulating protective layer.

In the step of forming the insulating protective layer, the steps of forming the resist layer and pattering the resist layer are performed to form a resist layer 44 having an aperture in a region corresponding to the insulating protective layer 45 on the second main surface of the silicon substrate 21, as shown in FIG. 31. In the step of forming the resist layer, a photosensitive resist agent is applied over the entire surface of the silicon substrate 21 to form the resist layer 44. In the step of patterning the resist layer, the resist layer 44 is subjected to photolithographic treatment to form an aperture corresponding to a formation region of the insulating protective layer 45, thereby forming an insulating protective layer formation aperture 44A. Although not shown in the drawing, the resist layer 44 is left in circular portions corresponding to the respective terminal parts 25.

Figure 32:
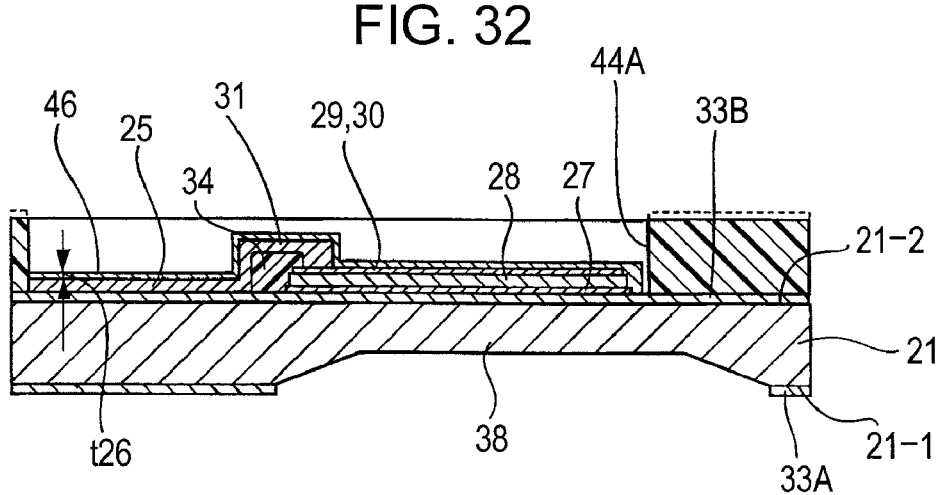
FIG. 32 is a sectional view of the principal portion shown in FIG. 31 in which a first alumina layer of the insulating protective layer is formed.
Figure 33:
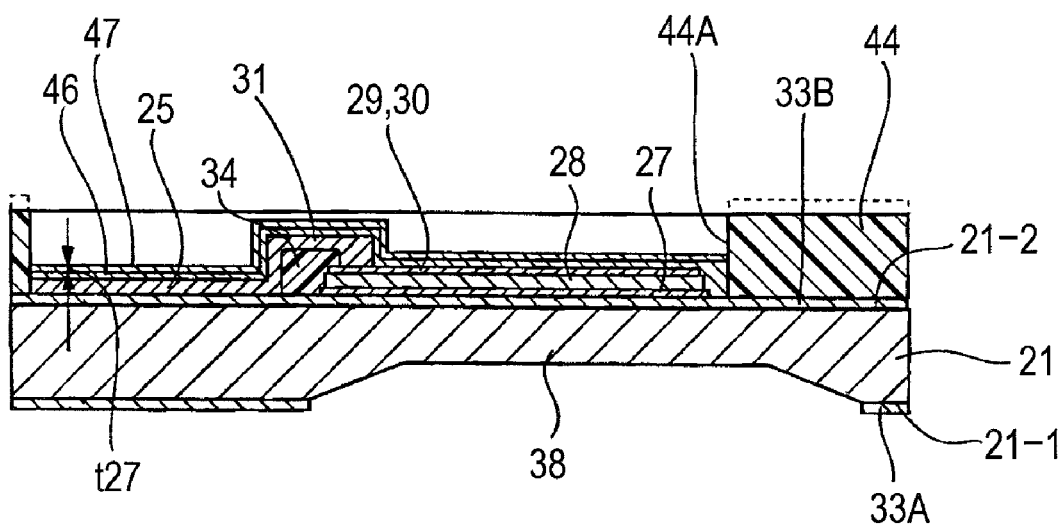
FIG. 33 is a sectional view of the principal portion shown in FIG. 31 in which a silicon oxide layer of the insulating protective layer is formed.
Figure 34:
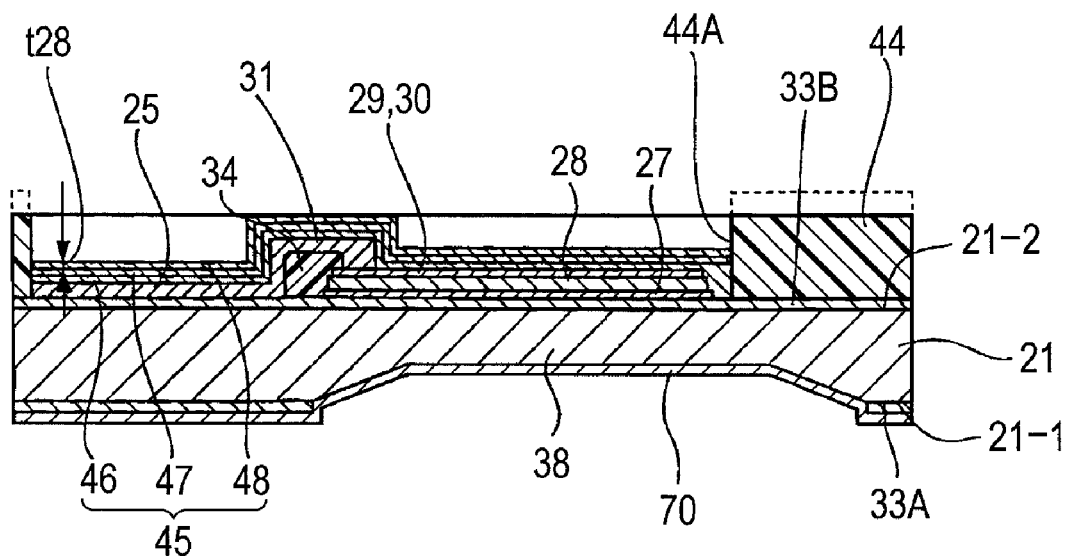
FIG. 34 is a sectional view of the principal portion shown in FIG. 31 in which a second alumina layer of the insulating protective layer and an etching stop layer are formed.

In the step of forming the insulating protective layer, the first alumina layer 46, the silicon oxide layer 47, and the second alumina layer 48 are laminated by sputtering, and unnecessary portions of the sputtered films are removed together with the resist layer 44 to leave a three layer-structure sputtered layer in the insulating protective layer formation aperture 44A of the resist layer 44. Namely, the desired insulating protective layer 45 is formed by a so-called liftoff method. FIGS. 32 to 34 show only the sputtered films formed in the insulating protective layer formation aperture 44A. However, of course, the sputtered films are formed on the resist layer 44 having the insulating protective layer forming aperture 44A, and these sputtered films are simultaneously removed together with the resist layer 44 in the resist layer removing step.

In the step of forming the first alumina layer, the first alumina layer 46 is formed by sputtering alumina in the insulating protective layer formation aperture 44A, as shown in FIG. 32. The first alumina layer 46 is formed to have a thickness dimension t26 of about 50 nm and functions as an underlying metal layer for improving the adhesion to the silicon substrate 21 and the driving electrode layer 29 or the detection electrodes 30 within the insulating protective layer formation aperture 44A, as described above.

In the step of forming the silicon oxide layer, the silicon oxide layer 47 is formed on the first alumina layer 46 by sputtering silicon oxide, as shown in FIG. 33. In this step, since the lower limit of argon pressure for discharge in a sputtering vessel is 0.35 Pa, the silicon oxide layer 47 with a high density is formed by sputtering silicon oxide at an argon pressure set at 0.4 Pa slightly higher than the lower limit. The silicon oxide layer 47 formed in this step exhibits a sufficient insulating protective function because the thickness thereof is at least twice that of the driving electrode layer 29 and the detection electrodes 30, and the thickness dimension t27 is 1 μm or less within a region in which burr occurs at a low rate in the liftoff method. Specifically, the silicon oxide layer 47 is formed with a thickness dimension t27 of 750 nm.

In the step of forming the second alumina layer, as shown in FIG. 34, the second alumina layer 48 is formed by sputtering alumina over the entire surface of the silicon oxide layer 47. The second alumina layer 48 is formed to have a thickness dimension t28 of about 50 nm, for improving the adhesion to a resist layer to be formed in the outer shape grooving step which will be described below, thereby preventing the silicon oxide layer 47 from being damaged by an etching agent.

(Outer Shape Grooving Step)

Next, as shown in FIG. 34, an etching stop layer 70 is formed on the first main surface 21-1 of the silicon substrate 21. The etching stop layer 70 functions to suppress the occurrence of a defective shape in which plasma concentration occurs on the first main surface 21-1 to fail to form a predetermined edge shape in the step of forming an outside groove in the silicon substrate 21, which will be described below. In the step of forming the etching stop layer, for example, a silicon oxide layer is formed to a thickness of about 500 nm by sputtering over the entire surface of the first main surface 21-1 of the silicon substrate 21.

Figure 35:
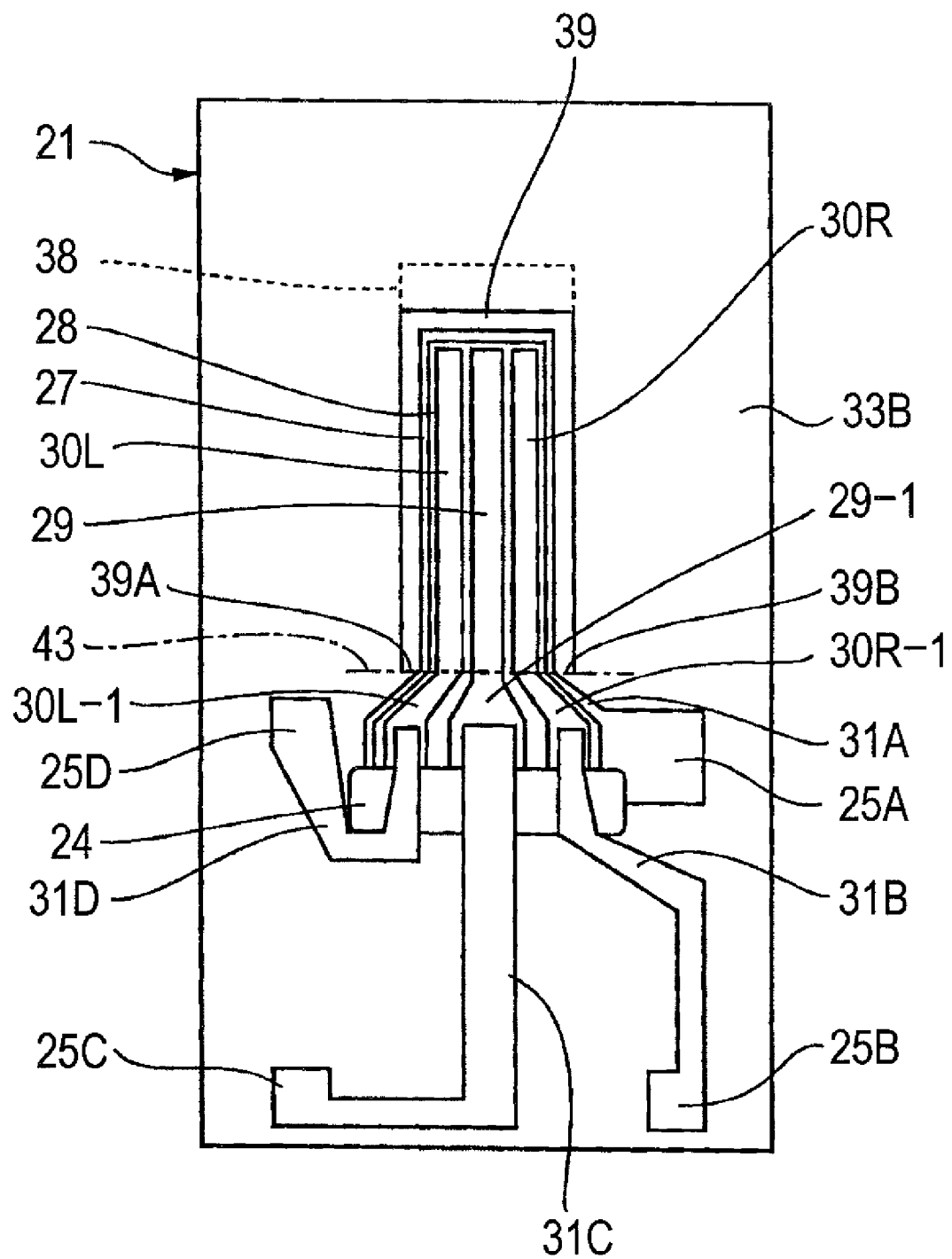
FIG. 35 is a plan view of a principal portion in which an outside groove is formed for forming the outside shape of a vibrator part.
Figure 36:
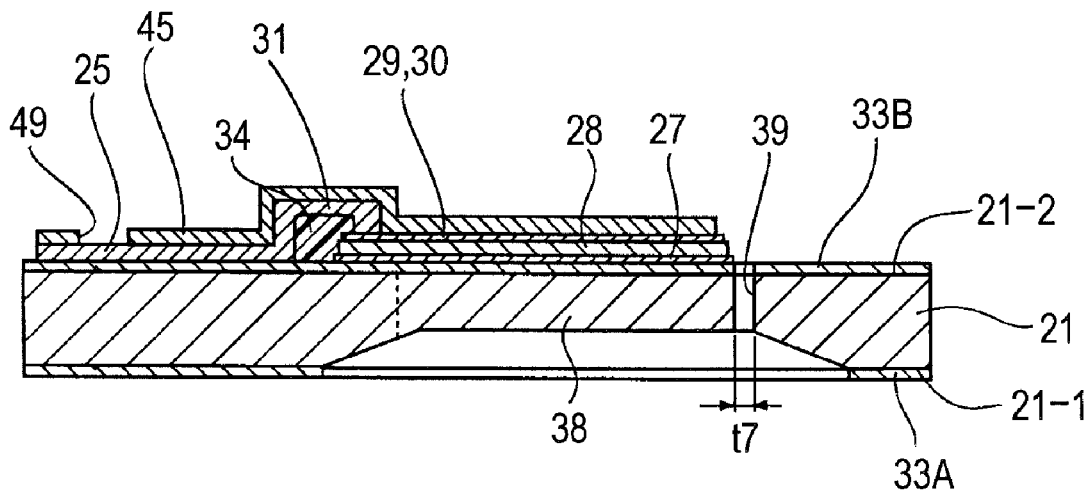
FIG. 36 is a sectional view of the principal portion shown in FIG. 35, as viewed from a direction perpendicular to the longitudinal direction of the vibrator part.
Figure 37:
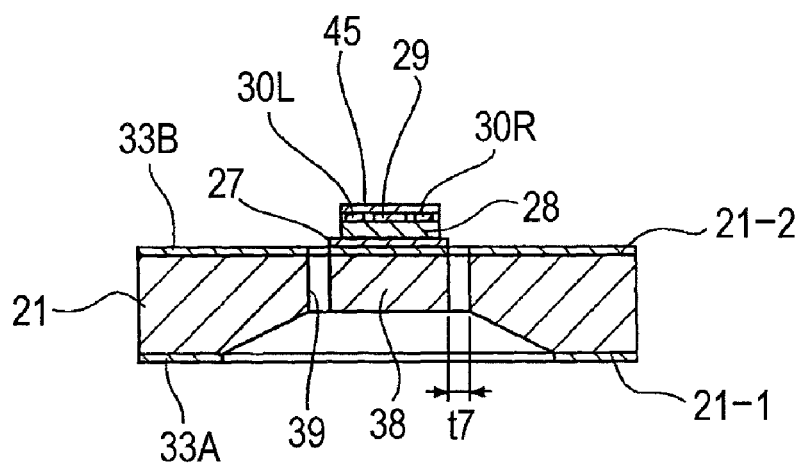
FIG. 37 is a sectional view of the principal portion shown in FIG. 35, as viewed from the longitudinal direction of the vibrator part.

In the outer shape grooving step, the outside groove 39 is formed to pass through the diaphragm part 38, for forming the periphery of each vibrator part 23. In this step, as shown in FIGS. 35 to 37, the outside groove 39 is formed as a U-shaped through groove from the second main surface 21-2 of the silicon substrate 21, which faces the diaphragm parts 38, so as to surround each vibrator part 23 and extend from the start end 39A at one of the sides of the root position 43 of each vibrator part 23 to the finish end 39B at the other aide of the root position 43. As described above, the outside groove 39 is formed to have the width dimension t7 of 200 μm.

Specifically, the outer shape grooving step includes a first etching step of removing a U-shaped portion in a predetermined form of the silicon oxide film 33B to expose the second main surface 21-2 of the silicon substrate 21, and a second etching step of forming the outside groove 39 in the exposed portion of the silicon substrate 21.

In the first etching step, a photosensitive photoresist layer is formed over the entire surface of the silicon oxide film 33B and subjected to photolithographic treatment to form a U-shaped aperture pattern surrounding the formation region on the electrode layers, the aperture pattern having an opening size which is the same as the outer dimension of each vibrator 23. In this step, the silicon oxide film 33B exposed through the aperture pattern is removed by ion etching. Although, in the first etching step, the silicon oxide film 33B may be removed in a U-shaped form by, for example, wet etching, ion etching is preferred in view of the occurrence of dimensional error due to side etching.

In the second etching step, the remaining silicon oxide film 33B is used as a resist film (etching protective film). In this step, for example, the silicon substrate 21 is subjected to reactive ion etching, for achieving a proper etching ratio to the resist film (silicon oxide film 33B) and forming a high-precision vertical surface as the outer periphery of each vibrator part 23.

In the second etching step, a reactive ion etching (RIE) apparatus having the function to produce inductively coupled plasma (ICP) is used for producing a high-density plasma. This step uses a Bosch (Bosch Corp.) process in which an etching step of introducing $SF_6$ gas to an etching portion and a step of introducing $C_4F_8$ gas to form a protective film for protecting the outer periphery of the etched portion are repeated. As a result, the outside groove 39 having a vertical inner wall is formed in the silicon substrate 21 at a rate of about 10 μm per minute.

After the second etching step, a step of removing the etching stop layer 70 formed on the first main surface 21-1 of the silicon substrate 21 is preformed. In this step, the etching stop layer 70 composed of silicon oxide is removed by, for example, wet etching with ammonium fluoride. Since, in the step of removing the etching stop layer, the insulating protective layer 45 is also removed by removing the photoresist layer formed in the step of forming the outside groove, the photoresist layer is removed after removing the etching stop layer 70.

(Polarization Step)

Then, the polarization step is performed for simultaneously polarizing the piezoelectric thin films 28 formed on the respective vibrating elements 20 on the silicon oxide substrate 21. The polarization is performed using Cu wiring as polarization wiring. After the polarization, the Cu wiring is easily dissolved by wet etching and removed without damage to the vibrating elements 20. The polarization wiring is not limited to the Cu wiring, and an appropriate conductor exhibiting the above-described function may be used for the wiring.

The Cu wiring is formed by a liftoff method in which a resist layer pattern having an aperture with a predetermined shape is formed on the second main surface 21-2 of the silicon substrate 21 by, for example, photolithographic treatment, a Cu layer is deposited by sputtering, and the Cu layer is removed from unnecessary portions together with the resist layer. For example, the Cu wiring has a width dimension of 30 μm or more and a thickness of about 400 nm, for securing conduction during the polarization.

The polarization step is effectively performed by simultaneously connecting the vibrating elements 20 to an external power supply through application-side pads formed in the Cu wiring and ground-side pads. In the polarization step, each pad is connected to the external power supply by, for example, were bonding, and polarization is performed by conduction at 20 V for 20 minutes. The polarization is not limited to this step, and the polarization may be performed by an appropriate connection method under proper polarization conditions.

(Step of Forming Gold Bumps)

Next, the step of forming the gold bumps is performed. As descried above, each of the vibrating elements 20 is mounted on the support substrate 2, and thus the gold bump 26 is formed on each terminal part 25. In the step of forming the gold bumps 26, a stud bump having a predetermined shape is formed by pressing a gold wire bonding tool to each terminal part 25. In this step, if required, dummy bumps are also formed on each base part 22. The gold bumps 26 may be formed by another method, for example, a plating bump method which will be described below.

Figure 38A:
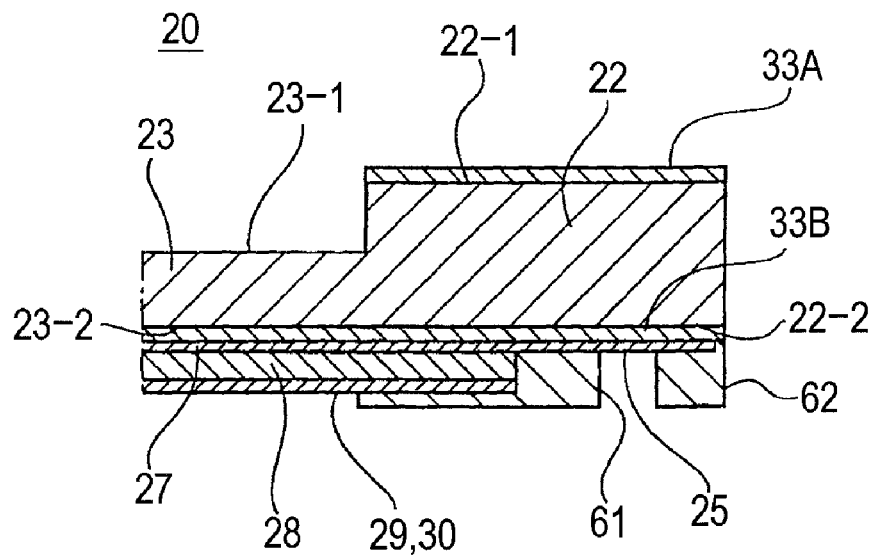
FIGS. 38A and 38B are sectional side views illustrating a method for forming plating bumps of a vibrating element.
Figure 38B:
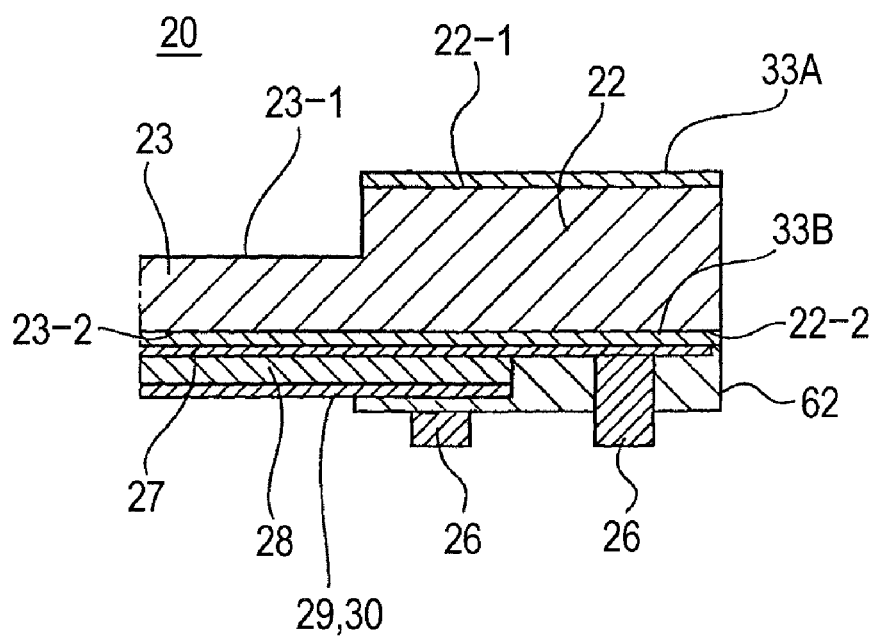

The plating bump method includes a step of forming a plating resist layer 62 having a predetermined aperture 61 on each terminal part 25 as shown in FIG. 38A, a step of plating gold to grow a gold plating layer 26 to a predetermined height in each aperture 61 as shown in FIG. 38B, and a step of removing the resist layer 62. In the step of forming the gold bumps, the thickness (height) of the gold bumps 26 is limited by plating conditions, and the gold bumps 26 having a predetermined height may not be formed. In the step of forming the gold bumps, when the desired gold bumps 26 are not obtained by first plating, second plating may be performed again using the first plating layer as an electrode to form so-called stepped gold bumps 26.

The method for the step of forming the gold bumps 26 is not limited to the above-described methods, and bumps may be formed by, for example, vapor deposition, transfer, or the like which is carried out in a semiconductor process. Although not described in detail, in the process for manufacturing the vibrating elements, a so-called bump metal underlayer of TiW, TiN, or the like is formed for improving the adhesion between the gold bumps 26 and the terminal parts 25.

(Cutting Step)

Next, the cutting step is performed for cutting the silicon substrate 21 into the respective vibrating elements 20. In the cutting step, a portion corresponding to each base part 22 is cut with, for example, a diamond cutter or the like to cut into the respective vibrating elements 20. In this step, cutting grooves are formed by a diamond cutter, and then the silicon substrate 21 is cut by bending. The cutting step may be performed by a grindstone or polishing using plane orientations of the silicon substrate 21.

By using the above-descried process for manufacturing the vibrating elements, the number of the vibrating elements obtained from the silicon substrate (wafer) 21 may be significantly increased, as compared with, for example, a case in which vibrator parts are integrally formed on the adjacent sides of a common base part 22 to produce a two-axis integrated vibrating element for obtaining detection signals in two axis directions.

(Mounting Step)

Each of the vibrating elements 20 manufactured by the above-descried steps is mounted on the first main surface 2-1 of the support substrate 2 by the surface mounting method using the second main surface 21-2 of the silicon substrate 21 as the mounting surface. In the vibrating element 20, the gold bumps 26 provided on the respective terminal parts 25 are aligned with the corresponding lands 4 on the support substrate side. In this case, as described above, the alignment marks 32 of each vibrating element 20 are read, and then the vibrating element 20 is positioned by the mounting machine with high positional precision and directional precision.

Each vibrating element 20 is mounted on the first main surface 2-1 of the support substrate 2 by ultrasonically welding the gold bumps 26 to the corresponding lands 4 while the vibrating element 20 is pressed on the support substrate 2. The IC element 7 and the electronic components 8 are mounted on the first main surface 2-1 of the support substrate 2, and each vibrating element 20 is subjected to the adjustment step which will be describe below. Then, the cover member 15 is attached to complete the vibrating gyrosensor 1.

As described above, according to this embodiment, a plurality of vibrating elements 20 is simultaneously produced on the silicon substrate 21, the vibrating elements 20 each including the vibrator part 23 integrally formed with the base part 22, and then the silicon substrate 21 is cut into the respective vibrating elements. Then, the first and second vibrating elements 20X and 20Y having the same shape are mounted on two axes crossing at an angle of 90° on the first main surface 2-1 of the support substrate 2 to produce the vibrating gyrosensor 1 for obtaining detection signals in the two axes.

(Adjustment Step)

In the step for manufacturing the vibrating elements, as described above, the vibrator part 23 of each vibrating element 20 is precisely cut off from the silicon substrate 21 by etching using inductively coupled plasma. However, it may be difficult to form each vibrator part 23 symmetric with respect to the emission center line of the plasma depending on the conditions such as material yield and the like. Therefore, variations may occur in the shape of each vibrator part 23 due to a positional shift of each vibrating element 20, various process conditions, or the like. For example, when the vibrator part 23 of each vibrating element 20 is formed to have a trapezoidal or parallelogram sectional shape, the vibrator part 23 performs a vibration operation inclined toward a small-mass side from the center axis direction of vertical vibration, as compared with a vibrator part 23 having a normal rectangular sectional shape.

Therefore, the adjustment step is performed for correcting a vibration state by laser-polishing a predetermined position on a large-mass side of each vibrator part 23. In the adjustment step, since it may be difficult to directly observe the sectional shape of each vibrator part 23 having a small sectional shape, variations in the sectional shape of the vibrator part 23 are observed by a method in which the vibrator part 23 of each of the cut vibrating elements 20 is vibrated at a predetermined longitudinal resonance frequency to compare the magnitudes of right and left detection signals. In the adjustment step, when a difference occurs between the right and left detection signals, the vibrator part 23 is partially laser-cut on the side outputting a smaller detection signal.

For example, before adjustment, oscillation output G0 of the oscillator circuit 71 is applied to the driving electrode layer 29 to vibrate the vibrating element 20 in a longitudinal resonance state, as shown in FIG. 39A. In the adjustment step, the detection signals Gl0 and Gr0 output from the pair of the detection electrodes 30L and 30R are combined by the adding circuit 72, and the addition signal is returned to the oscillator circuit 71. Then, on the basis of the detection signals Gl0 and Gr0 obtained from the detection electrodes 30L and 30R, the oscillation frequency of the oscillator circuit 71 is measured as a longitudinal resonance frequency f0, and a difference between the detection signals Gl0 and Gr0 is measured as a differential signal.

In the adjustment step, as shown in FIG. 39B, the oscillation output G1 of the oscillator circuit 71 is applied to the detection electrode 30L to drive the vibrating element 20 in a transverse resonance state. In this step, the detection signal Gr-1 output from the detection electrode 30R is returned to the oscillator circuit 71, and on the basis of the detection signals Gr-1, the oscillation frequency of the oscillator circuit 71 is measured as a transverse resonance frequency f1. Since the transverse resonance frequency f1 obtained from the detection signal Gr-1 is equal to the transverse resonance frequency f2 obtained from the detection signal Gl-1, the transverse resonance frequency may be measured by connecting to any one of the detection electrodes 30L and 30R.

Furthermore, as shown in FIG. 39C, the oscillation output G2 of the oscillator circuit 71 is applied to the detection electrode 30R to drive the vibrating element 20 in a transverse resonance state. In this step, the detection signal Gl-2 output from the detection electrode 30L is returned to the oscillator circuit 71, and on the basis of the detection signals Gl-2, the oscillation frequency of the oscillator circuit 71 is measured as a transverse resonance frequency f2. In the adjustment step, a difference between the longitudinal resonance frequency f0 and the transverse resonance frequency f1 or f2 obtained by the measurement is used as a degree of detuning, and decision is made as to whether or not the degree of detuning is within a predetermined range. Also, in the adjustment step, decision is made as to whether or not the differential signal detected by the detection electrodes 30L and 30R is within a predetermined range.

In the adjustment step, on the basis of the decision results of the degree of detuning and the differential signal, an adjustment position of the vibrator part 23 is determined from the magnitudes thereof, and the portion of the vibrator part 23 is polished by laser irradiation. The adjustment step is performed by the same measurement and leaser processing as described above until the decision results of the degree of detuning and the differential signal reach the target values.

The adjustment step uses a laser device having a controllable spot diameter and emitting a laser at a wavelength of 532 nm. In the adjustment step, for example, an edge between a side and the first main surface 23-1 is adjusted by irradiating a proper portion in the length direction with the laser. Since, in each of the vibrating elements 20, changes in both a frequency difference and a detection signal balance by laser irradiation adjustment decrease from the base end to the tip of the vibrator part 23, the base end side may be roughly adjusted, and the tip side may be finely adjusted.

Since the adjustment step is performed for the vibrating element 20 mounted on the support substrate 2, re-adjustment after mounting, which is preformed when the adjustment is performed before mounting, may not be performed, thereby increasing the productivity of the vibrating gyrosensor 1. In this case, a region irradiated by the adjustment laser is on the upper surface 23-2 side of the vibrator part 23, and thus adjustment workability after mounting is excellent. Since the piezoelectric layer and the electrode layers are not formed on the upper surface 23-2 of each vibrator part 23, the influences of the adjustment, such as a change in the characteristics of the piezoelectric thin film layer 28, a change in the polarization state, and the like due to the heat generated by laser processing, may be prevented as much as possible.

In the vibrating gyrosensor 1, when an AC voltage at a predetermined frequency is applied to the driving electrode layer 29 in each vibrating element 20 from the corresponding driving detector circuit part 50, the vibrator part 23 vibrates at a natural frequency. The vibrator part 23 resonates at a longitudinal resonance frequency in the longitudinal direction, which is the thickness direction, and also resonates at a transverse resonance frequency in the transverse direction, which is the width direction. The sensitivity of the vibrating element 20 increases as a difference between the longitudinal resonance frequency and the transverse resonance frequency, which refers to the degree of detuning, decreases. In the vibrating gyrosensor 1, as described above, when the outer periphery of each vibrator part 23 is formed with high precision by crystal anisotropic etching and reactive ion etching, a satisfactory degree of detuning is obtained.

In each of the vibrating elements 20, the characteristics of the longitudinal resonance frequency are significantly affected by the precision of the length dimension t5 of the vibrator part 23. As described above, at the root position 43 in each vibrating element 20, which defines the length dimension t5 of the vibrator part 23, when a deviation occurs between the (100) surface of the diaphragm part 38 formed by crystal anisotropic etching and the (111) surface which corresponds to each etched inclined surface 133 at an angle of 55° and the boundary line corresponding to a flat surface, the degree of detuning increases according to the amount of deviation.

Namely, in each of the vibrating elements 20, the amount of deviation is caused by a positional shift between the resist film pattern formed on the silicon oxide film 33B in crystal anisotropic etching and the resist film pattern formed in reactive ion etching. Therefore, for example, each of the vibrating elements 20 may be positioned using a both side aligner capable of simultaneously observing the first and second main surfaces 21-1 and 21-2 of the silicon substrate 21. Alternatively, appropriate positioning patterns or marks may be formed on the first and second main surfaces 21-1 and 21-2 of the silicon substrate 21 so that each vibrating element 20 is positioned by an alignment device performing one-side alignment on the basis of these patterns or marks. This positioning method may be applied to the step of mounting each vibrating element 20 on the support substrate 2.

When the amount of deviation in each vibrating element 20 is in a range smaller than about 30 μm, the longitudinal resonance frequency is substantially the same as the transverse resonance frequency. Therefore, in each vibrating element 20, deterioration in the degree of detuning due to the amount of deviation is substantially suppressed by an etching step with slightly higher precision, and the vibrating element is manufactured without the above-descried positioning method using the alignment device.

(Effect of Pair of Vibrating Elements)

In the process for producing the vibrating elements, as described above, many vibrating elements 20 each having the vibrator part integrally formed with the base part 22 are simultaneously formed on the silicon substrate 21, and the silicon substrate 21 is cut into the respective vibrating elements 20. Therefore, the first vibrating element 20X and the second vibrating element 20Y having the same shape are produced, and the two vibrating elements 20X and 20Y are disposed at positions on two axes on a main surface of the support substrate 2 to produce the vibrating gyrosensor 1 for obtaining detection signals in the two axes.

In the process for manufacturing the vibrating elements, the number of the vibrating elements obtained from the silicon substrate (wafer) 21 may be significantly increased, as compared with, for example, a two-axis integrated vibrating element in which vibrator parts are integrally formed on the adjacent sides of a common base part 22, for obtaining detection signals in two axis directions. FIG. 40 shows comparison of the number of the vibrating elements 20 obtained, each of which includes the parts having the above-described dimensions and the number of the two-axis integrated vibrating elements obtained, each of which has the same function as the vibrating elements 20.

FIG. 40 indicates that when a total of 60 vibrating elements 20 (corresponding to 30 gyrosensors each including two vibrating elements) are produced using a 3-cm square silicon substrate, a total of 1200 vibrating elements (corresponding to 600 gyrosensors 1) are produced using a 4-inch diameter waver generally used in mass production by a semiconductor process, and a total of 4000 vibrating elements (corresponding to 2000 gyrosensors 1) are produced using a 5-inch diameter waver. On the other hand, with respect to the two-axis integrated vibrating elements, a total of 20 vibrating elements are produced using a 3-cm square silicon substrate, a total of 300 vibrating elements are produced using a 4-inch diameter waver, and a total of 800 vibrating elements are produced using a 5-inch diameter waver. In the vibrating elements 20, the material yield is significantly improved to decrease the cost.

Figure 41:
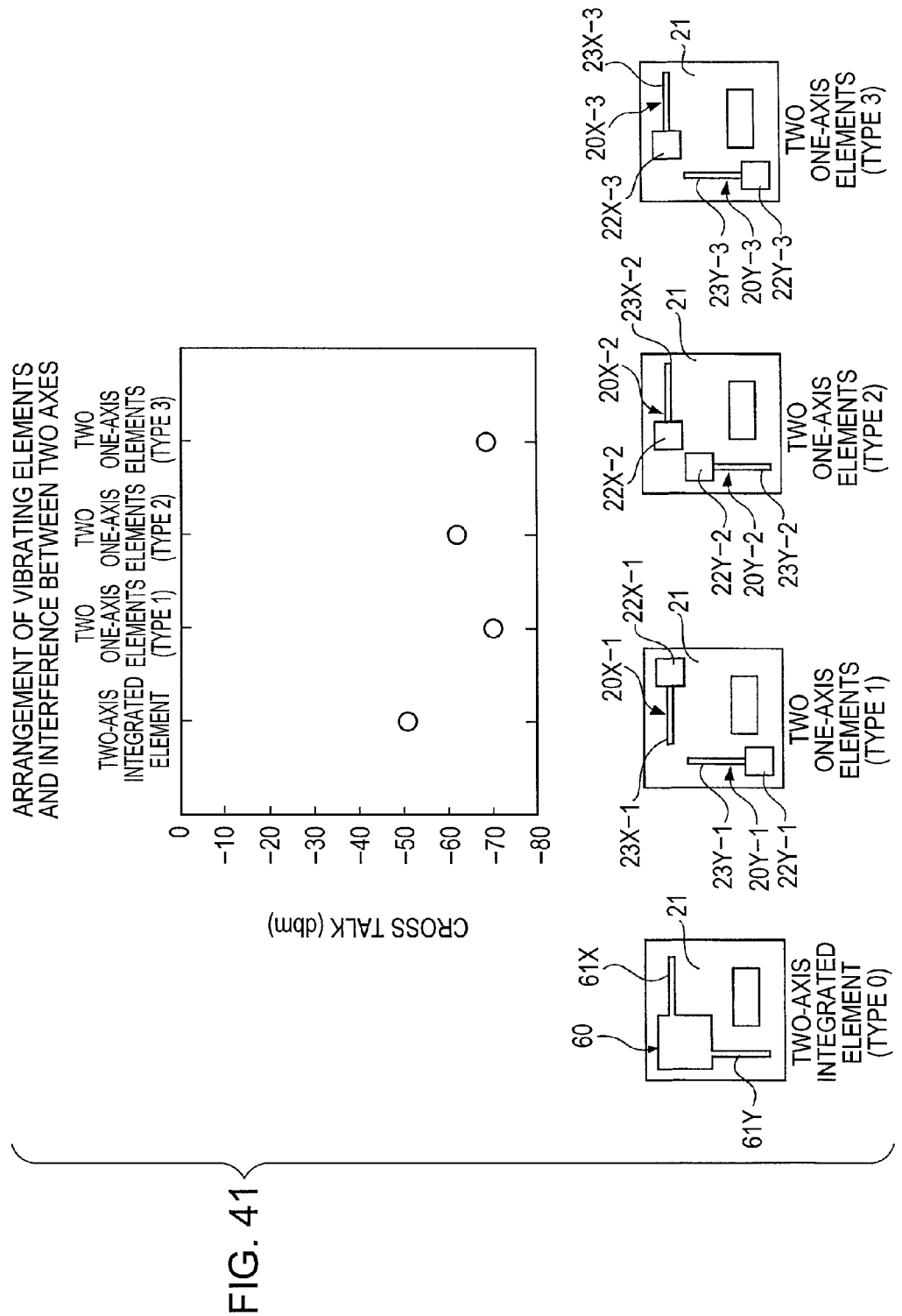
FIG. 41 is a graph showing the interference between axes due to an arrangement of vibrating elements.

In the vibrating gyrosensor 1, as described above, the first vibrating element 20X and the second vibrating element 20Y for obtaining detection signals in two axes are positioned on the two axes at a right angle on the support substrate 2. In the vibrating gyrosensor 1, consideration is given to the influence of the vibration operation of one of the vibrating elements on that of the other vibrating element, i.e., the occurrence of interference between the two axes. FIG. 41 shows the results of measurement of cross talk by turning over the first and second vibrating elements 20X and 20Y mounted in two directions on the support substrate 2.

In FIG. 41, type 1 is a gyrosensor in which first and second vibrating elements 20X-1 and 20Y-1 are mounted on the support substrate 2 so that the respective vibrator parts 23X-1 and 23Y-1 face each other, and the respective base parts 22X-1 and 22Y-1 are fixed at diagonal corners of the support substrate 2. Type 2 is a gyrosensor in which first and second vibrating elements 20X-2 and 20Y-2 are mounted on the support substrate 2 so that the respective base parts 22X-2 and 22Y-2 are fixed at the same corner of the support substrate 2, and the respective vibrator parts 23X-2 and 23Y-2 are extended along the side lines at a right angle. Type 3 is a gyrosensor in which a first vibrating element 20X-3 is mounted on the support substrate 2 so that the base part 22X-3 is fixed at one of the corners, and the vibrator part 23X-3 is directed toward one of the corners adjacent to the corner of the base part 22X-3, and a second vibrating element 20Y-3 is mounted on the support substrate 2 so that the base part 22Y-3 is fixed at the other of the corners adjacent to the corner of the base part 22X-3, and the vibrator part 23Y-3 is directed toward the first vibrating element 20X-3. As a comparative example, the figure also shows the cross talk value of the above-described two-axis integrated vibrating element (type 0) 60. The unit of cross talk is dbm (decibel/milliwatt).

FIG. 41 indicates that the cross talk value of the vibrating element 60 of type 0 is −50 dbm, the cross talk value of the vibrating elements 20X-1 and 20Y-1 of type 1 is −70 dbm, the cross talk value of the vibrating elements 20X-2 and 20Y-2 of type 2 is −60 dbm, and the cross talk value of the vibrating elements 20X-3 and 20Y-3 of type 3 is −72 dbm.

In the vibrating gyrosensor 1 of each of types 1 to 3 according to an embodiment of the present invention, an improvement of at least about −10 dbm is obtained regardless of the mounting state, as compared with the two-axis integrated vibrating element 60 of type 0. In such a vibrating gyrosensor 1, two independent vibrating elements 20 are provided, and thus an interference signal between the detection signals in the two axes is suppressed to about 1 mV. On the other hand, in the vibrating gyrosensor including the two-axis integrated vibrating element, the interference signal between the detection signals in two axes is about 10 mV, thereby decreasing the detection performance.

In the vibrating gyrosensor 1 according to this embodiment of the invention, when the first and second vibrating elements 20X and 20Y are mounted in the arrangement of type 1 on the support substrate 2, the least interference between the two axes is produced. In the vibrating gyrosensor 1, the first and second vibrating element 20X and 20Y may be mounted at any portions of the support substrate 2. However, in view of mounting of a small IC circuit element 7 and many electronic parts and extension of the wiring pattern, the base parts 22 are preferably fixed at the corners of the support substrate 2 as in the above-described types because the mounting efficiency is most improved.

Figure 42A:
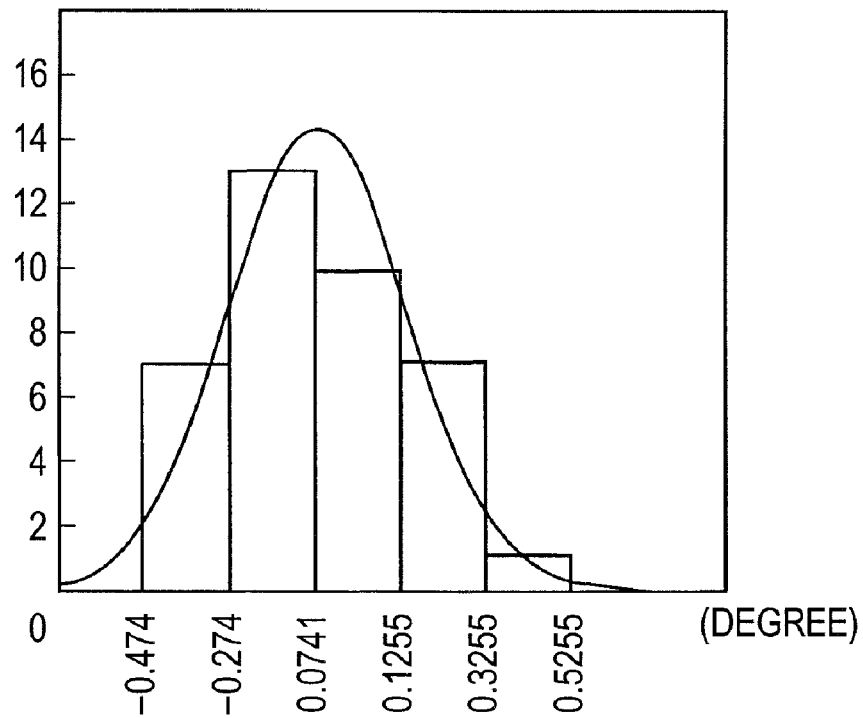
Figure 42B:
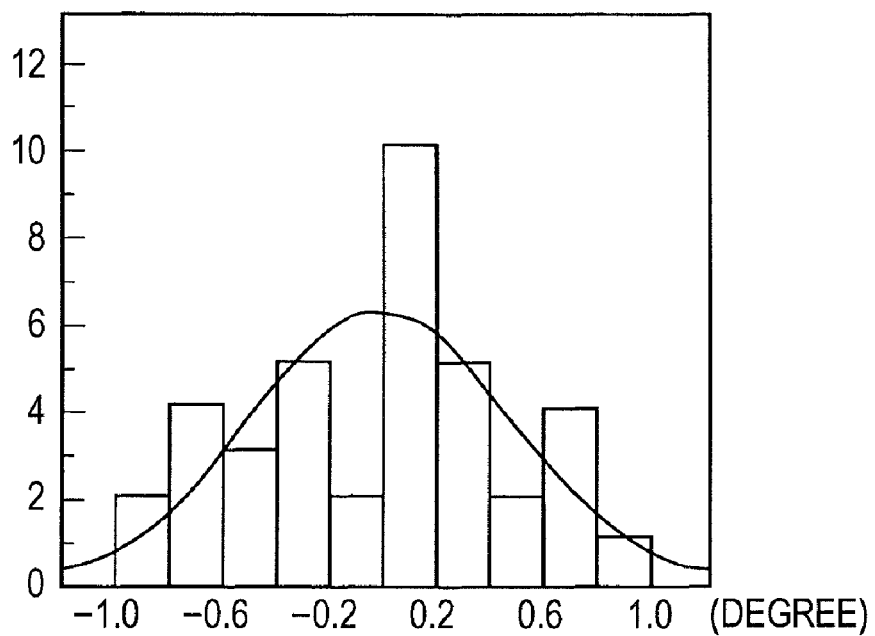

In the vibrating gyrosensor 1, the alignment marks 32 provided on each vibrating element 20 are recognized when the first and second vibrating element 20X and 20Y are mounted on the support substrate 2 using the mounting machine so that the vibrating elements face each other on two axes crossing at a right angle. Also, in the vibrating gyrosensor 1, the vibrating elements 20 are preferably mounted on the support substrate 2 so as not to cause a positional shift of each vibrator part 23. FIGS. 42A and 42B are each a histogram showing the positional shifts of each vibrating element 20 (distribution of shift angles with the center axis), in which the shift angle (degree) is shown on the abscissa, and quantity is shown on the ordinate. FIG. 42A shows mounting performed by recognizing the alignment marks 32, and FIG. 48B shows mounting performed by recognizing the outer shape of vibrating element 20. In the vibrating gyrosensor 1, as seen from FIGS. 42A and 42B, when a high degree of recognition is performed using the alignment marks 32, the vibrating elements 20 are precisely mounted on the support substrate 2 within a range in which variations in the occurrence of angular shift is low, and the shift angle is also low. Therefore, in the vibrating gyrosensor 1, each vibrating element 20 precisely and stably detects motion blurring.

In this embodiment, a pair of the vibrating elements 20X and 20Y is mounted on the first main surface 2-1 of the support substrate 2 so that the vibrator parts 23 are directed in the axial directions at a right angle, for detecting angular velocities around two axes. Alternatively, at least tree vibrating elements may be mounted in different axial directions on a common support substrate, for detecting angular velocities around two axial directions. For example, three vibrating elements may be mounted on a common support substrate so that the vibrator parts thereof are disposed with an angular difference of 120° each.

Furthermore, two vibrating gyrosensors 1 according to this embodiment may be prepared and mounted on surfaces perpendicular to each other in a main body device of a video camera or the like. In this case, angular velocities around the three axial directions, i.e., the longitudinal direction, transverse direction, and vertical direction, are simultaneously detected.

(Cross Talk)

Figure 43:
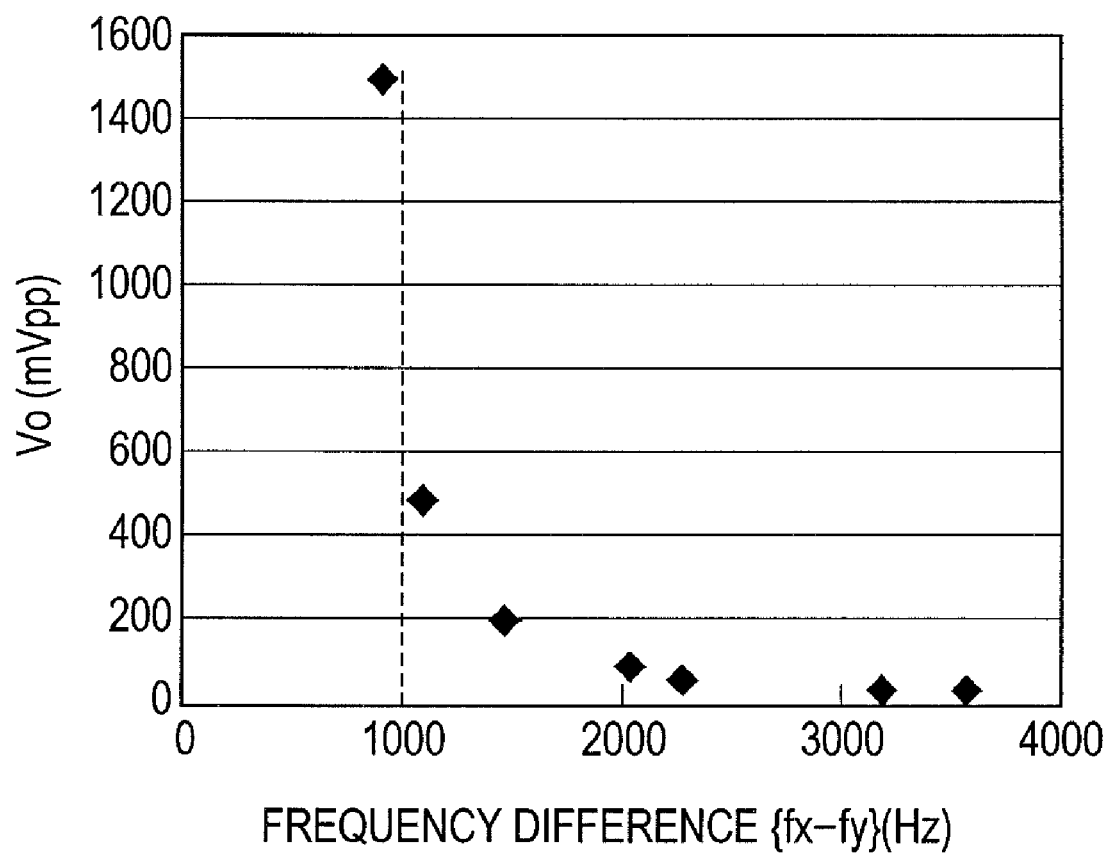
FIG. 43 is a graph showing the results of measurement of the magnitude of an interference signal produced due to a frequency difference between the different operating frequencies of two vibrating elements.

The operating frequency of each vibrating element 20 may be set in a range of several kHz to several hundreds kHz. In the two-axis angular velocity sensor (vibrating gyrosensor 1), the magnitude of an interference signal due to a frequency difference (fx−fy) was measured with changing operating frequencies (fx and fy) of the two vibrating elements 20X and 20Y. The results obtained are shown in FIG. 43. In FIG. 43, the operating frequency difference (fx−fy) between the vibrating elements 20X and 20Y is shown on the abscissa, and an AC noise component Vo (magnitude between a high amplitude peak and a low amplitude peak of an AC waveform indicating noise) superposed on the sensor output (DC) is shown on the ordinate. Here, the noise component Vo is referred to as "cross talk between axes".

When the frequency difference (fx−fy) is less than 1 kHz, the cross talk value reaches 1500 mV$_{pp}$ or more, and stable detection of an angular velocity may be impossible. On the other hand, with a frequency difference near 1 kHz, the cross talk value starts to decrease to 500 mV$_{pp}$. Specifically, with a frequency difference of 1.4 kHz, the cross talk value is decreased to 200 mV$_{pp}$, while with a frequency difference of 2 kHz or more, the cross talk value is decreased to 100 mV$_{pp}$ or less. The results shown in FIG. 43 reveal that the cross talk between axes is significantly decreased by setting the frequency difference (fx−fy) to 1 kHz or more. As a result of preparation of two types of samples for the vibrating elements 20X and 20Y having a difference of 1 kHz between the operating frequencies (fx and fy) thereof, a two-axis angular velocity sensor stably operating was produced.

Sample 1

First vibrating element 20X having an operating frequency of 37 kHz

Second vibrating element 20Y having an operating frequency of 36 kHz

Sample 2

First vibrating element 20X having an operating frequency of 40 kHz

Second vibrating element 20Y having an operating frequency of 39 kHz

FIG. 43 indicates that when the frequency difference (fx−fy) is set to 2 kHz to 3 kHz, the influence of cross talk between the pair of vibrating elements 20X and 20Y is prevented. Therefore, the precision of the sensor output may be improved by driving the vibrating elements 20X and 20Y with a frequency difference of 2 kHz or more.

Furthermore, the vibrating gyrosensor according to this embodiment may be influenced by cross talk between the vibrating elements 20 and other electronic components (sensor and the like) provided on the main body device side. However, a plurality of vibrating elements having different operation frequencies may be previously prepared so that a frequency causing no influence may be selected as the driving frequency of each vibrating element. Specifically, a plurality of vibrating elements having driving frequencies in a range of, for example, 35 kHz to 60 kHz, is prepared, and two vibrating elements having an operating frequency difference of 1 kHz or more (preferably 2 kHz or more) are selected so as to avoid cross talk between the pair of vibrating elements and between the vibrating elements and other electronic components provided in the main body device.

The operating frequency of each of the vibrating elements 20X and 20Y is adjusted by adjusting the vibration properties such as a degree of detuning (frequency difference between the longitudinal resonance frequency and the transverse resonance frequency) and a balance between right and left detection signals in the adjustment step for the vibrating elements 20, and then similarly adjusting the resonance frequencies by laser trimming on the tip side of each vibrator part 23.

The vibrator part 23 of each vibrating element 20 is cantilever vibrator, and thus a resonance frequency is inversely proportional to the square of the length of the cantilever beam as shown by the expression below. In the expression, fn is the resonance frequency of the cantilever beam, E is the Young's modulus, I is the second moment of area of the cantilever beam, ρ is the density, A is the sectional area of the beam, L is the length of the beam, and λ is the proportionality coefficient. Therefore, the rigidity and effective length of the beam may be decreased by laser-trimming the tip portion of each vibrator part 23 to increase the resonance frequency of the beam.

$$f_n = \frac{\lambda^2}{2\pi}\sqrt{\frac{EI}{\rho AL^4}} = \frac{\lambda^2}{2\pi}\sqrt{\frac{EI}{\rho A}}\frac{1}{L^2}$$

Figure 44:
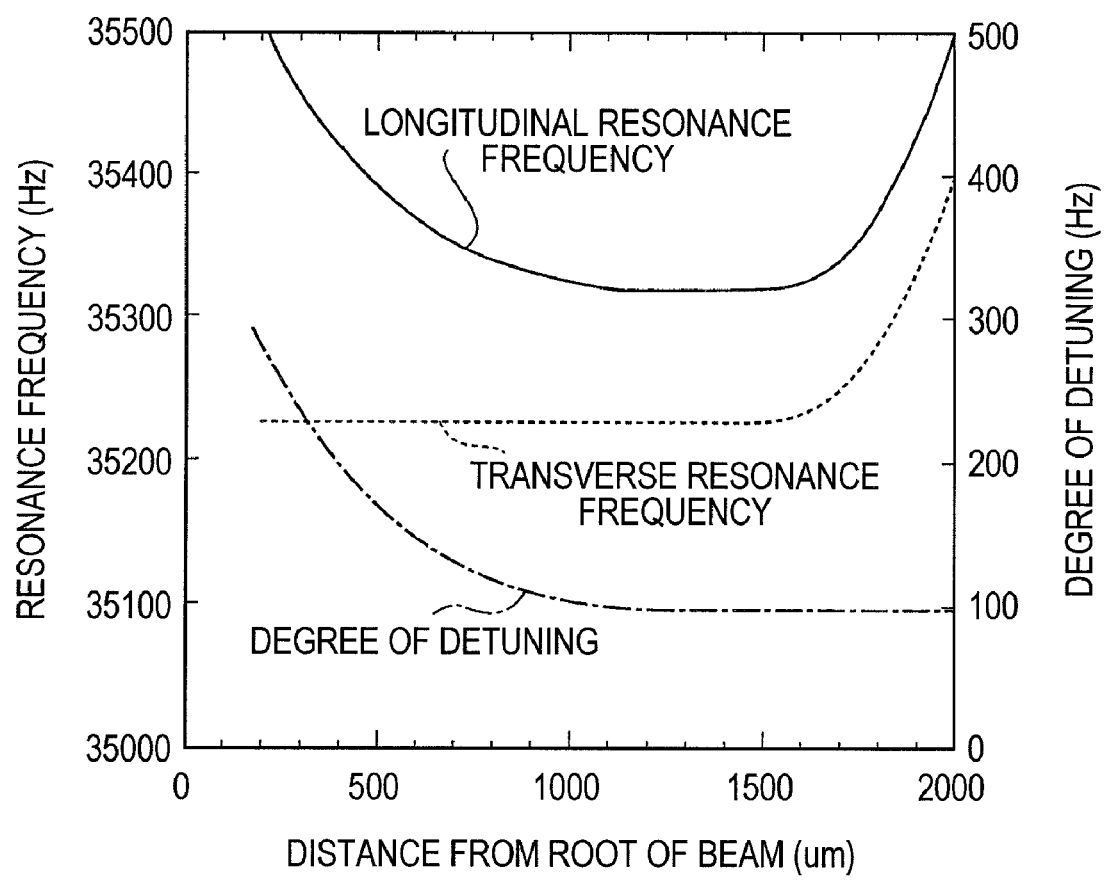
FIG. 44 is a graph showing the relation among the laser processing position, the resonance frequency, and the degree of detuning.

On the other hand, in the adjustment of the resonance frequency, a change in the degree of detuning, which has previously been adjusted, is preferably avoided. FIG. 44 is a diagram (graph) showing plots of data obtained by measuring changes in the resonance frequency and degree of detuning with changes in the processing position of a cantilever beam having a laser processing depth of 11 μm and a length of 1.9 mm. FIG. 44 indicates that when a position at a distance of 1.6 mm or more (⅘ or more the overall length of the vibrator part 23) from the root of the beam (base end of the vibrator part 23) is processed with a laser, the resonance frequency may be increased without changing the degree of detuning (93 Hz).

Figure 45:
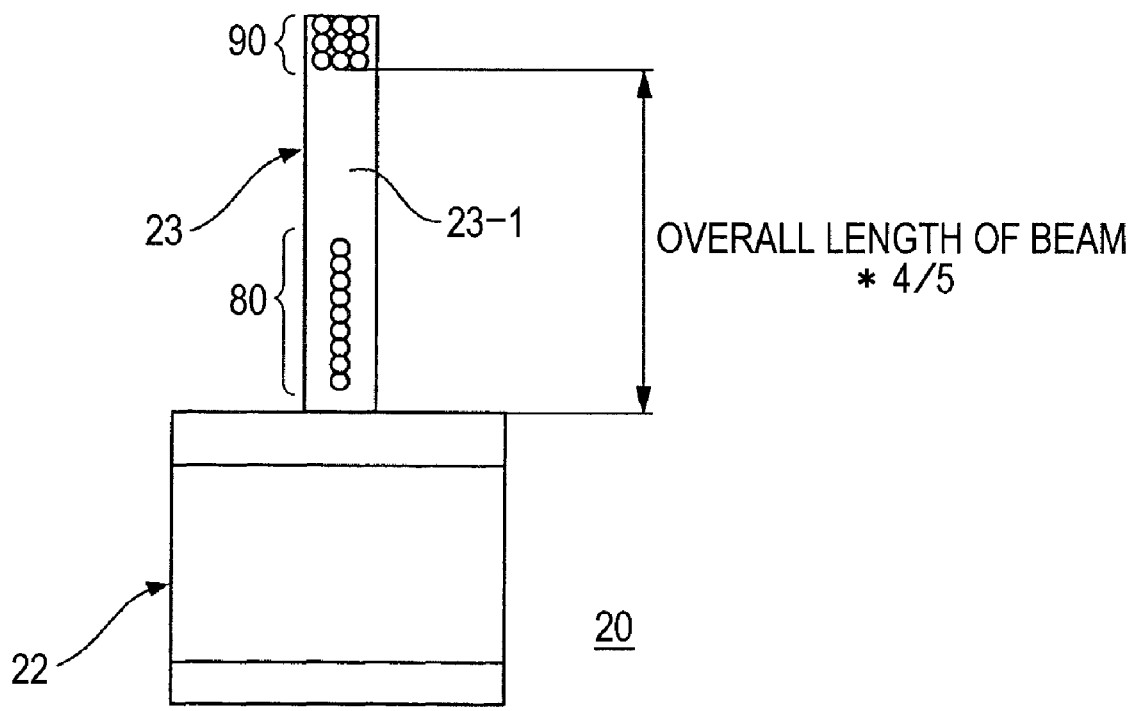
FIG. 45 is a plan view schematically showing a laser processing position for adjusting the degree or detuning and a laser processing position for adjusting the resonance frequency of a vibrator part.

According to the above-descried results, as shown in FIG. 45, on the upper surface 23-1 of each vibrator part 23, a formation region of laser processed recesses (processing marks) 90 for resonance frequency adjustment is provided at a distance of ⅘ or more the overall length of the vibrator part 23 from the root position thereof, and a formation region 80 of laser processed recesses 8 for adjustment of the degree of detuning is provided at another portion.

As a result, the resonance frequencies of the vibrating elements 20X and 20Y are adjusted to any different values without changing the degree of detuning, thereby easily avoiding cross talk between the axes. Also, the resonance frequency of each of the vibrating elements 20X and 20Y is preferably adjusted in a frequency band region in which not only the cross talk between the vibrating elements but also the cross talk between the vibrating elements and other electronic components on the main body device have small influences.

Second Embodiment

In this embodiment, a mounting region of the IC circuit element 7 on the support substrate 2 is described.

Figure 46:
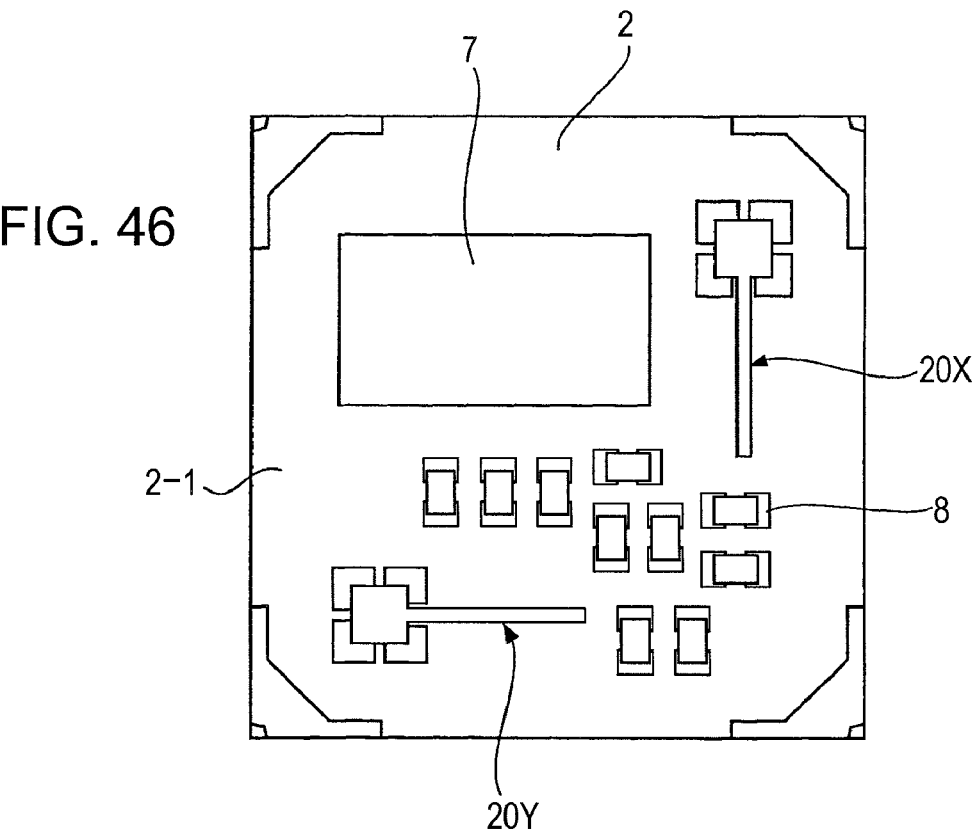
FIG. 46 is a plan view of a principal portion of a usual vibrating gyrosensor described in a second embodiment of the invention.

As shown in FIG. 46, the IC circuit element 7 and other electronic components 8 as well as the pair of vibrating elements 20 (20X and 20Y) are mixed-mounted on the support substrate 2. These components are frequently mounted by reflow soldering.

Therefore, when multilegged components such as the IC circuit element 7 are mounted by reflow soldering after flip-chip mounting of the vibrating elements 20, the support substrate 2 may be curved by thermal stress and thus affect the vibrating elements 20, thereby changing the vibration mode and degrading the characteristics. Also, the support substrate 2 on which the vibrating elements 20 have been mounted is mounted on a control substrate of a main body device by reflow soldering, the junction between the support substrate 2 and the IC circuit element 7 may be again reflowed, and thus the vibrating elements 20 may be influenced by the curvature of the support substrate 2 or the like which occurs in the mounting process.

In the above-descried first embodiment, as shown in FIG. 46, the IC circuit element 7 is mounted near a corner other than the corners of the support substrate 2 on which the vibrating elements 20 are mounted. In addition, other electronic components are also mounted on a localized region of the support substrate 2. Therefore, thermal stress or thermal strain nonuniformly occurs in the plane of the support substrate 2 during reflow, thereby causing nonuniform thermal stress or the like to act on the mounting regions of the pair of the vibrating elements 20. Therefore, a variation may occur between the detection precisions of the vibrating elements.

Figure 47:
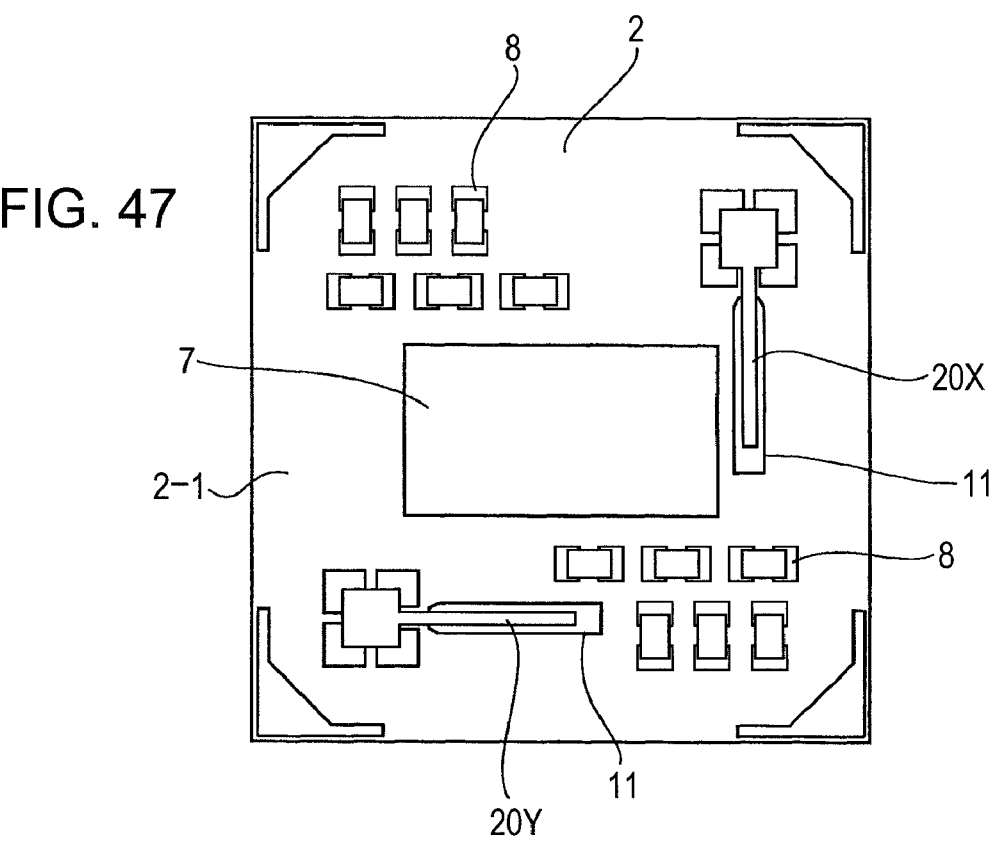
FIG. 47 is a plan view of a principal portion of a vibrating gyrosensor according to the second embodiment.

Accordingly, in this embodiment, as shown in FIG. 47, the main mounting region of the IC circuit element 7 is located in a central portion of a line which connects the mounting regions of the pair of the vibrating elements 20. As a result, the thermal stress exerted in the reflow process of mounting the IC circuit element 7 or the reflow process of mounting the support substrate 2 on the control substrate may be uniformly distributed to the pair of the vibrating elements 20, and the occurrence of a difference between the characteristics of the vibrating elements may be suppressed.

As shown in FIG. 47, the mounting region of the IC circuit element is preferably determined so that the IC circuit element 7 having a rectangular planar shape is disposed at a central point (symmetric point) between the pair of vibrating elements 20. However, the IC circuit element 7 may be actually disposed within a predetermined region with the mounting region of the IC circuit element 7, which is shown in the drawing, as a center. The predetermined region means a region in which when the plane of the support substrate 2 is divided into first to fourth quadrants, at least a portion of the mounting region of the IC circuit element 7 belongs to each of the first to fourth quadrants.

As shown in FIG. 47, the mounting regions of the other electronic components 8 as well as the mounting region of the IC circuit element 7 are preferably determined to be uniform or symmetric with respect to each of the vibrating elements 20 so that the respective mounting regions include the same number of the components. As a result, the stress produced in the reflow processes of the other electronic components 8 as well as the IC circuit element 7 may be uniformly applied to the vibrating elements 20.

Figure 48:
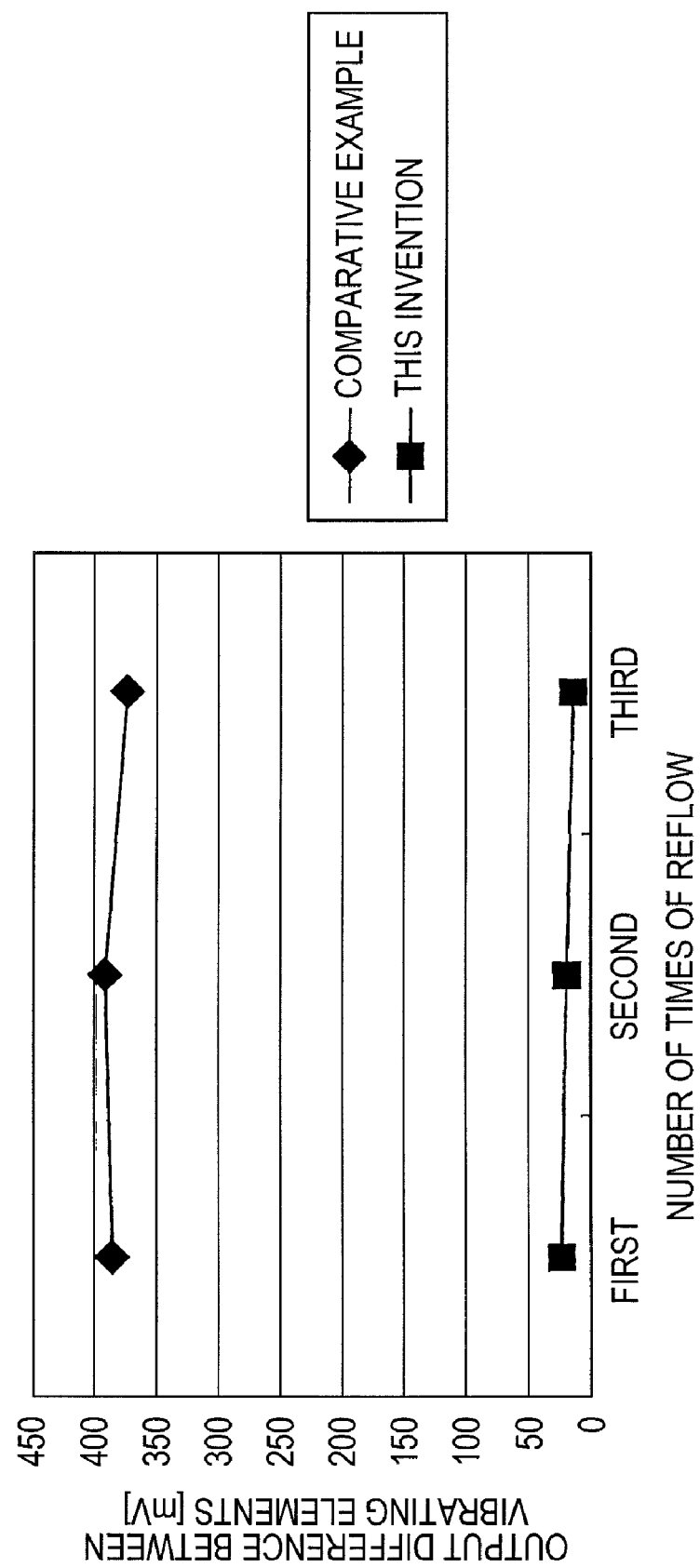
FIG. 48 is a graph showing the results of measurement of examples according to the second embodiment.

FIG. 48 shows the relation between the number of times of reflow of the support substrate 2 and a difference between the outputs of the pair of the vibrating elements with changes in the mounting region of the IC circuit element 7. FIG. 48 indicates that when the difference between the outputs of the vibrating elements is small, the amount of strain transmitted to each vibrating element is uniform, while when the difference between the outputs is large, the amount of strain transmitted to each vibrating element is large. In this case, the output difference before reflow is zero. Also, the embodiment of the invention shown in FIG. 47 has an obvious effect and causes substantially no difference between the outputs of the vibrating elements, as compared with the structure of a comparative example (FIG. 46) in which the IC circuit element 7 is localized at a corner of the support substrate 2.

Third Embodiment

Next, a third embodiment of the invention will be described.

Figure 49:
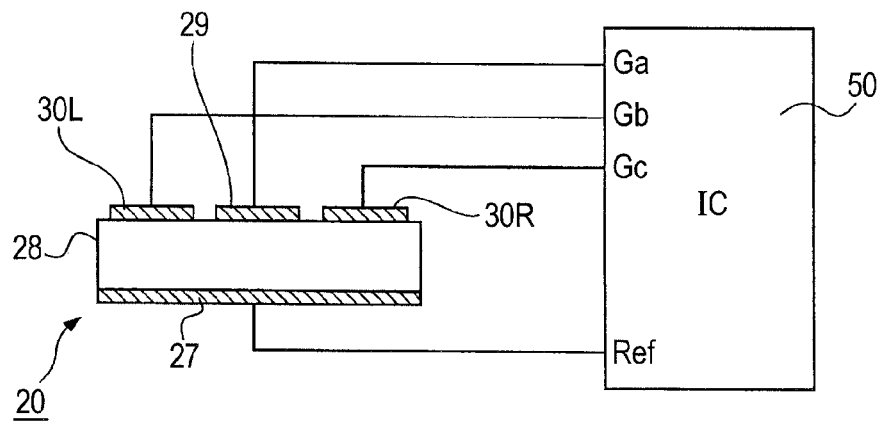
FIG. 49 is a schematic view showing the relation between a vibrating element and a driving detector circuit part according to a third embodiment of the invention.

FIG. 49 schematically shows a wiring structure between each of the vibrating elements 20 and the corresponding driving detector circuit part 50 (IC circuit element 7). The reference electrode layer 27 is connected to the Ref terminal of the driving detector circuit part 50, and the driving electrode layer 29 is connected to the Ga terminal of the driving detector circuit part 50. The pair of the detection electrodes 30L and 30R are connected to the Gb and Gc terminals, respectively, of the driving detector circuit part 50.

In a usual vibrating gyrosensor, Ref terminal is set at the same predetermined positive potential as Ga to Gc terminals (for example, 1.35 V). Namely, the central potential of an AC signal input to the driving electrode layer 29 and the central potentials of detection signals output from the detection electrodes 30L and 30R are set at the same as that of the reference electrode layer 27. Therefore, the detection signals output from the detection electrodes 30L and 30R indicate values higher and lower (positive and negative) than the reference potential, thereby causing the problem of decreasing the detection sensitivity with reduction in size of an element.

Figure 50:
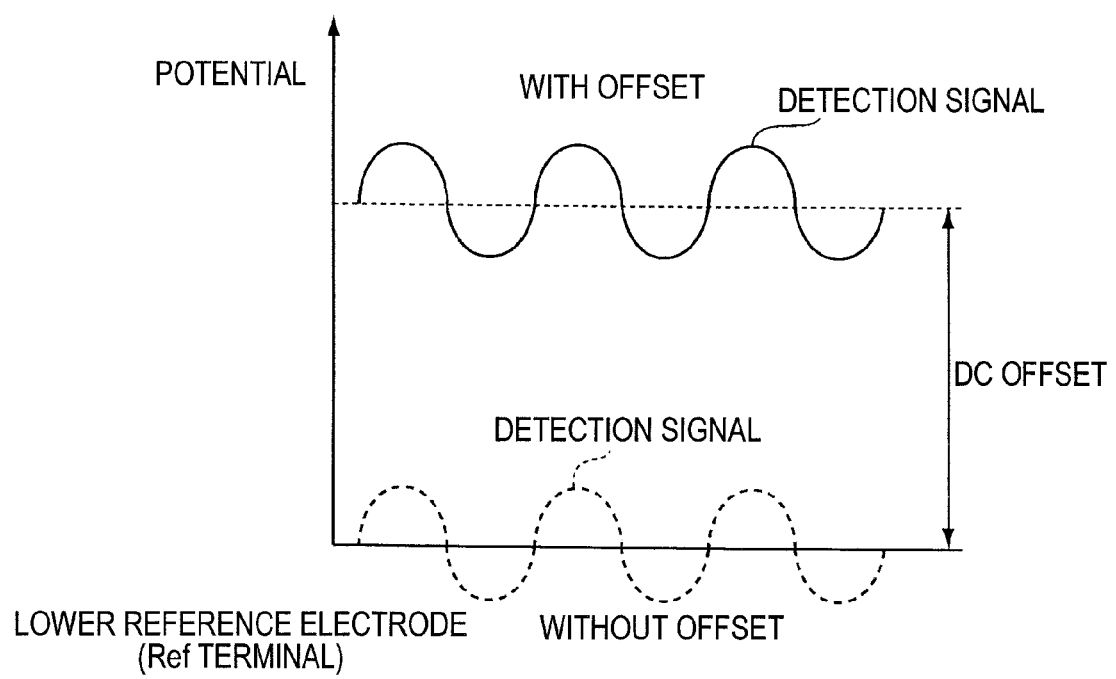
FIG. 50 is a graph illustrating an operation of the vibrating element shown in FIG. 49.

In the vibrating gyrosensor according to this embodiment, therefore, the Ref terminal to which the reference electrode layer 27 is connected is set to the GND (ground) potential. In other words, as shown in FIG. 50, the central potential of the AC signal input to the driving electrode layer 29 and the central potentials of the detection signals output from the detection electrodes 30L and 30R are set to be higher than that of the reference electrode layer 27 by a predetermined potential. As a result, each of the vibrator parts 23 is driven with a predetermined DC bias (offset potential) applied between the Ga to Gc terminals and the Ref terminal, and the detection signals output from the detection electrodes 30L and 30R are at a potential higher than the reference potential, thereby increasing the SN ratio and improving the detection sensitivity.

Figure 51:
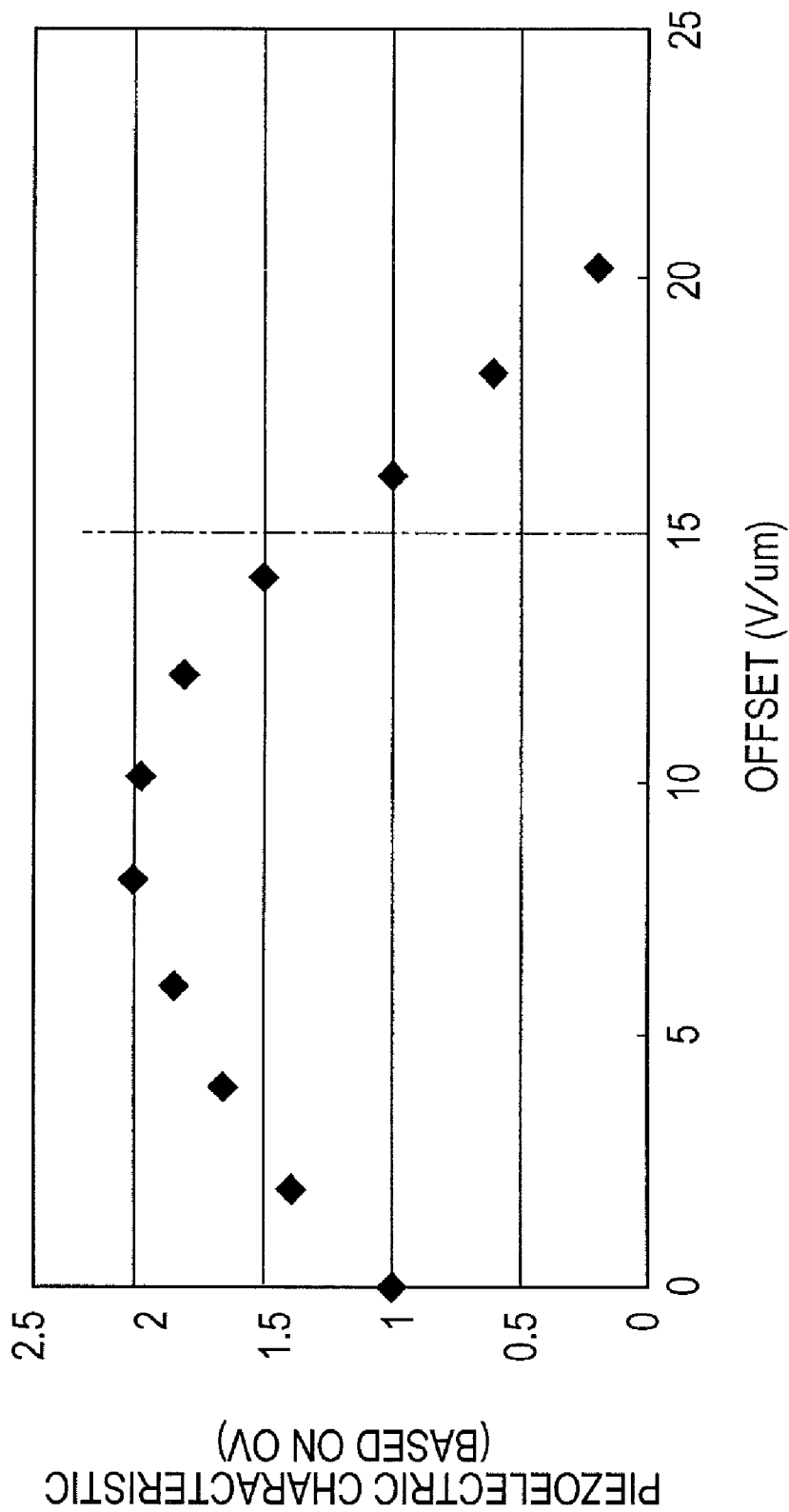
FIG. 51 is a graph showing an example of the relation between the piezoelectric property and offset voltage of a piezoelectric material.

The magnitude of the offset potential applied between the driving electrode layer 29 (detection electrodes 30L and 30R) and the reference electrode layer 27 significantly influences the piezoelectric property (output sensitivity) of the piezoelectric thin film layer 28. FIG. 51 shows the relation between the offset potential and the piezoelectric property. In this figure, the offset potential is represented by the strength (V/μm) of an electric field acting on the piezoelectric thin film layer 28.

FIG. 51 reveals that assuming that the piezoelectric property is 1 when the offset potential is 0, the piezoelectric property increases as the offset potential increases, but tends to decrease when the offset potential is about 8 V/μm or more. When the offset potential exceeds 15 V/μm, the piezoelectric property decreases to a value lower than that at the offset potential of 0. Therefore, in this embodiment, the offset potential for improving the piezoelectric property is 15 V/μm or less and preferably 8 V/μm or less.

Figure 52:
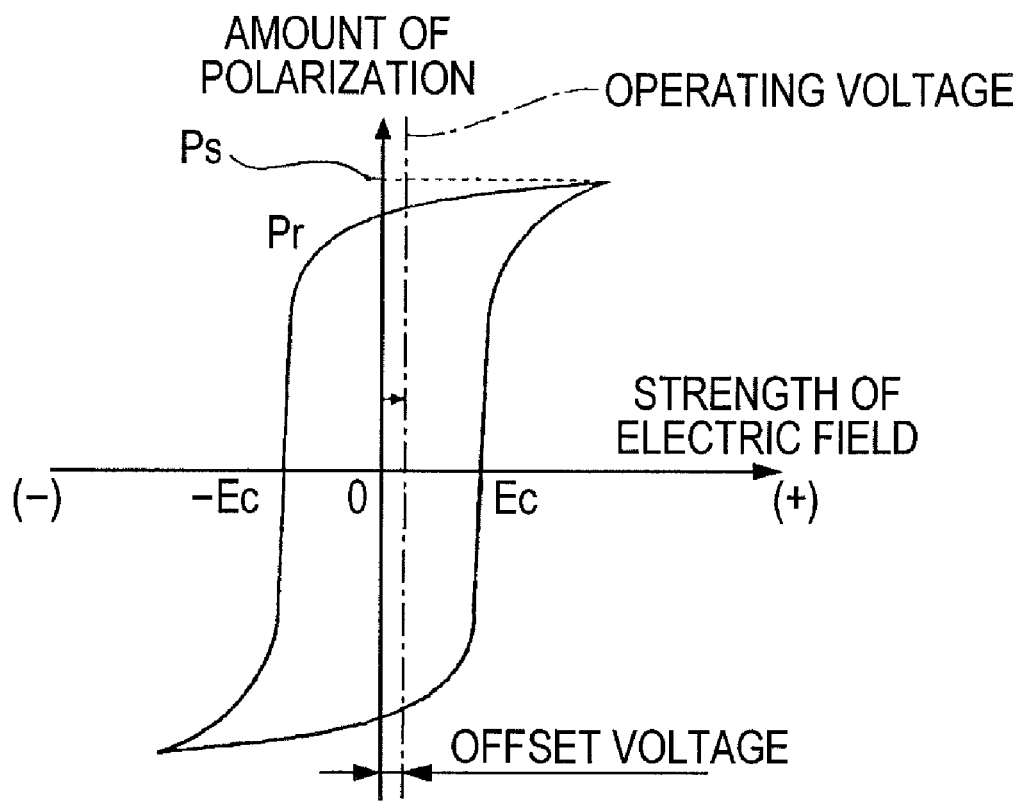
FIG. 52 is a diagram showing a hysteresis loop of a piezoelectric material.

FIG. 52 shows a hysteresis curve (P-E curve) indicating changes in the amount of polarization with changes in the strength of an external electric field of the piezoelectric thin film layer 28. When the reference electrode layer 27 and the driving electrode layer 29 are set at the same potential, the central potential (operating voltage) of an input signal applied to the driving electrode layer 29 agrees with the center (electric strength 0) of the loop shown in FIG. 52. On the other hand, in this embodiment in which the reference electrode layer 27 is connected to the GND terminal, the operating voltage is set at a position shifting to the right side (positive direction of the electric field strength) from the center of the loop. In this embodiment, the amount of the shift, i.e., the offset potential, is 1.35 V. As a result, the piezoelectric material is driven in a region where the amount of polarization is larger than residual polarization Pr of the piezoelectric material, and accordingly the output voltages of the detection electrodes 30L and 30R are increased.

Although the piezoelectric material is driven in a region with a large amount of polarization as the shift amount (offset potential or bias potential) of the operating voltage increases, the driving direction of the piezoelectric material is undesirably suppressed when the amount of polarization is close to saturation polarization Ps. Therefore, the shift amount is preferably, for example, the coercive electric field (+Ec) of the piezoelectric material or less.

As descried above, according to this embodiment, the detection voltage is increased to permit the high-sensitivity detection of an angular velocity or Coriolis' force applied to each vibrator part 23, thereby easily complying with a reduction in size of the vibrating elements 20, as compared with a general sensor. Also, the operation voltage of each driving detector circuit part 50 may be decreased, thereby contributing to the lower power consumption of a vibrating gyrosensor.

As described above, the vibrating gyrosensor descried in the specification has the following other features:

1. The vibrating gyrosensor including a support substrate on which a wiring pattern having a plurality of lands is formed, and a vibrating element mounted on a surface of the support substrate, wherein the vibrating element includes a base part having a mounting surface on which a plurality of terminals to be connected to the lands is formed, and a vibrator part integrally projected from one of the sides of the base part and having a substrate-facing surface coplanar with the mounting surface of the base part, the vibrator part has a first electrode layer, a piezoelectric layer, and a second electrode layer which are laminated on the substrate-facing surface in that order, and the vibrator part vibrates when an AC signal is applied between the first and second electrode layers, the central electric field strength of the AC signal being set at a position shifting to the positive direction from the center of a hysteresis loop of the piezoelectric layer.

2. The vibrating gyrosensor described in 1, wherein shift amount of the central electric field strength of the AC signal is 15 V/μm or less.

3. The vibrating gyrosensor described in 1, wherein the first electrode layer is connected to a ground potential.

4. The vibrating gyrosensor described in 1, wherein a plurality of the vibrating elements is mounted on the support substrate so that the vibrator parts have different axial directions.

5. The vibrating gyrosensor described in 4, wherein the vibrating elements are driven with an operating frequency difference of 1 kHz or more.

6. The vibrating gyrosensor described in 4, wherein in addition to the plurality of vibrating elements, a circuit element and a plurality of electronic components are mounted on the support substrate.

7. The vibrating gyrosensor described in 6, wherein the circuit element includes an IC component, and a main mounting region for the circuit element is located at a central portion of a line connecting the mounting regions of the plurality of vibrating elements.

It should be understood by those skilled in the art that various modifications, combinations, sub-combinations and alterations may occur depending on design requirements and other factors insofar as they are within the scope of the appended claims or the equivalents thereof.

What is claimed is:

1. A vibrating gyrosensor comprising:
   a support substrate with a wiring pattern having a plurality of lands;
   a vibrating element mounted on a surface of the support substrate; and
   an AC driving circuit operatively coupled to the vibrating element,
   wherein,
   the vibrating element includes a base part having a mounting surface with a plurality of terminals connectable to the lands thereon,
   a vibrator part integrally projects from one of the sides of the base part and has a substrate-facing surface coplanar with the mounting surface of the base part,
   the vibrator part has a first electrode layer, a piezoelectric layer, and a second electrode layer which are laminated on the substrate-facing surface, in that order, and the vibrator part vibrates when an AC signal is applied by the AC driving circuit between the first and second electrode layers, and
   the AC driving circuit is configured such that the central electric field strength of the AC signal is set at a position shifting to the positive direction from the center of a hysteresis loop of the piezoelectric layer.

2. The vibrating gyrosensor described in claim 1, wherein the AC driving circuit is configured such that a shift amount of the central electric field strength of the AC signal is 15 V/μm or less.

3. The vibrating gyrosensor described in claim 1, wherein the first electrode layer is connected to a ground potential.

4. The vibrating gyrosensor described in claim 1, wherein a plurality of the vibrating elements are mounted on the support substrate so that the respective vibrator parts have different axial directions.

5. The vibrating gyrosensor described in claim 4, wherein the plurality of vibrating elements are driven with an operating frequency difference of 1 kHz or more.

6. The vibrating gyrosensor described in claim 4, wherein a circuit element and a plurality of electronic components are mounted on the support substrate.

7. The vibrating gyrosensor described in claim 6, wherein the circuit element includes an IC component, and a main mounting region for the circuit element is located at a central portion of a line connecting the mounting regions of the plurality of vibrating elements.

* * * * *